United States Patent [19]

Myszewski

[11] Patent Number: 5,099,447

[45] Date of Patent: Mar. 24, 1992

[54] BLOCKED MATRIX MULTIPLICATION FOR COMPUTERS WITH HIERARCHICAL MEMORY

[75] Inventor: Mathew Myszewski, Stow, Mass.

[73] Assignee: Alliant Computer Systems Corporation, Littleton, Mass.

[21] Appl. No.: 467,962

[22] Filed: Jan. 22, 1990

[51] Int. Cl.$^5$ .................................. G06F 15/347
[52] U.S. Cl. ............................................ 364/754
[58] Field of Search ............................ 364/754, 736

[56] References Cited

U.S. PATENT DOCUMENTS

| | | | |
|---|---|---|---|
| 3,617,720 | 11/1971 | Gentleman | 364/726 |
| 4,594,682 | 6/1986 | Drimak | 364/736 |
| 4,697,247 | 9/1987 | Grinberg | 364/754 |
| 4,719,588 | 1/1988 | Tatemichi et al. | 364/754 |
| 4,841,469 | 6/1989 | Kuenemund et al. | 364/754 |
| 4,914,615 | 4/1990 | Karmarkar et al. | 364/754 |

OTHER PUBLICATIONS

Dangarra, Gustavson and Karp; Implementing Linear Algebra Algorithms for Dense Matrices on a Vector Pipeline Machine; *SIAM Review* vol. 26, No. 1 pp. 91–112, Jan. 1984.
Bailey; Extra High Speed Matrix Multiplication on the Cray-2; pp.: 603–607, *SIAM J. Sci. Stat,. Comput.* vol. 9, No. 3 May 1988.
Jalby, Meier; Optimizing Matrix Operations on a Parallel Muliprocessor with a Hierarchical Memory System: pp.: 429–432, Proceedings 1986 Intl. Conf. on Parallel Processing Aug. 1986.
Gallivan, Jalby, Meier and Sameh; Impact of Hierarchical Memory Systems on Linear Algebra Algorithm Design; pp.: 12–48, *The Intl. J. of Supercomputer Applications* vol. 2, No. 1, 1988.
Gallivan, Jalby, Meier; The Use of BLAS3 in Linear Algebra on a Parallel Processor with a Hierarchical Memory; pp.: 1079–1084 *SIAM J. Sci. Stat. Comput.* vol. 8, No. 6, Nov. 1987.
Dongarra and Sorensan; Linear Algebra on High Perforance Computers; pp.: 57–88, Applied Mathematics & Computation vol. 20, Nos. 1 & 2, 1986.
Geist, Heath and E. Ng; Parallel Algorithms for Matrix Computations; pp.: 233–250, Mathematical Sci. Sec., Oak Ridge National Lab.
Lamagna; Fast Computer Algebra; pp.: 43–56, *Computer* Sep. 1982.
Jagadish and Kailath; A Family of New Efficiency Arrays for Matrix Multiplications; pp.: 149–155, IEEE Trans. on Computers vol. 38, No. 1, Jan. 1989.
Pan; How to Multiply Matrices Faster; pp.: 250–251, 1984, Book Reviews.
Evans; Designing Efficient Systolic Algorithms for VLSI Parallel Processor Arrays; pp.: 261–281, *Parallel Architecture & Computer Vision*, 1988.
Aggarwal, Alpern, Chandra and Snir; A Model for Hierarchical Memory; pp.: 305–314, Proceedings of the 19th Annual ACM Symposium on Theory of Computing 1987.
Johnson; Communication Efficient Basic Linear Algebra Computations on Hypercube Architecture; pp.: 133–172, *J. of Parallel & Distributed Computing* vol. 4, 1987.
Varman, Ramakrishnan; A Fault-Tolerant VLSI Matrix Multiplier; pp.: 351–357, *Proceedings 1986 Intl. Conf. on Parallel Processing*.
Carnevali, Radicati, Robert, Sguazzero; Block Algorithms for Gaussian Elimination and Householder Reduction on the IBM 3090 Vector Multiprocessor; pp.: 297–302, *Proceeding of the Intl. Conf. on Parallel Processing & Applications*, Italy Sep. 23–25, 1987.

*Primary Examiner*—David H. Malzahn
*Attorney, Agent, or Firm*—Fish & Richardson

[57] ABSTRACT

A matrix multiplication method that is particularly well suited for use with a computer having hierarchical memory. The A and B term matrices are broken down into blocks and a sum of a series of outer products is computed in order to generate product matrix blocks. Reads to cache or other faster, high-level storage and writes to main memory are interleaved with the calculations in order to reduce or elimiante processor stalling. Individual blocks may be computed by separate processors without requiring communication of intermediate results.

21 Claims, 23 Drawing Sheets

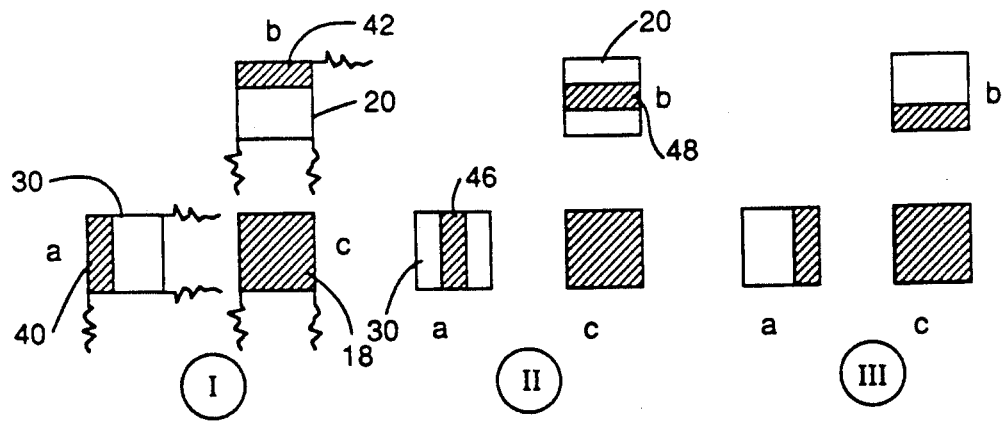
FIG 4
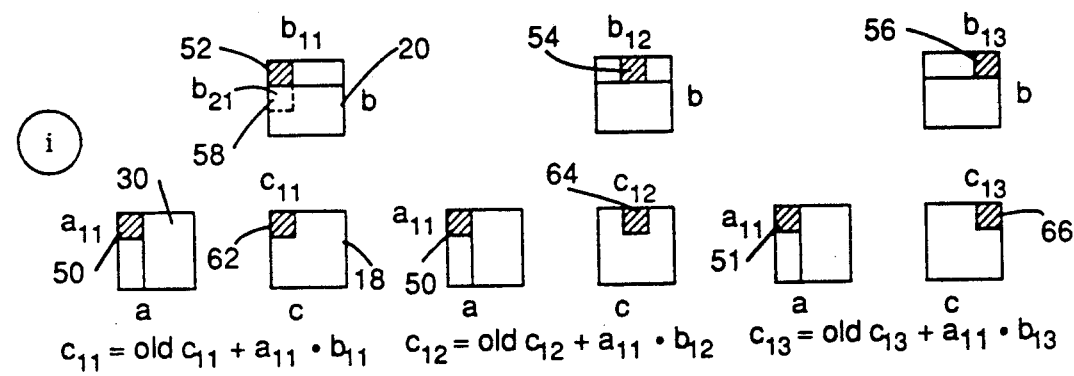
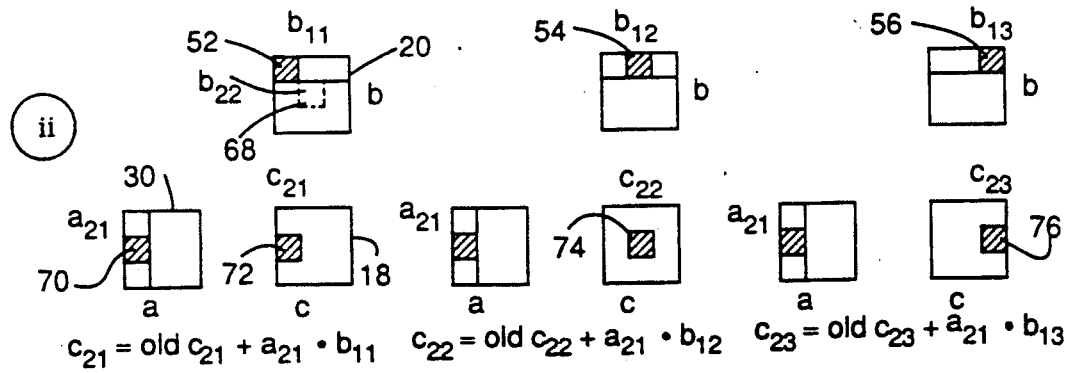
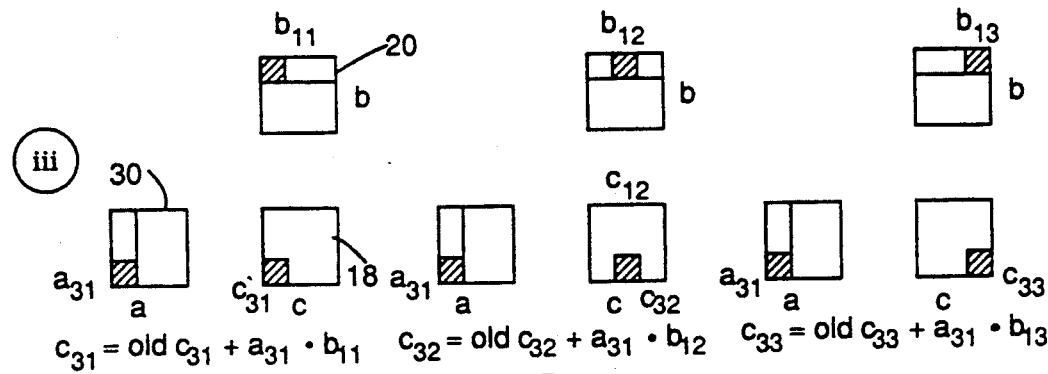
FIG 5

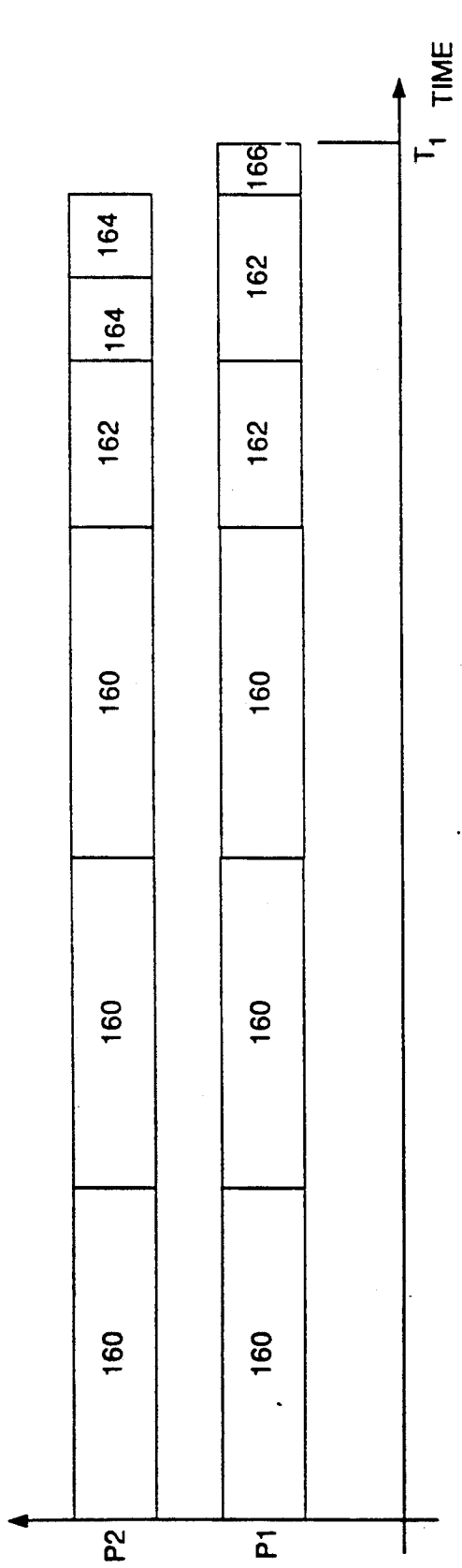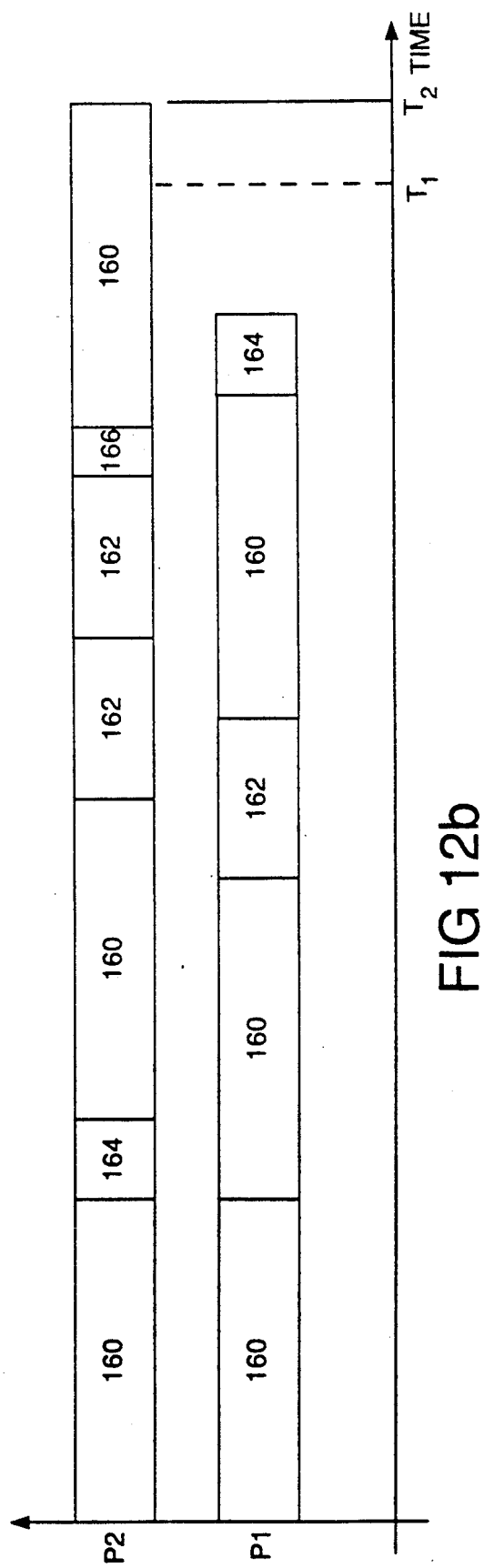

BLOCKED MATRIX MULTIPLICATION FOR COMPUTERS WITH HIERARCHICAL MEMORY

BACKGROUND OF THE INVENTION

This invention relates to methods for multiplying matrices using computers with hierarchical memory.

The multiplication of matrices is an important operation for computers. It is useful for a wide variety of operations, one of them being the solution of simultaneous equations. In the interest of efficiency, it is highly desirable to perform these operations quickly. For example, a simulation for the purpose of research and/or development that can run more quickly will enhance the productivity of the scientist or engineer without added hardware costs.

In the solution of large matrix multiplications in large or real time problems, scientists and engineers have turned to supercomputers which include high speeds of operation, pipelined architectures and/or parallel processing. A series of libraries of subroutines has been developed for matrix multiplication, among other operations, on these machines. These subroutine libraries provide the high-level function of matrix multiplication, and are available on a variety of supercomputers. The subroutine is usually written for a specific machine, taking that machine's architecture into consideration. In this way, the programmer may make calls to a simple matrix algebra subroutine and expect rapid performance from the system. Commonly used subroutine libraries of this kind are the BLAS subroutine libraries (Basic Linear Algebra Subprograms). The BLAS3 subroutine library contains matrix operation subroutines and in particular a subroutine called DGEMM which performs matrix multiplications. For more information on BLAS, see C. Lawson, R. Hanson, D. Kincaid and F. Krogh, "Basic Linear Algebra Subprograms for FORTRAN Usage", *ACM Trans. on Math. Soft.*, 5 (1979), 308-325, or J. J. Dongarra, J. DuCroz, S. Hammarling and R. Hanson, "An Extended Set of Linear Algebra Subprograms", *ACM Trans on Math. Soft.*, 14,1 (1988) 1-32. For more information on BLAS3, see J. J. Dongarra, J. DuCroz, I. Duff, and S. Hammarling, "Set of Level 3 Basic Linear Algebra Subprograms", *ACM Trans on Math. Soft.* (Dec. 1989).

In designing these subroutines, speed is important. For any given architecture, there are several limiting parameters that affect matrix multiplication speed. A first limiting parameter is the number of computations needed to perform the operation. Upon first consideration, it would seem that the order of the number of operations needed to perform a matrix multiplication would be $n^3$, where $n^2$ is the number of elements in each of the term matrices.

It has been shown, however, that this order can be reduced to $n^{2.49}$, by using asymptotic complexity reduction methods of the type of Strassen's. This can lead to greater computational efficiency for large matrices, although there may be some accuracy tradeoffs. Strassen's method, and an implementation thereof, are discussed in "Gaussian Elimination is Not Optimal", *Numerische Mathematik*, Vol. 13, 1969, pp. 354-356 by V. Strassen, and "Extra High Speed Matrix Multiplication on the Cray-2", *SIAM J. Sci. Stat. Comput.*, Vol. 9, No. 3, May 1988, by D. H. Bailey. Other asymptotic complexity reduction methods are discussed in V. Pan, "New Fast Algorithms for Matrix Operations", *SIAM J. Comp.*, 9 (1980), 321-342.

A second parameter in speeding up matrix multiplication is system power. The clock speed, word size and number of processors limit the number of operations that may be performed in any given amount of time, and thus the speed at which matrix multiplications may be performed. Improvements along this line have included using faster processors with larger word sizes and using parallel processors. The use of parallel processors has allowed programmers to break the problem up into separate sub-problems and allocate these sub-problems to different processors. These so-called "blocked" methods allow speed improvements by performing more than one operation in parallel.

Another, more elusive, limiting parameter is memory performance. Two components of memory performance of interest are memory bandwidth and memory latency. Memory bandwidth is indicative of the overall available throughput rate of data from the memory to the processor. Memory latency is a measure of the time taken to retrieve the contents of a memory location, measured from the time at which it is requested to the time at which it is delivered to the requesting processor. Both latency and bandwidth may be degraded from the point of view of a processor if it must share its memory resources with other processors or peripheral devices. Computational methods may be affected by one or both of these limiting parameters, as the processor may be forced to stall while waiting for data from memory.

These problems have been addressed by computer designers in different ways. Memory bandwidth has been increased by using memories that cycle faster, and by using larger word sizes. Latency has been addressed by using memories with faster access times and by making computers more hierarchical. This involves adding small areas of expensive high speed memory that are local to a processor. Examples of hierarchical memory include cache memories, virtual memory, and large register sets.

If one ignores latency and bandwidth issues in implementing a method of matrix multiplication, one may have a method that is theoretically efficient, as it reduces the order of the number of operations to be performed or it splits the operations into blocked operations that may be performed by several processors, but still falls short of good performance. This may happen because the processing rate is slower than optimal as the processor spends a lot of time waiting for slow memory fetches or because it is competing for access to a shared memory resource.

This problem has become more pronounced as computers tend to include more hierarchical elements, as memory elements tend to be shared more often, and as processors are getting faster and more complex, while large semiconductor memories, disks and other mechanical storage systems have not increased in speed at the same pace.

Blocked methods for matrix multiplication have been used for computers with hierarchical memories (K. Gallivan, W. Jalby, U. Meier and A. Sameh, "Impact of Hierarchical Memory Systems on Linear Algebra Algorithm Design", *The International Journal of Supercomputer Applications*, 2,1 Spring 1988, 12-48).

SUMMARY OF THE INVENTION

In general the invention features a matrix multiplication method that is particularly well suited for use with a computer having hierarchical memory. The A and B term matrices are broken down into blocks (except in the case of small matrices where each matrix constitutes one block) and a sum of a series of outer products is computed to generate blocks of the result matrix C. Fetching of elements of the A and B matrices into cache or other high-level storage is performed during (e.g., by being interleaved with) multiplication and/or addition operations in order to reduce or eliminate processor stalling.

In preferred embodiments, store operations for storing elements of the result matrix into main memory are also done by interleaving the operations with multiplication and/or addition operations. A matrix update operation ($C=A\times B+C$) is performed, with elements of the initial values of matrix C being fetched during multiplication and/or addition operations. Elements of the matrices are double buffered (e.g., a newly fetched element of matrix A is placed in one side of a two element buffer and swapped with the previously used element). Elements of the A matrix are double buffered element-by-element, elements of the B matrix B are double buffered row-by-row, and elements of the C matrix are double buffered block-by-block. Individual blocks of the result matrix may be computed by separate processors without requiring communication of intermediate results; distribution of blocks among the processors is based on a size dependent sequencing method to reduce differences in completion times between processors. The method may operate on transposed A or B matrices.

This matrix multiplication method has the advantage of improving speed of execution by reducing the impact of both memory bandwidth and memory latency. The impact of memory latency is reduced by fetching operands in advance, while multiplications of the previous operands take place. The impact of memory bandwidth is reduced as the method of the invention actually requires fewer fetches overall than would a conventional technique. The combination of these two effects will cause the speed of the matrix multiplication to be increased.

The fact that this is a blocked method allows multiple processors to work on a single matrix multiplication at the same time, in any combination, and without any need to communicate intermediate results between processors.

Furthermore, the method is advantageous in that it may be used in conjunction with Strassen's method or other similar techniques for further savings in computation time.

Other features and advantages of the invention will be apparent from the following description of a preferred embodiment and from the claims.

DESCRIPTION OF THE PREFERRED EMBODIMENT

FIG. 4 illustrates the computation of outer products on the matrix blocks.

FIG. 5 illustrates the individual scalar-scalar products which make up one of the outer products.

FIGS. 12a and 12b are execution time diagrams comparing the times taken to compute the results of the matrix multiplication of FIG. 9 using two different processing sequences.

The method of matrix multiplication of the invention performs computations on blocks of the term matrices and assembles the results into a result matrix. The size of the blocks depends on the particular implementation. To understand the rationale for operating on blocks of the matrix, the matrices may be broken down conceptually as follows.

Figure 1:
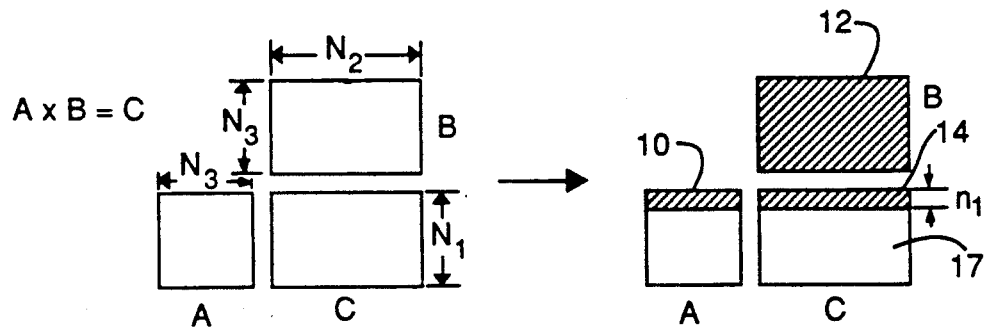
FIG. 1 is a diagram of a first step in conceptually partitioning the task of multiplying two matrices according to the invention.

The first conceptual partitioning of the matrices is simple, and can be understood in connection with FIG. 1. In multiplying two matrices ($A\times B=C$), the elements of the result matrix C are each a sum of the products of individual elements of a row of the first term matrix A and the corresponding elements in the corresponding column of the second term matrix B. Thus, referring to FIG. 1, the elements in the shaded block 14 of result matrix C 17 depend only on the elements in the shaded blocks 10, 12 of term matrices A and B.

Figure 2:
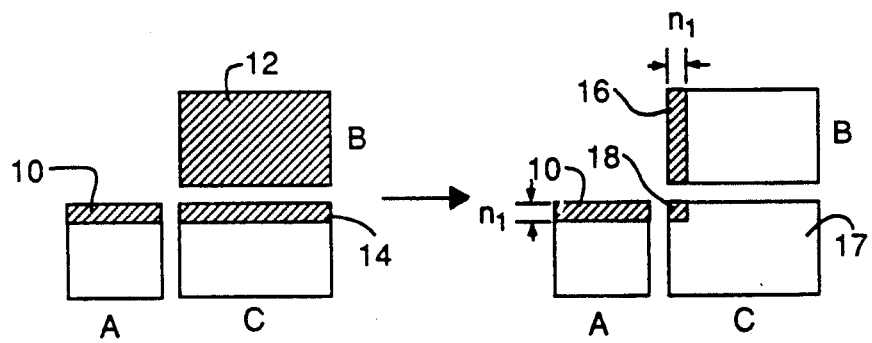
FIG. 2 is a diagram of a second step in this conceptual partitioning process.

The second conceptual partitioning is shown in FIG. 2. Again, it may be appreciated that the elements in the shaded block 18 of result matrix C 17 depend only on the elements in the shaded blocks 10, 16 of term matrices A and B. The elements of this shaded block 18 may thus be generated independently from other like blocks.

Figure 3:
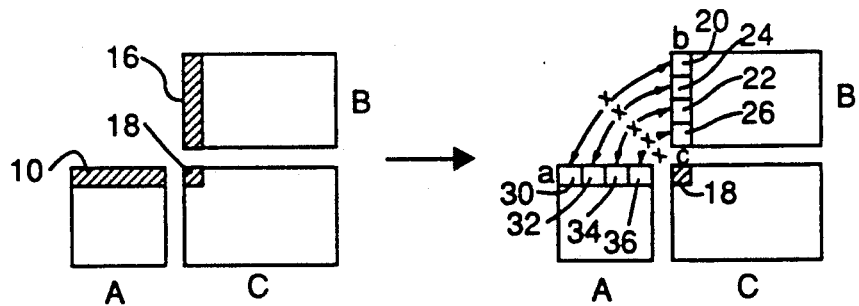
FIG. 3 is a diagram of a third step in this conceptual partitioning process.

The third step of the breakdown, shown in FIG. 3, is a little more complicated, and leads to the blocks that the method actually uses. Here, the shaded block 18 of the result matrix 17 is a result of the sum of a complete series of outer products of each of the pairs of term matrix blocks associated with an arrow 20 & 30, 22 & 32, 24 & 34, 26 & 36. The problem has now been reduced to a sum of a series of outer products. The meaning of a "complete series of outer products" will be clarified further on.

It should be noted that the decision to divide the shaded areas 10, 16 into four blocks is for the purposes of illustration, and that the matrix could be divided into a number of block sizes. In practice, the optimum size of the matrix blocks will depend on computer system parameters such as cache size, and tradeoffs to be discussed later on. It should also be noted that the width of the blocks in the first term matrix should be the same as the height of the corresponding blocks in the second term matrix.

An outer product of a column vector and a row vector is defined as the matrix product of the column vector and the row vector, in that order. Thus, in FIG. 4, the outer product of the first column 40 of the first term matrix block 30 and the corresponding row 42 of the second term matrix block 20 will yield resulting elements for all locations of the result matrix block 18.

This operation is repeated in part II of FIG. 4 on the second column 46 and corresponding row 48 of the term matrix blocks to form a second outer product which will also have elements for all locations of the result matrix block 18. These elements are added to the results already stored in result matrix block 18 to form an updated result matrix block 18. This process is repeated until there are no corresponding pairs of rows and columns left in the pair of term matrix blocks. In this case, there are three columns in the first term matrix block 30 and three corresponding rows in the second term matrix block 20, and thus part III of FIG. 4 completes the series of outer products. The size of these blocks, as was implied earlier, can be other than three-by-three.

Performing these operations constitutes summing a complete series of outer products for a pair of corresponding term matrix blocks. It bears noting that this series of outer products amounts to a matrix multiplication operation for the first pair of term matrix blocks 20, 30 in the computation of result matrix block 18. The final value of the result matrix block 18, however, will be obtained by computing the sum of the complete series of outer products for all of the corresponding pairs of term matrix blocks. The results obtained in computing the outer products for the rest of the pairs of term matrix blocks 22 & 32, 24 & 34, 26 & 36 are each added to the result matrix block 18 as they are evaluated in a running sum, and thus the matrix products of these pairs are not explicitly computed.

In fact, it is useful to write a subroutine that performs a matrix update operation: $C = A \times B + C$, and in this case, the outer products of the first pair of term matrix blocks 20, 30 are simply added to the current C matrix elements as they are computed. Subsequently computed outer products are added to the result matrix, as before. Providing a zero C matrix allows the user to compute the simple matrix product $C = A \times B$ with this matrix update subroutine.

When the outer products for all of the pairs of corresponding first and second term matrix blocks have been accumulated to form a final result matrix block 18 (i.e. when the sum of a complete series of outer products for each block has been formed), the result matrix block 18 will contain result elements of the overall matrix product or matrix update. The preceding operation may then be performed on further sets of term matrix blocks to obtain the complete solution of the matrix multiplication.

Referring now to FIG. 5, the computation of the outer products is discussed in more detail. Each outer product will be broken down into a succession of scalar-scalar multiplications which the processor executes. The whole of FIG. 5 shows the operations performed in a single outer product; that of the first column 40 of the first term matrix block a 30 and the first row 42 of second term matrix block b 20. This product is computed in the following sequence.

First, the first element 50 of the column 40 of the first term matrix block 30 is multiplied successively by the elements 52, 54, 56 of the first row 42 of the second term matrix block 20 to form the elements 62, 64, 66 of the first row of the result matrix block 18.

This process is repeated (part ii of FIG. 5) for the next element 70 of the first column, and the same elements 52, 54, 56 of the same row to form the elements 72, 74, 76 of the second row of the result matrix block 18. This process is repeated until there are no more elements in the row and column operand vectors.

It should be mentioned that the outer products could be evaluated in different orders, and the final result would be the same.

The method achieves its speed advantages by fetching the operands from their locations in memory into the cache (or other faster memory in a hierarchal system) before they are needed. In this way, every element is ready to be operated on before the operation takes place and little time is spent waiting for operands. This is possible because modern processors are usually pipelined and a fetch from memory can take place while other operations are being performed on data in the cache. The block size can be chosen to be large enough to compensate for the latency of these fetches.

The fetching of the operands is interleaved with the matrix outer product computations. Before or while each element of a column of a first term matrix block is multiplied by the corresponding row of elements of the corresponding second term matrix block (e.g., during or just before the scalar-vector multiplication of part i of FIG. 5), the element that will be used in the next computation (i.e., the next element 70 of the column 40 of the first term matrix block 30) is fetched into the cache or other high level storage. In this way, the element will be available before the multiplications of part i are finished and the operations of part ii of FIG. 5 are ready to be started.

When a first matrix element (e.g., 70) is fetched into the cache, it is stored in a storage area allocated for that purpose. Since the current first term matrix block element (e.g., 50) is being used for computation, the storage area allocated for the fetched element is different from that used for the current element. When the next operation is to take place and the next element is needed, a swap of these two storage areas takes place.

Figure 6:
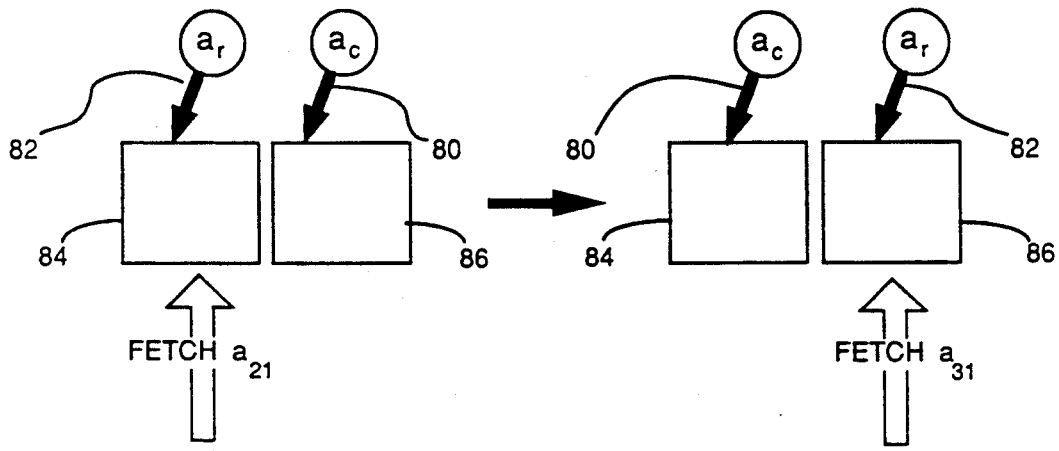
FIG. 6 illustrates the double buffering of the first term matrix block elements.

This swap can be performed by changing pointers, as illustrated in FIG. 6. A pointer 80 points to the value to be used for computations, which is stored in a first cache storage location 86. While the computations are being performed, the next element is fetched into a second cache storage location 84 pointed to by a second pointer 82. When the computations on the current element are finished, the computation pointer 80 is updated to point to the second storage location and the pointer 82 is updated to point to the first storage location. The cycle is then repeated. The updating of these pointers will take place between the scalar-vector products of the outer products (e.g., after part i of FIG. 5, and before part ii of FIG. 5). This technique is commonly known as double buffering.

Also fetched between scalar-vector products is an element of the next row of the matrix block which is to be used in the next series of computations (i.e., element $b_{22}$-68). If one element of this row is fetched when each element of the column is multiplied by its corresponding row and the matrix blocks are square, the elements of the row will also be readily available in the cache when it comes time to perform the computations for the next row. Again referring to FIG. 5, the above operation would proceed as follows. Before or during the multiplication in part i, the processor would initiate a fetch of the corresponding element in the next row (i.e., $b_{21}$- 58). Before or during part ii, element 68 would be fetched. In this way, after all of the multiplications and corresponding fetches (i–iii for the exemplary three-by-three matrix blocks), the next whole row will be ready for processing.

Figure 7:
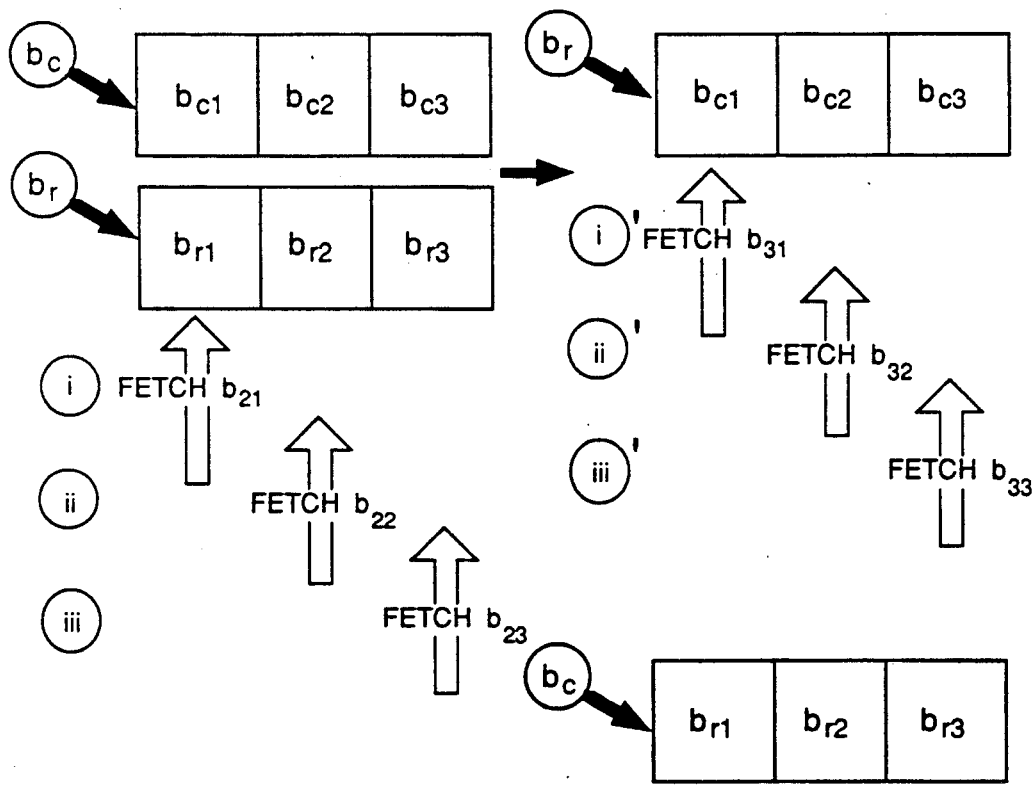
FIG. 7 illustrates the double buffering of the second term matrix block rows.

These elements are also double-buffered, this time into a row-sized buffer instead of a single-element buffer. This level of double buffering is illustrated in FIG. 7. The operation of this double buffering is similar to the earlier described double buffering. The swaps occur after completion of a row of fetched elements (e.g., between parts I and II of FIG. 4), instead of after retrieval of a single element as is the case for elements of the first term matrix block.

Elements of the result matrix blocks are also double-buffered. In this case, however, the double buffering takes place for reading and writing. As the outer products are being computed, elements of the next result matrix block are being retrieved into an allocated storage area in the cache. These elements are elements of the initial C matrix that is to be updated in a matrix update operation. Once a result matrix block is computed, the next result matrix block may be swapped in using a pointer, as was done for the elements of the first and second term matrices, respectively.

It is noted that while this next result matrix block is being retrieved from memory, the previous result matrix block is being stored in memory. These operations are performed in a manner that is interleaved with the computations as was the case for rest of the double buffering operations.

Figure 8:
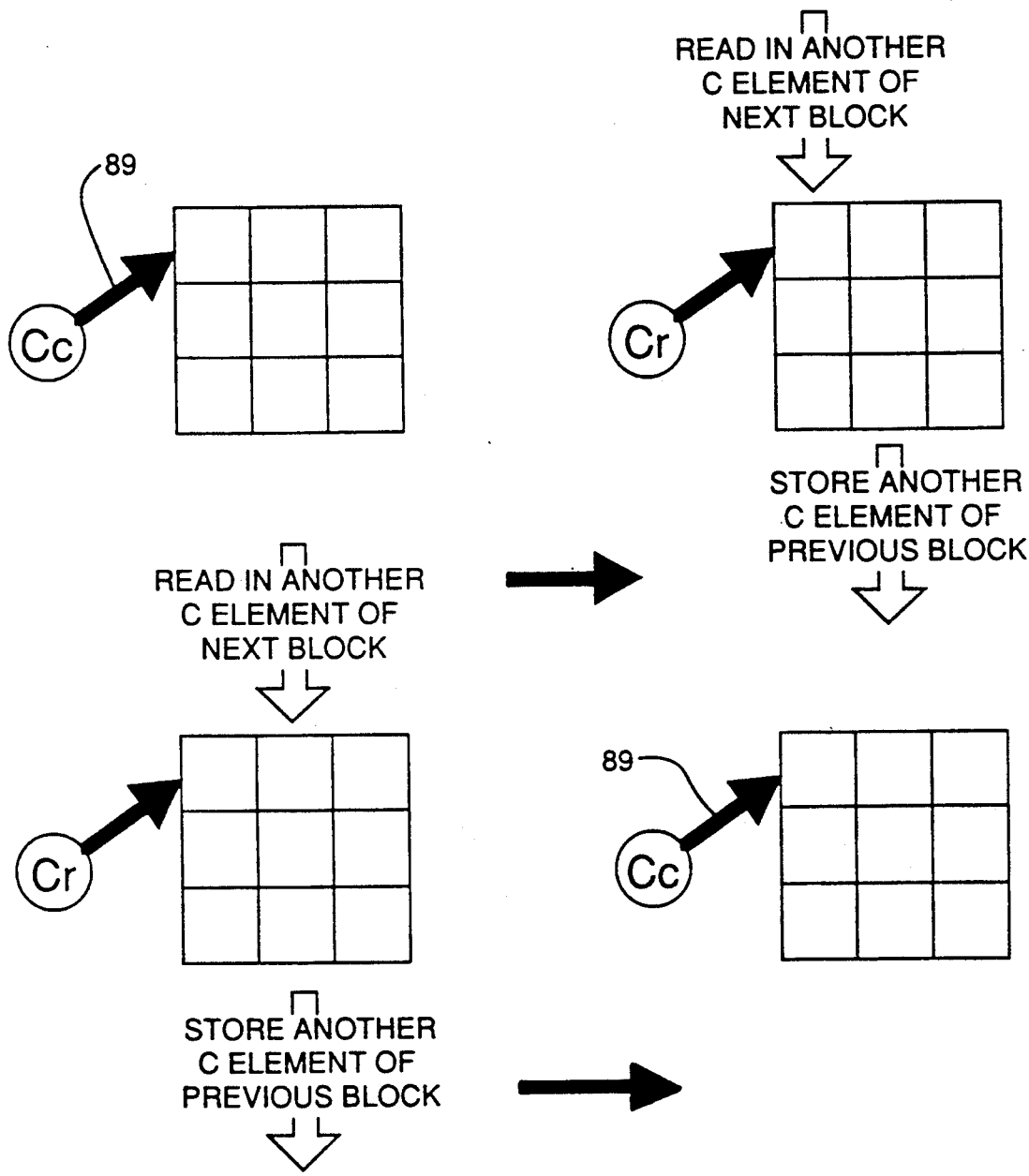
FIG. 8 illustrates the double buffering of the result matrix blocks.

FIG. 8 shows this double buffering. The elements of the next and previous result matrix blocks are retrieved and written respectively at the same intervals as the first and second term matrices are retrieved (e.g., before or during operation i, ii and iii of FIG. 5). In this way, the next whole result matrix block will be retrieved once the current block has been operated upon, and pointer 89 may then be updated in order to start operating on this next whole result matrix block. If writes of this result buffer are performed before reads, the same buffer may be used to store both the elements fetched in and those to be written out.

Figure 9:
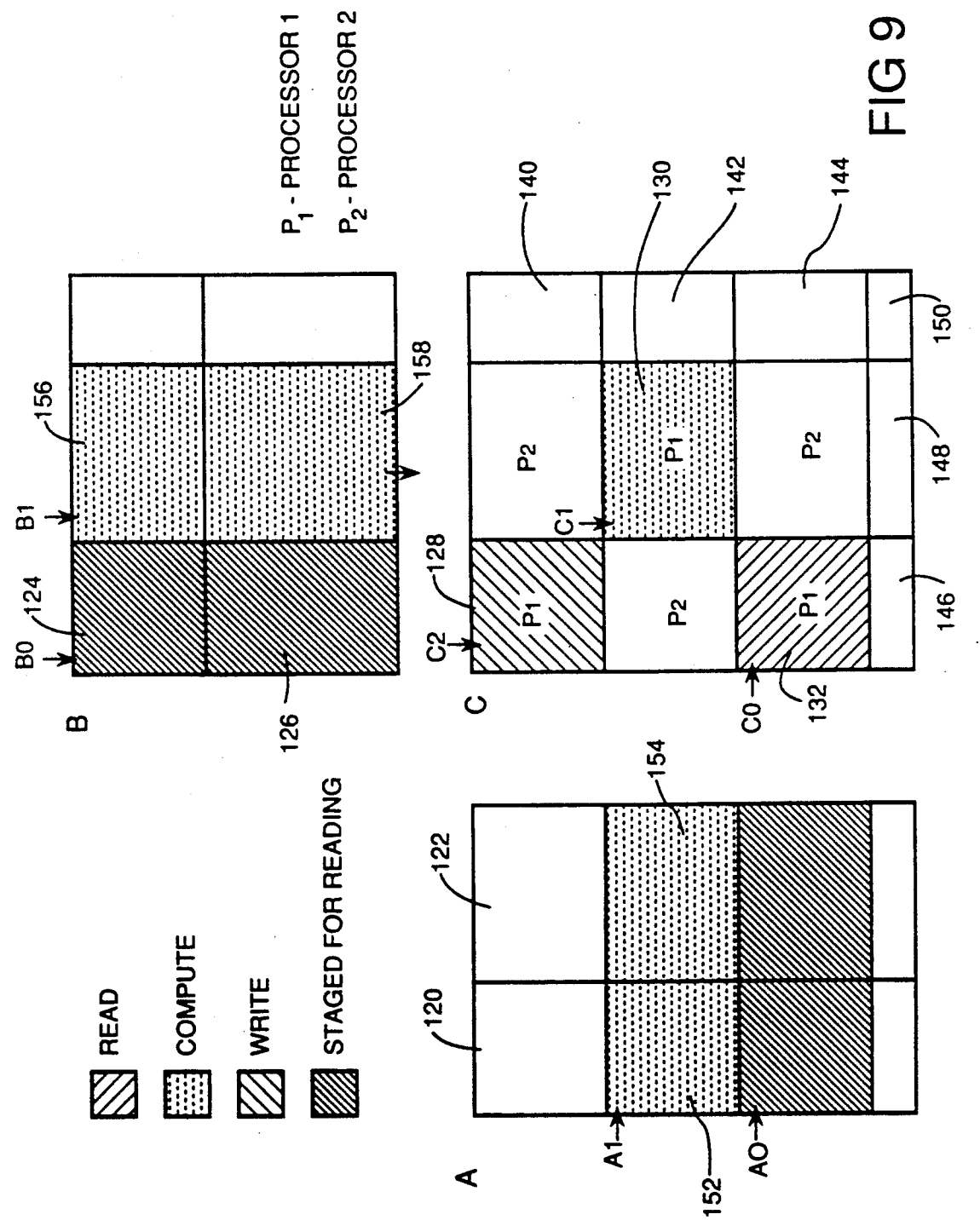
FIG. 9 is a diagram showing a possible allocation of matrix blocks to two processors.
Figure 10:
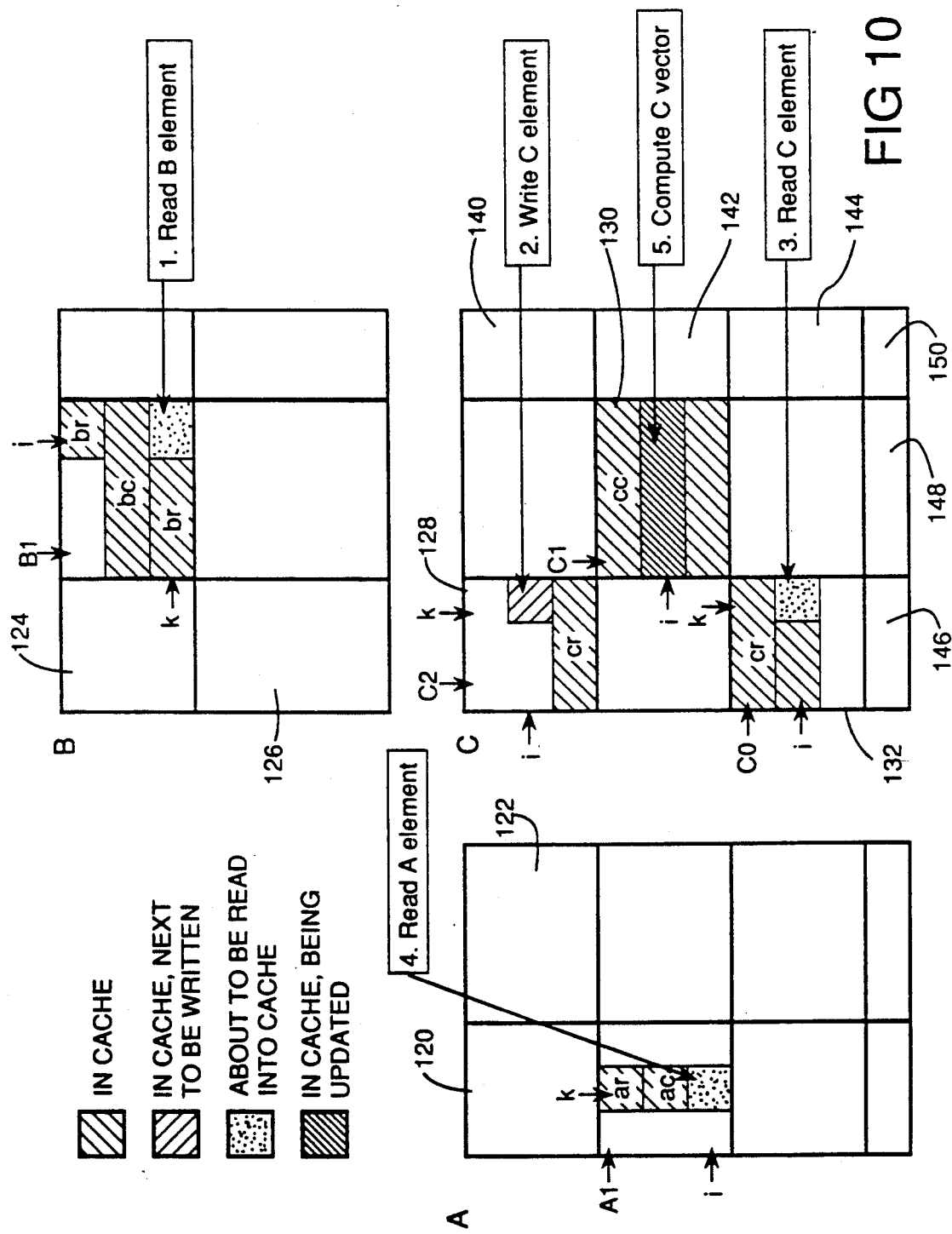
FIG. 10 is a diagram showing the status of selected blocks during the operation of the method of the invention.
Figure 11:
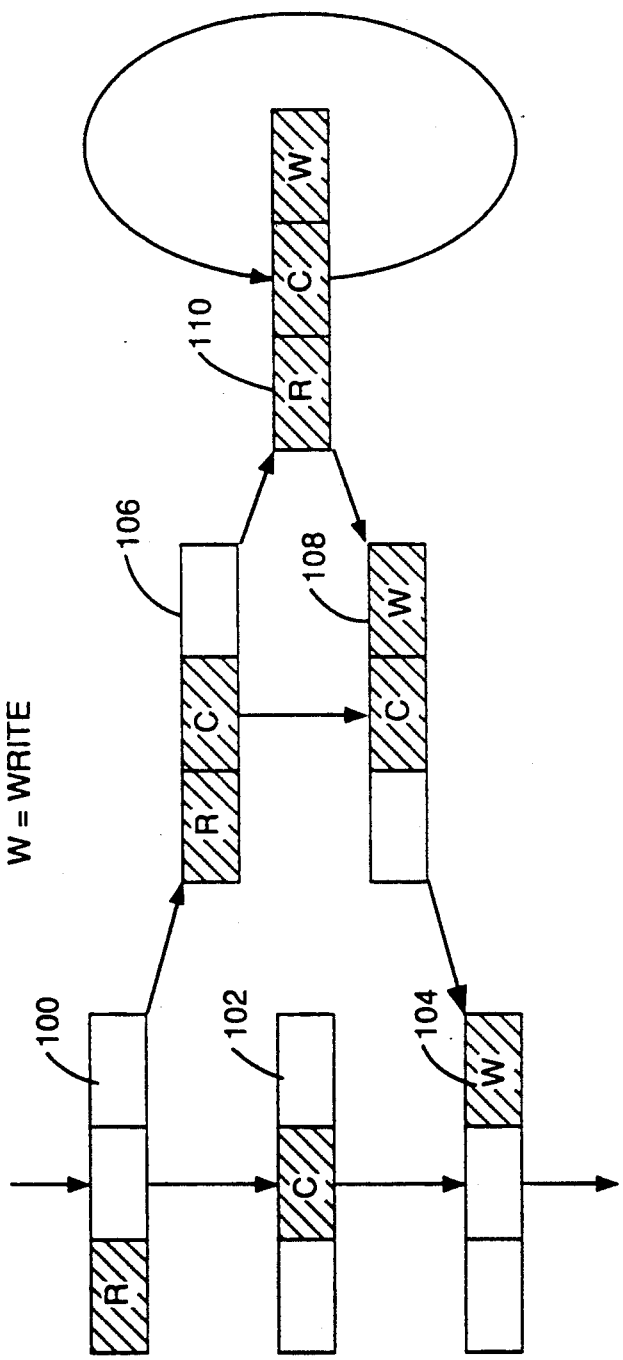
FIG. 11 is a state diagram illustrating the overlap of operations different situations.

The double buffering of the result matrix blocks may be further understood in conjunction with FIGS. 9, 10 and 11. In FIG. 9, an exemplary choice of matrix block allocations to processors is shown. Blocks marked with P1 are to be processed by one processor and blocks marked with P2 are to be processed by another processor. There could be more processors, of course.

The first operation performed by processor P1 will be to generate the result matrix block 128 from the top row (blocks 120, 122) of matrix A and the first column (blocks 124, 126) of matrix B, using the sum of outer products as described earlier. The second and third operations for processor P1 will be to generate result matrix blocks 130 and 132, respectively.

The situation illustrated in FIG. 9 is of the status of the method while it is computing the outer products for result matrix block 130. A pointer C1 points to result matrix block 130, and is used to access that block. Similar pointers are used to point to other blocks in the first term, second term and result matrices. Not only do the pointers that indicate the locations in the cache of the operands and results have to be updated, but the pointers (A1, B1, C0, etc.) that are used to determine where the contents of these cache storage locations are to be loaded from or written to must also be updated. This pointer update is performed when a processor starts to perform computations on a new matrix block.

The elements of result matrix block 130 were read into cache storage during the computation of result elements of block 128, in an interleaved manner as described earlier. The result elements 128 are now being transferred from the cache into their final destination in memory, as a second block of result elements 130 is being computed. Also taking place during the computation of this second block of result elements, are reads of the next result matrix block 132.

The resulting sequence of operations includes computations interleaved with reads and writes as follows:
1. Read one b element.
2. Write one c element.
3. Read one c element.
4. Read one a element.
5. Compute one vector of outer product.

This overall sequence is illustrated in more detail in FIG. 10.

It should also be apparent that all of the forms of interleaving are not always happening. This is true at the end and beginning of the computations. If only one result matrix block is being processed by an individual processor, there will be no reason to fetch any further operands, for example. FIG. 11 is a state diagram which illustrates this.

Upon startup of the method, only reading takes place, as no values are available for computation. This state is represented by the box 100. If no further result matrix blocks are to be processed, computations are performed on the read values, as represented by box 102. The results are then written out as represented by box 104.

If consecutive blocks are processed, reading and computations will take place at the same time, as represented by box 106. If only two blocks are processed, the results of the first computations will be written out at the same time that the computations on the second block take place. This situation corresponds to box 108. If more than two blocks are being processed consecutively, writing, reading and computations will all take place simultaneously corresponding to box 110. This situation may continue for as long as there are matrix blocks to process.

From the above discussion it might seem that smaller block sizes would make the method more efficient, as more time would be spent in the situation of box 110, where three operations are being performed at once. This advantage is offset by the latency involved with the fetch of each block, and hence a compromise block size needs to be found. This block size will be also be constrained by the amount of cache or other high-level storage available to the processor. On an Alliant FX/2800, it was found that a block size of about 20×20 elements was efficient for 64 bit precision.

It will be remarked that the end matrix blocks 140, 142, 144 and the bottom matrix blocks 146, 148, 150 of the result matrix of FIGS. 9 and 10 are not square. This is necessary if arbitrary matrix sizes are to be accommodated, as not all matrices will divide evenly into square blocks. Similar methods with fetch overlapping may be used for these blocks, but the full benefit will not be obtained. However, since these remainder blocks will typically represent small percentages of the matrix, the savings will not represent a large portion of the overall time taken to compute the matrix product, and hence it may be acceptable to use conventional methods on these blocks.

It is useful to schedule these remainder blocks after the regular blocks so that the largest ones are computed first, as the subroutine will tend to finish earlier. This may be seen in connection with FIG. 12. FIG. 12a is an example of a well sequenced scheduling of result matrix blocks for the matrix of FIG. 9. The larger bars 160 represent the time taken to compute the regular matrix result matrix blocks (e.g., 128, 130 of FIG. 9). The smaller bars 162, 164 and 166 represent the time taken to compute the remainder matrix blocks (e.g., 142, 146 and 150 respectively). It can be seen that if the blocks are processed in order of size, the blocks will be well distributed between processors P1 and P2.

FIG. 12b illustrates what might happen if this size-dependent sequencing was not used. From this diagram, it can be seen that some orderings exist that lead to less even distribution of the tasks between processors, and that resulting execution times may be longer ($T_2 > T_1$)

The matrices described herein have tended to be quite small, to simplify the explanation of the invention efficiently. However, real applications where this technique is of most value involve much larger matrices than those described in detail herein. Matrices with thousands of rows and columns are not uncommon.

For the purpose of describing the invention more fully, two computer programs have been included in this document. The first is an illustrative program written in the style of the well-known C programming language. This incomplete program is not intended to be directly compiled and run, only to be used as an aid in understanding the invention. An actual implementation of the method of the invention in the form of a program primarily written in assembly language (with some FORTRAN) for an Alliant FX/2800 computer is included in Appendix A. Assembly language was chosen for the final implementation as it permits the programmer to implement the method in a manner that will lead to the most efficient operation on a specific machine.

The illustrative C language program is now described. This program is a matrix update procedure which performs the matrix update operation $C = A \times B + C$. It accepts as parameters matrices in the form of arrays of floating point elements (A, B and C), their leading offset dimensions (lda, ldb, ldc), and their dimensions (N1, N2, N3). The leading offset dimensions are included to allow for offset in the case where one or more of the matrices operated upon are to be submatrices of larger matrices. This feature is useful in performing operations on parts of matrices, such as Gaussian elimination. The program needs these leading dimensions in order to manipulate the matrix array indices. The matrix dimension N1 is the number of rows in the A and C matrices, N2 is the number of columns in the B and C matrices, and N3 is the number of columns in the A matrix which is the same as the number of rows in the B matrix.

The first portion of the C program includes variable initialization statements (see below). I, J, i, j, and k are loop counters. n1 is the block size to be used for forming the matrix blocks. m1, m2, m3 represent the number of blocks in the dimensions N1, N2, N3 respectively. ac, ar, bc, br, cc, cr are pointers to the cache buffers used in double buffering the elements from matrix A, the rows from matrix B and the blocks from matrix C. The variables A0, A1, B0, B1, C0, C1 and C2 are pointers which are used to point to blocks to be operated upon in the A, B and C matrices which will remain in main memory. This initialization section follows.

```
mu  (A,lda,B,ldb,C,ldc,N1,N2,N3)
    int lda, ldb, ldc, N1, N2, N3;
    float A[N3] [LDA], B[N2] [LDB], C[N2] [LDC]

{
    int I, J, i, j, k;
    const int n1=?;              /* System dependent */
    int m1=N1/n1, m2=N2/n1, m3=N3/n1;
    cache float a[2], b[2] [n1], c[2] [n1] [n1];
    cache float ar, br[ ] [n1]=&b[0] [0],
        cr[ ] [n1] [n1]=&c[0] [0] [0];
    cache float ac, bc[ ] [n1]=&b[1] [0],
        cc[ ] [n1] [n1]=&c[1] [0] [0];
    float dum[n1] [LDC];
    float A0[ ] [LDC], A1[ ] [LDC]=dum;
    float B0[ ] [LDC], B1[ ] [LDC]=dum;
    float C0[ ] [LDC], C1[ ] [LDC]=dum, C2[ ] [LDC]=dum;
```

The rest of the program performs the multiplication operations on the matrices. It consists of five nested loops. Each iteration of the innermost loop (index j) computes one scalar-scalar product within an outer product and adds the result to the current result matrix block's cache calculation storage buffer cc. The cumulative effect of this loop is to compute a scalar-vector product, like that of part i, ii or iii of FIG. 5.

While performing this function, the fetch of an element of the next row of the term matrix block b is initiated. This element is stored in the retrieval storage buffer br. The storage of an element of the previous c matrix from retrieval buffer cr into main memory is also initiated. An element of the next c matrix block may now be retrieved into retrieval buffer cr, and the next c element may also be retrieved into retrieval buffer ar.

Once the scalar-vector product of the j loop has been computed, the pointers to the a buffers are swapped in order to point to the next element, and a further iteration of the surrounding i loop is started. The cumulative result of the i loop is to compute a complete outer product.

When a complete outer product is formed, the pointers to the row-sized b buffers are swapped in order to point to the next row using the exchange function (not shown), and the next outer product is computed. The k loop repeats these outer products until a complete series of outer products have been computed for the first pair of term matrix blocks (e.g., the operations on term matrix blocks 152 and 156 in the generation of result matrix block 130 in FIG. 9). This portion of the program is reproduced below.

```
for (I= 1<m1; I++)  {            /* Read, Compute, Write */
    A0 = &A[ ] [I*n1]
    for(J=0; J<m2; J++)  {
        B0 = &B[J*n1] [ ]
        C0 = &C[J*n1] [I*n1];
        for(k=0; k<n1; k++)  {
            for(i=0; i<n1; i++)  {
                br[i] = B1[J*n1+i] [k];
                C2[k] [i] = cr[k] [i];
                cr[k] [i] = C0[k] [i];
                ar = A1[k] [I*n1+i];
                for(j=0; j<n1; j++)
                    cc[j] [i] += ac*bc[j];
                ac=ar;
            }
            exchange (br,bc);
        }
```

A second k loop is then entered. This loop performs the same operations as the previous loop, with the exception of the fetches and writes to the c blocks, as these have already been performed. This second k loop finishes the outer products for the rest of the pairs of term matrix blocks (e.g., the operations on term matrix blocks 154 and 158 in the generation of result matrix block 130 in FIG. 9). The pointers to the matrix blocks cr, cc are now switched, so that the next matrix blocks may be processed.

```
for(k=nl; k<N3; k++) {
    for(i=0; l<nl; i++) {
        br[i] = B1[J*nl+i] [k];
        ar = A1[k] [I*nl+1];
        for(j=0; j<nl; j++)
            cc[j] [i] += ac*bc[j];
        ac = ar;
    }
    exchange (br,bc);
}
A1 = A0;
B1 = B0;
C2 = C1;
C1 = C0;
exchange (cr,cc);
}
```

In this simple illustrative example, the result matrix blocks are simply evaluated consecutively, by the same processor, and the above operation will be executed by the I and J loops until there is but one more block to process. At that point, the following code will execute. This code is similar to the above code except that it does not fetch elements of the next c block, since there is none.

```
for(k=0; k<nl; k++) {    /* Compute and write, but don't
                            read new C */
    for(i=0; i<nl; i++) {
        br[i] = B1[J*nl+i] [k];
        C2[k] [i] = cr[k] [i];
        ar = A1[k] [I*nl+i];
        for(j=0; j<nl; j++)
            cc[j] [i] += ac*bc[j];
        ac = ar;
    }
    exchange (br,bc);
}
for(k=nl; k<N3; k++)     /* Compute only */
{
    for(i=0; i<nl; i++) {
        br[i] = B1[J*nl+i] [k];
        ar = A1[k] [I*nl+i];
        for(j=0; j<nl; j++)
            cc[j] [i] += ac*bc[j];
        ac = ar;
    }
    exchange (br,bc);
}
for(k=0; k<nl; k++)  { /* Write last result, no
                          compute or read */
    for(i=0; i<nl; i++) {
        C1[k] [i] = cc[k] [i];
    }
}
}
```

The above program is not complete, for lack of a number of functions. It does not schedule the different blocks to different processors and it does not handle the remainder blocks, for example. For more extensive details of the operation of these missing functions, the assembly language program of appendix A and/or the following description of its associated flowchart may be consulted.

The flowchart generally outlining the assembly language program of appendix A is to be found in FIGS. 13-27. Some parts of the flowchart are continuous across pages, and where this is the case, a numbered pentagonal symbol indicates that the flowchart is to be continued on the next page.

Figure 13:
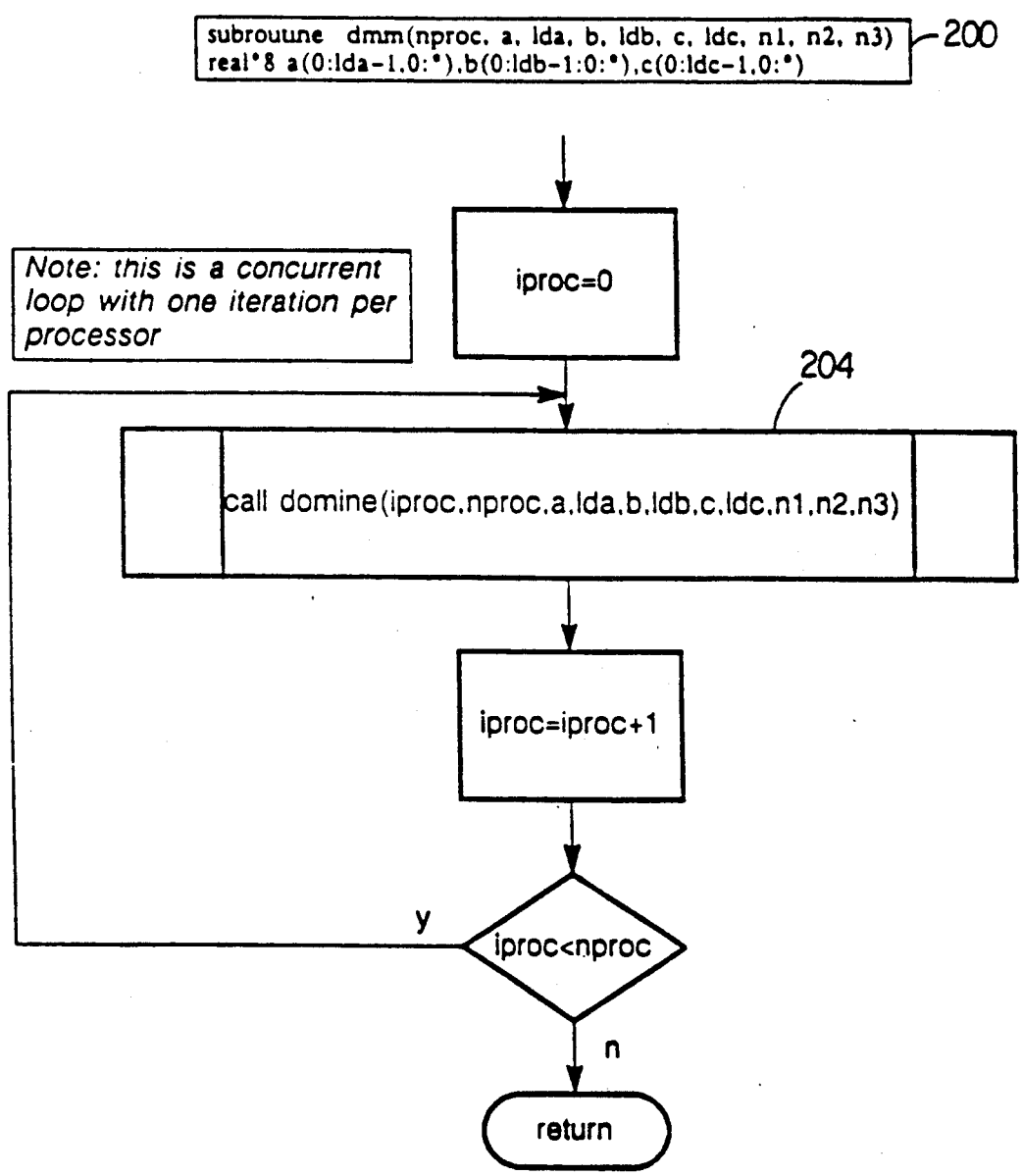
FIGS. 13-27 are a flowchart for an implementation of the method of the invention, corresponding to the FORTRAN and assembly language program of appendix A.

The first figure of the flowchart, FIG. 13, is the overall body of the subroutine dmm (Double precision Matrix Multiply). The portion of the subroutine on this page distributes the work to several processors. As may be seen from flowchart item 200, this subroutine takes the same arguments as the above illustrative C language-style program. These parameters are passed on to separate processors, by calling the subroutine domine in item 204 for a different processor in each iteration of the loop. The loop counter iproc is included in the call and is indicative of the number of the processor to which the call is being made. When each processor is called, it also receives an argument indicating the number of processors that are being used for the matrix multiplication, nproc.

Figure 14:
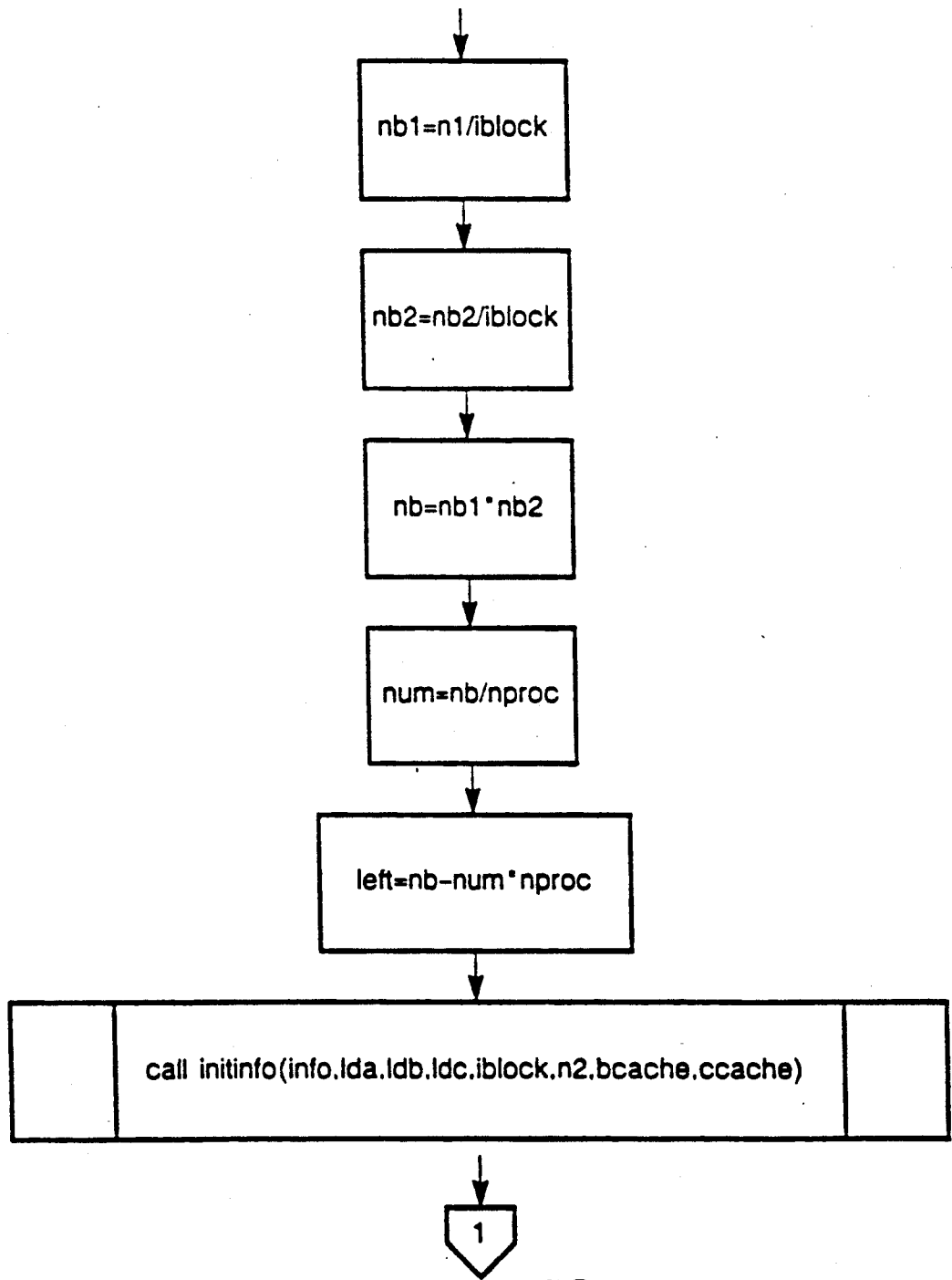

FIGS. 14-18 illustrate the subroutine domine. Each call to domine is executed on a different processor. Therefore, the domine subroutine must be reentrant. The Alliant FX/2800 does not distinguish reentrant and recursive subroutines, and thus the subroutine domine is declared as being recursive. Referring to FIG. 14, the subroutine first initializes variables which includes calling a subroutine initinfo, a subroutine that initializes a general-purpose data storage block, info. This data block contains a variety of variables to be used throughout the program.

Figure 15:
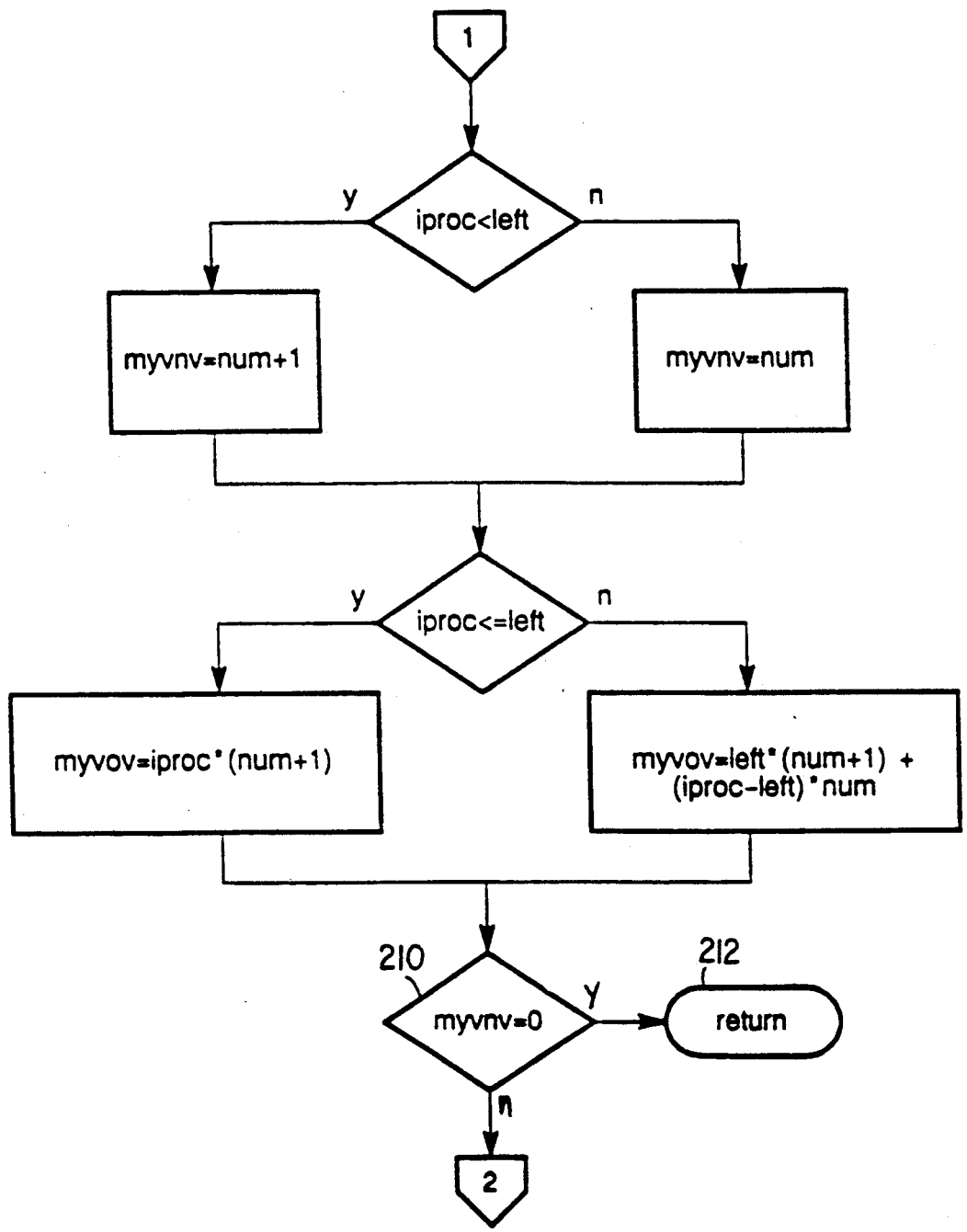

The subroutine domine continues in FIG. 15, where it determines which blocks the current processor is to work on. This information is derived from the processor's own processor number iproc, the number of processors nproc, and the block size iblock, (20 in this program). If the number of processors does not divide into the number of blocks evenly, then the first processors will work on the extra remaining blocks. Each processor determines whether it is to work on remainder blocks using the variables left and num. From the above information, the subroutine derives the variables myvov which is the starting block for that processor, and myvnv which is the number of blocks that processor is to process. If the myvnv is zero, which would happen in the case where there were fewer blocks than processors, the subroutine returns as shown in items 210 and 212.

Figure 16:
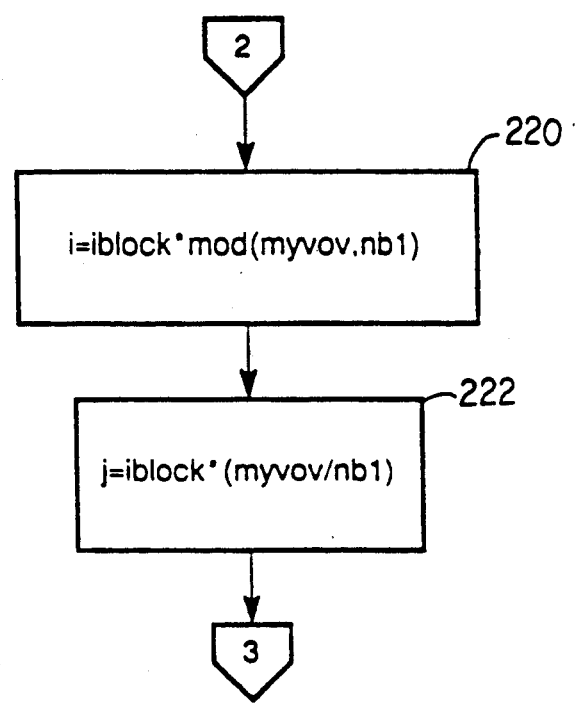

The next operation that the subroutine domine performs is to compute the index offsets into the matrices of the blocks that the processor it is to operate on. This is shown in FIG. 16, in items 220 and 222.

Figure 17:
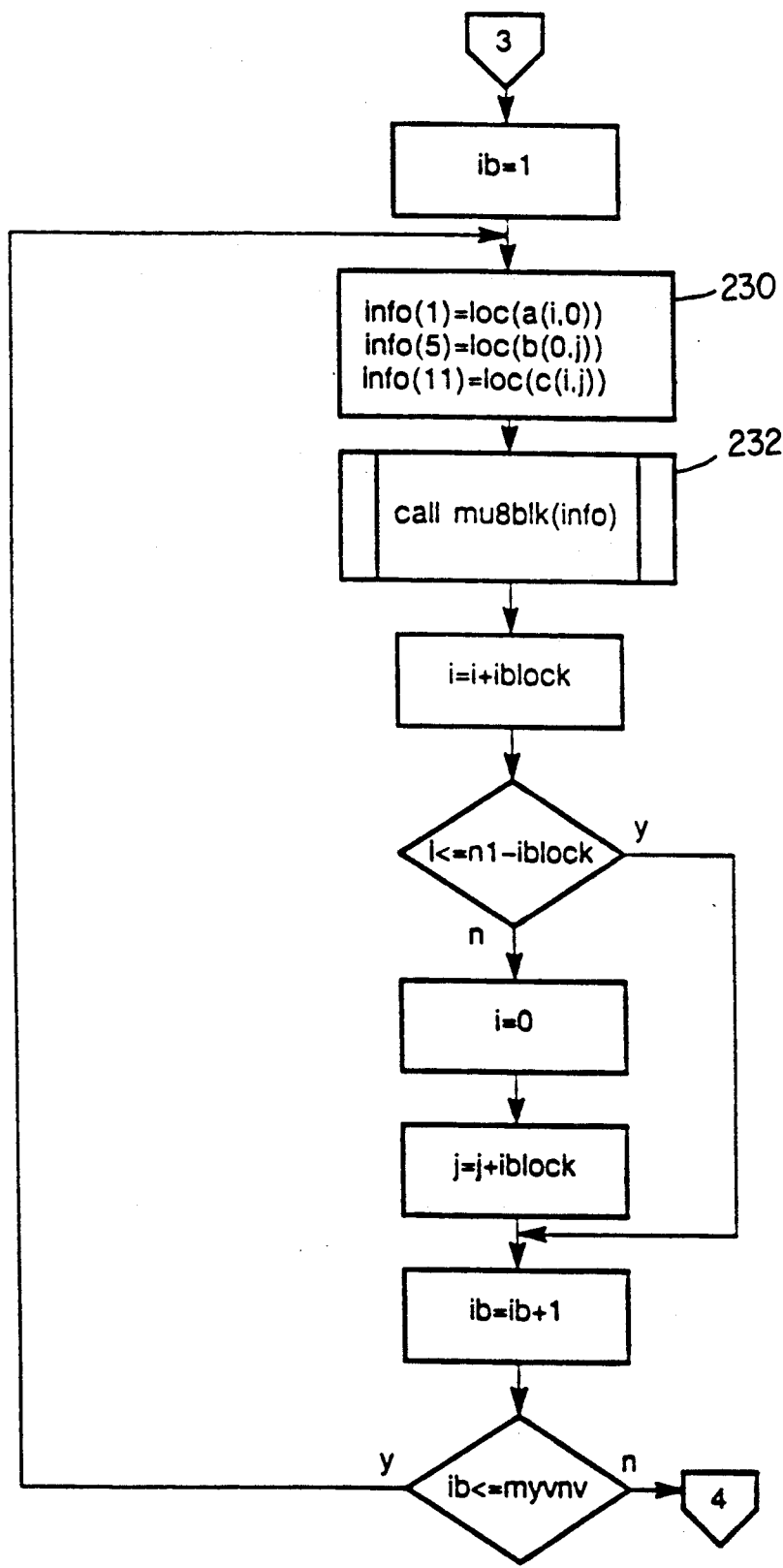
Figure 18:
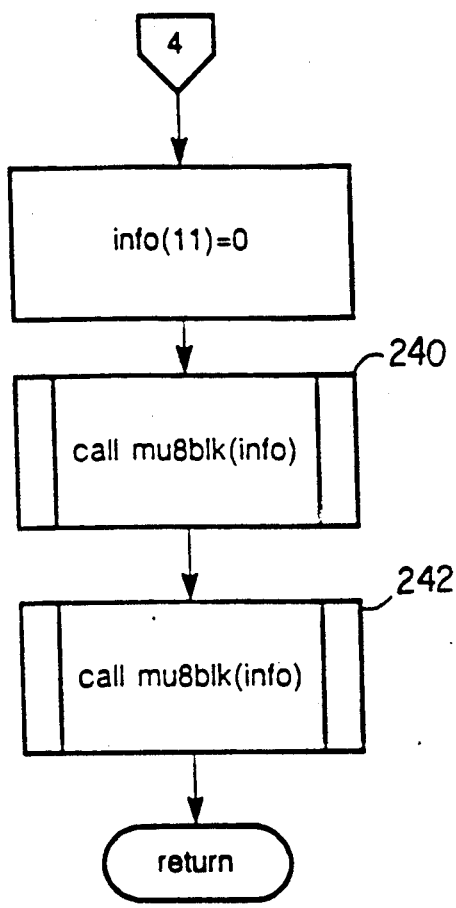

Referring now to FIG. 17, the processor now enters a loop. In this loop, the pointers to the blocks in the arrays to be operated on are found in item 230. The subroutine then calls a further subroutine mu8blk to perform the actual computations on each of the blocks. After each call to mu8blk, new index offsets are computed for the next matrix and the process is repeated. The loop is repeated once for each block. This is not sufficient to finish all of the operations to be performed on all of the blocks, as there will still be one iteration including computations and writing, and one final iteration for writing the last results. The subroutine must thus call mu8blk twice more, as shown in FIG. 18, items 240, 242. This time, new indices do not need to be calculated for storing the results. The subroutine domine then returns to its calling subroutine dmm.

Figure 19:
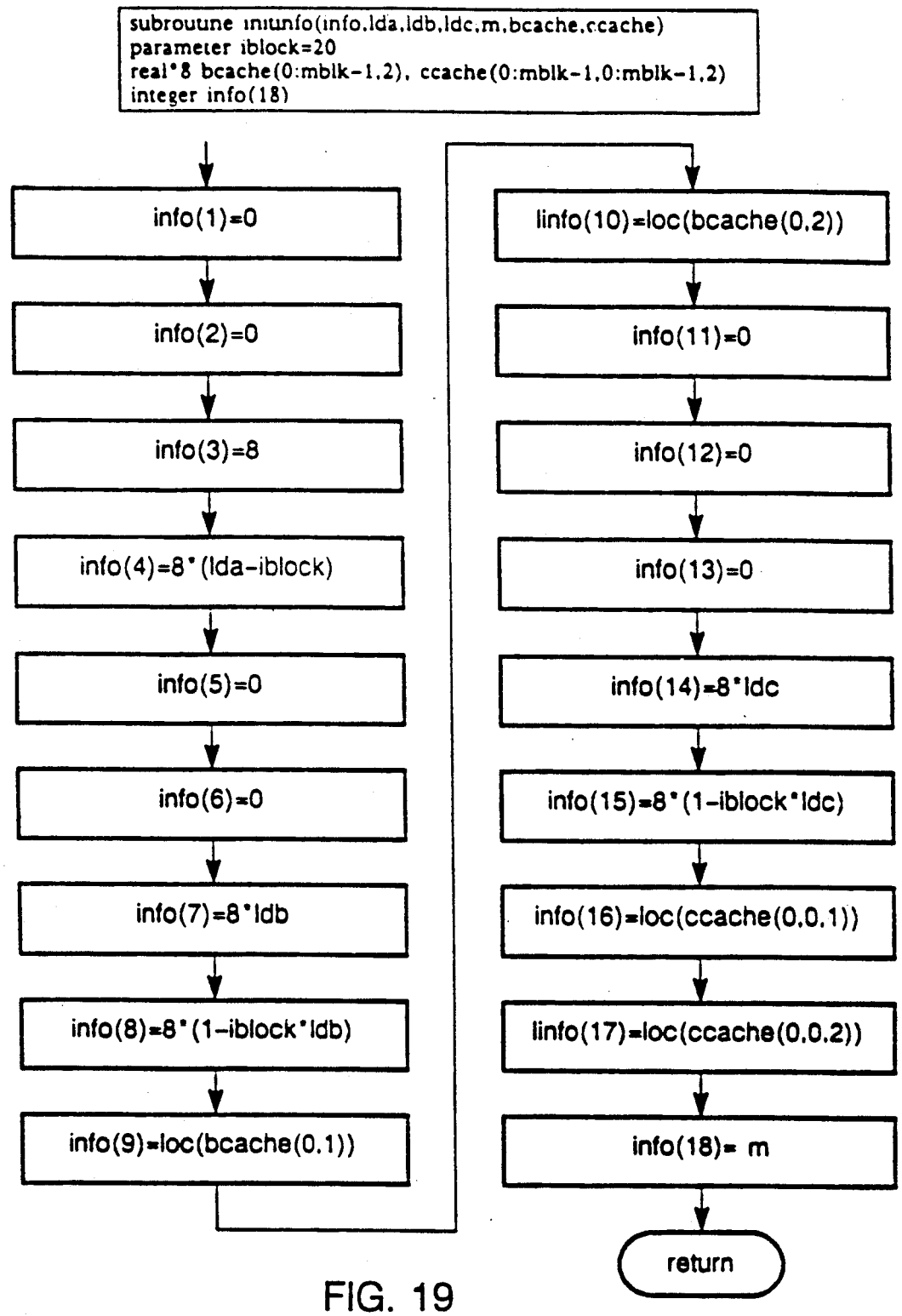
Figure 20:
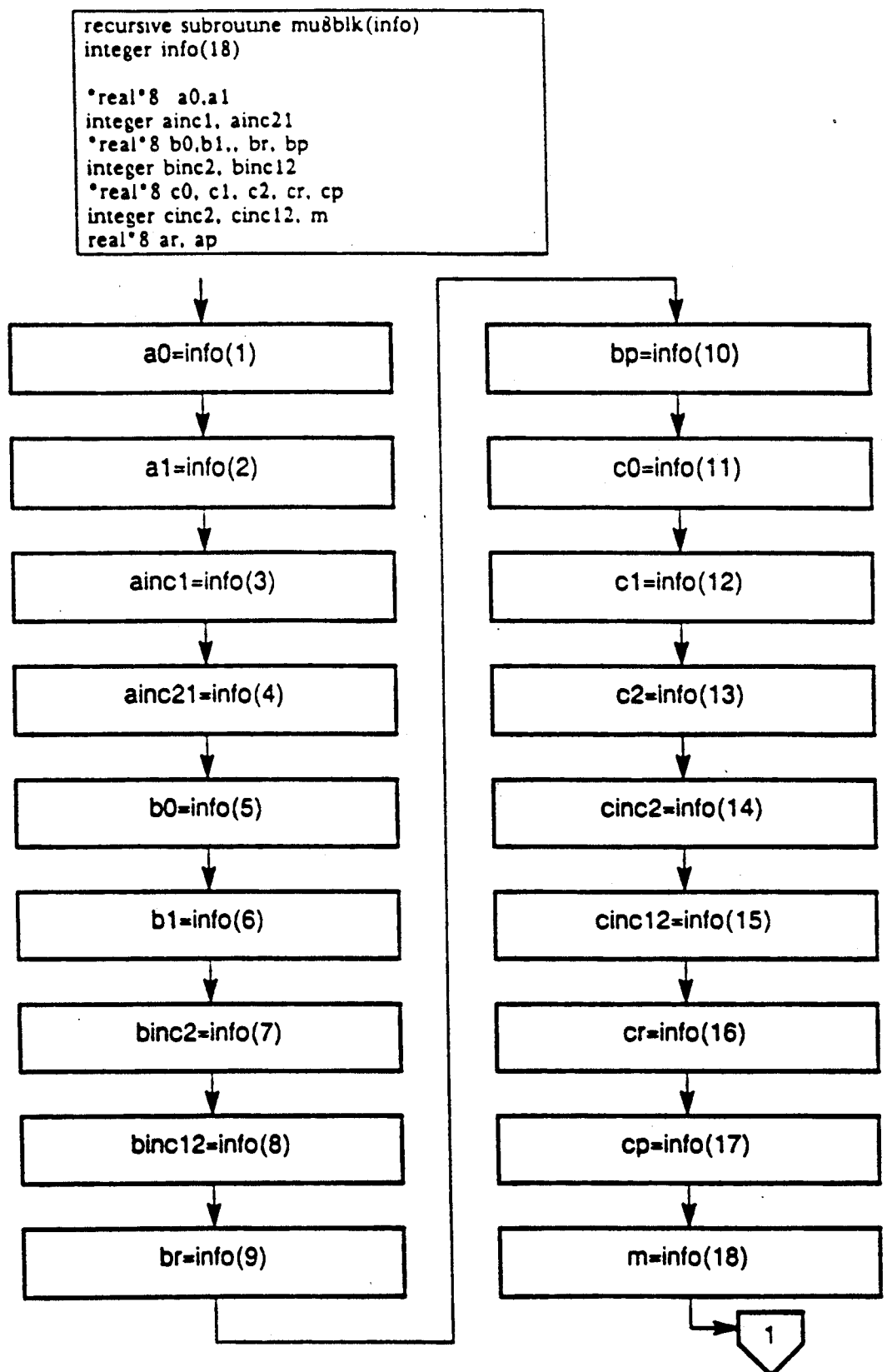

FIG. 19 shows the initinfo routine which initializes the info block. This info block contains several variables. The meanings of these variables are apparent from the beginning of the mu8blk subroutine where they are accessed successively. This is shown in FIG. 20. In this figure, a0, a1 are the pointers to the matrix blocks in the matrix arrays. ainc1 and ainc21 are offset values which allow the program to step through the matrices. Similar values exist for the B and C matrices also. cr, cp, br and bp are pointers to cache blocks. These correspond to the cache blocks of cr, cc, br, bc of the illustrative C-language style program.

Figure 21:
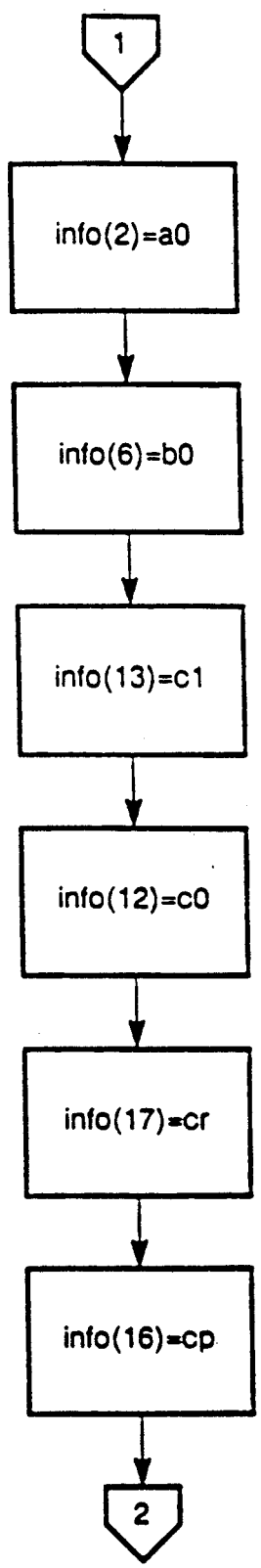

Referring now to FIG. 21, the subroutine sets up the pointers into the matrix for retrieving and storing elements in the next call to mu8blk.

Figure 22:
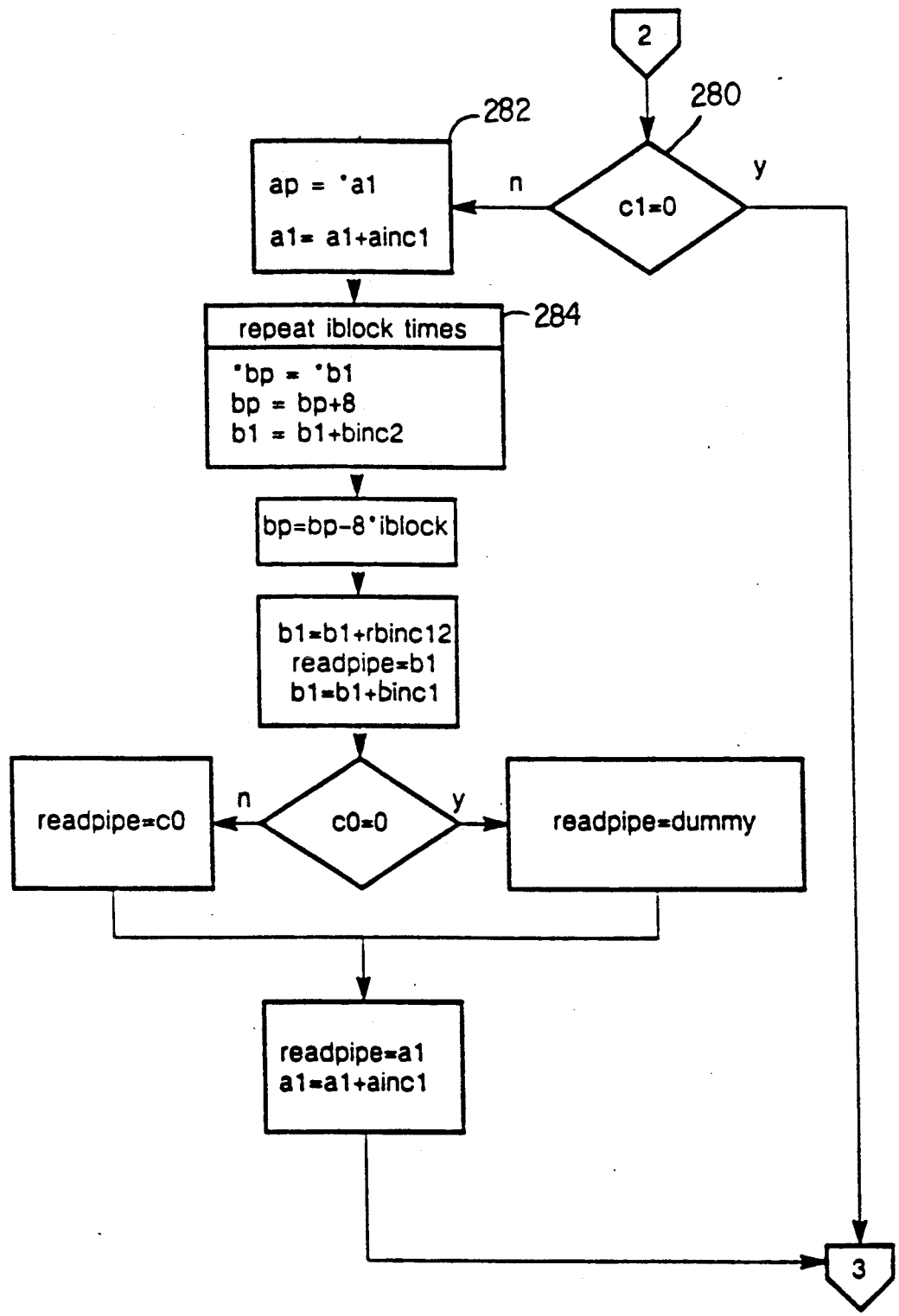

Upon starting operations on the blocks, the first elements are simply fetched, as there are no multiplications to interleave these fetches with. This is shown in FIG. 22. the pointer C1 is checked for a value of zero in item 280. A zero value, which cannot be a valid pointer, indicates that there are not yet any values to calculate and that the initial fetch cycle should start. If, however, there is a computation, as signaled by C1 not equal to zero, the fetch of the first a element is performed in item 282, and the fetching of the first b row is performed in an unrolled loop, 284. Now that the first fetch has been performed, fetches of one element of each of A, B and C are initiated in preparation for computation.

Figure 23:
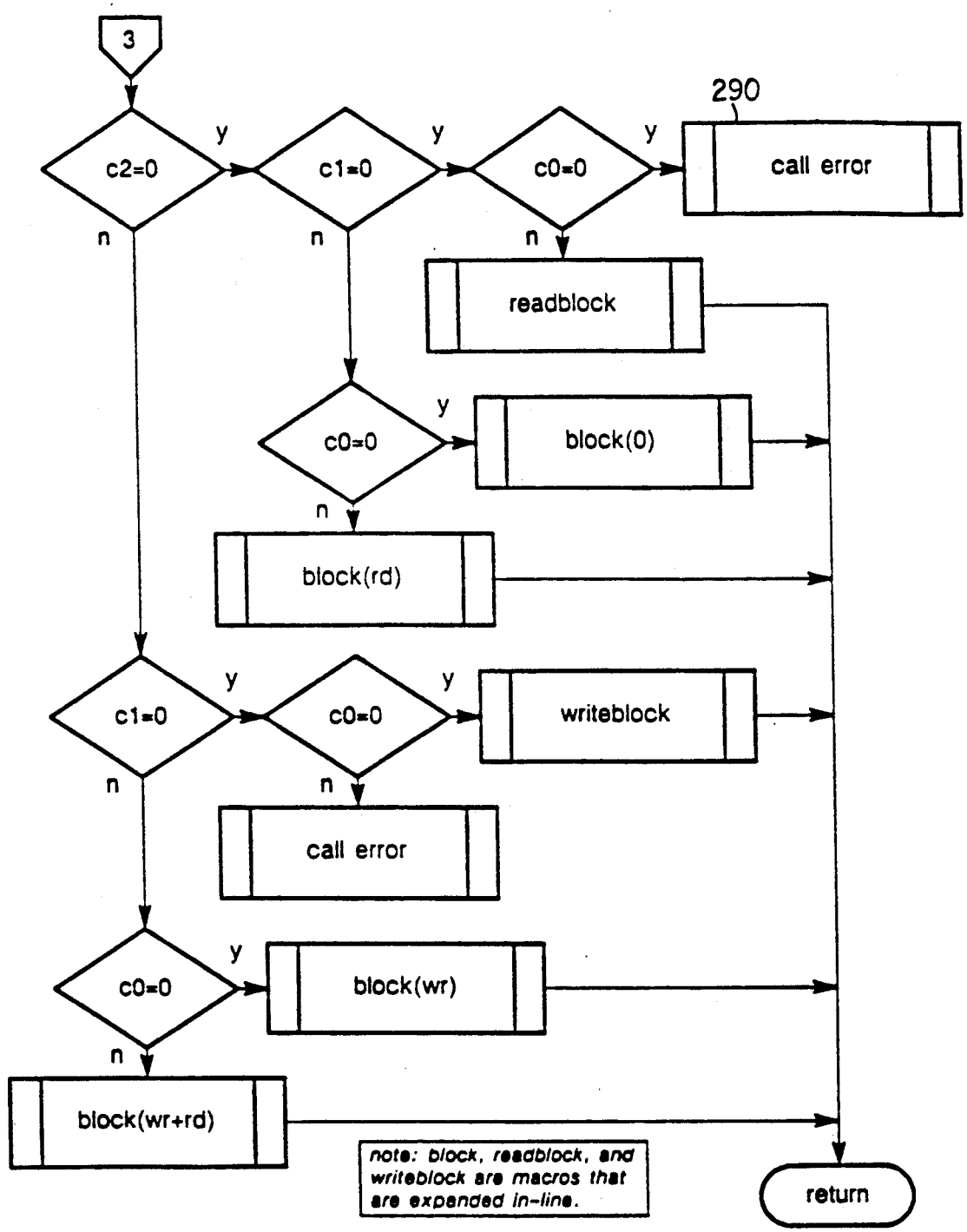
Figure 24:
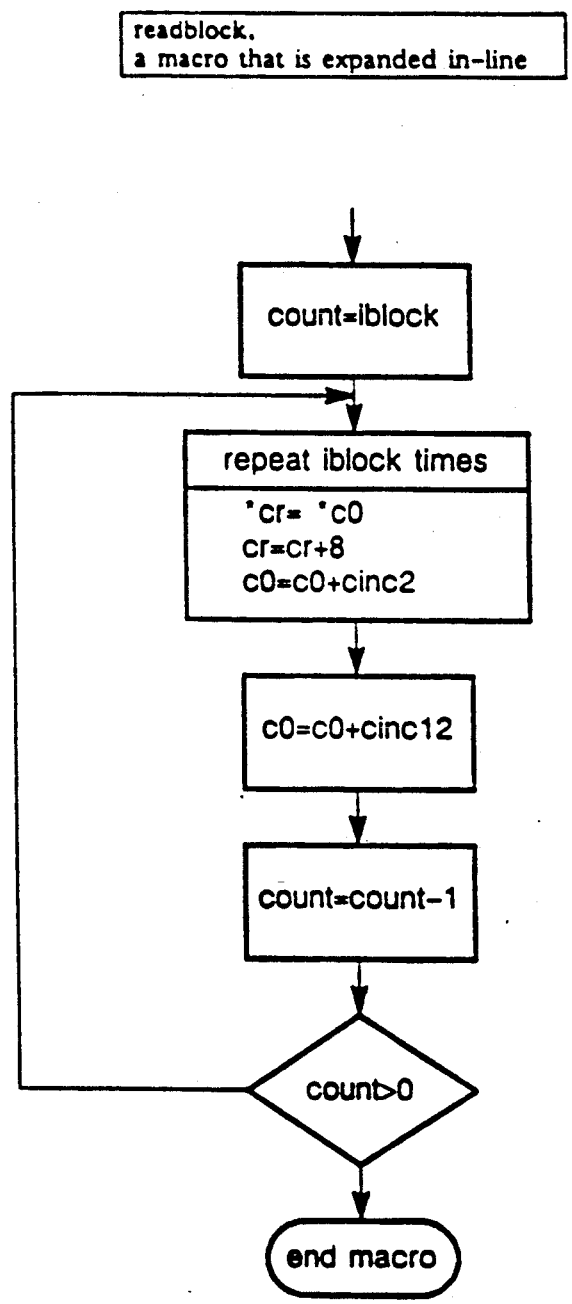

FIG. 23 shows a decision tree which determines which type of block operation to perform on the block. This determination is made based on zero values of the pointers C0, C1, C2. A zero C2 value indicates that no writes are to be performed, a zero C1 value indicates that no computations are to be performed, and a zero C0 value indicated that no fetch is to be performed. Depending on the permutations of the above pointer values, the corresponding operations are performed by one of three macros, readblock, writeblock, or block. Some values are illegal (e.g., block 290—"do nothing"), and lead to an error condition.

The first of the above three macros, readblock, (FIG. 24) fetches data from the area in the matrix pointed to by pointer C0, and puts it into the cache. This macro reads the first block in, before computations are performed.

The second of the above macros, writeblock, (FIG. 25) writes data from the cache block pointed to by cr into the area in the matrix pointed to by C2. This macro is responsible for writing out the last block, when there are no more computations to perform.

Figure 25:
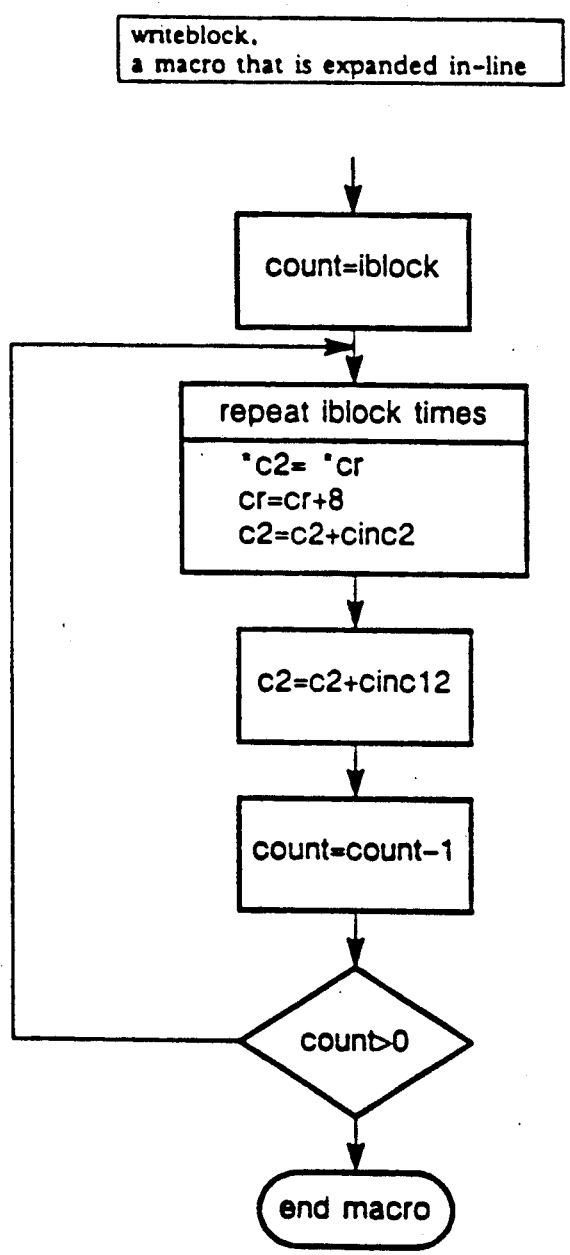

The third of the above macros, block, (FIG. 26) performs the actual multiplications and the reads and/or writes as applicable, depending on the parameter it was called with, in FIG. 25. Since this is really a macro and not a subroutine, the parameter will not be passed on to it, but rather it will determine which version of that macro is executed. All of these versions are condensed in FIG. 26, where the only difference between versions is indicated by the condition statements 320.

The inner item 322 of the macro performs the multiplications and the parallel fetching and/or writing that takes place while the multiplications are executing. Each pass computes one scalar-vector product, and fetches the operands for the next one. These operations actually share instructions, as the Alliant FX/2800 is capable of embedding certain categories of instruction within other types of instructions.

This scalar-vector operation is performed within a loop, the icount loop. The overall effect of the complete execution of this loop is the formation of an outer product.

This outer product loop is also embedded in a loop, the kcount loop. The overall effect of this loop is to perform all of the outer products necessary for a pair of term matrix blocks. This done, the pointers are updated to operate on the next pair of term matrix blocks, as shown in item 324.

Figure 26:
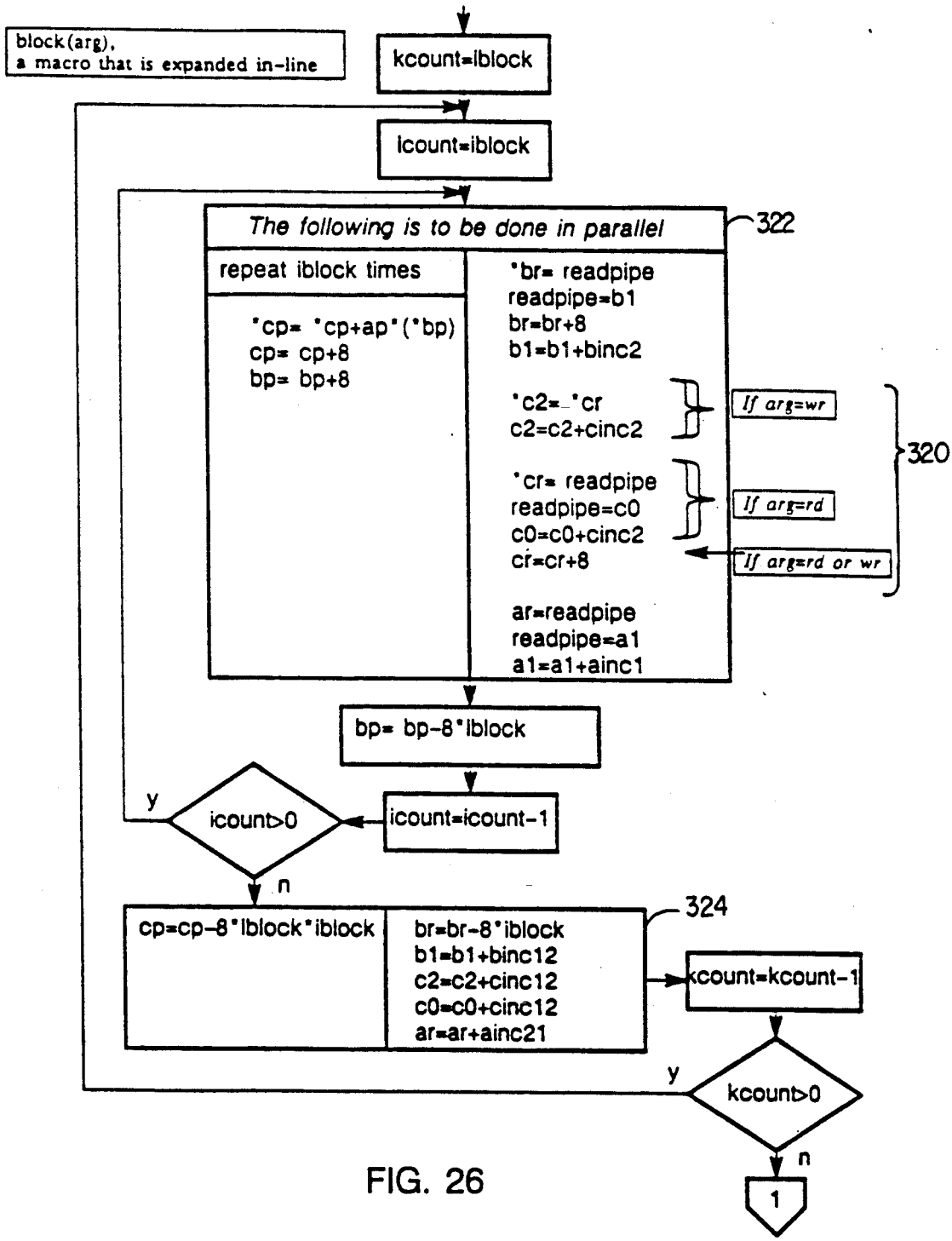
Figure 27:
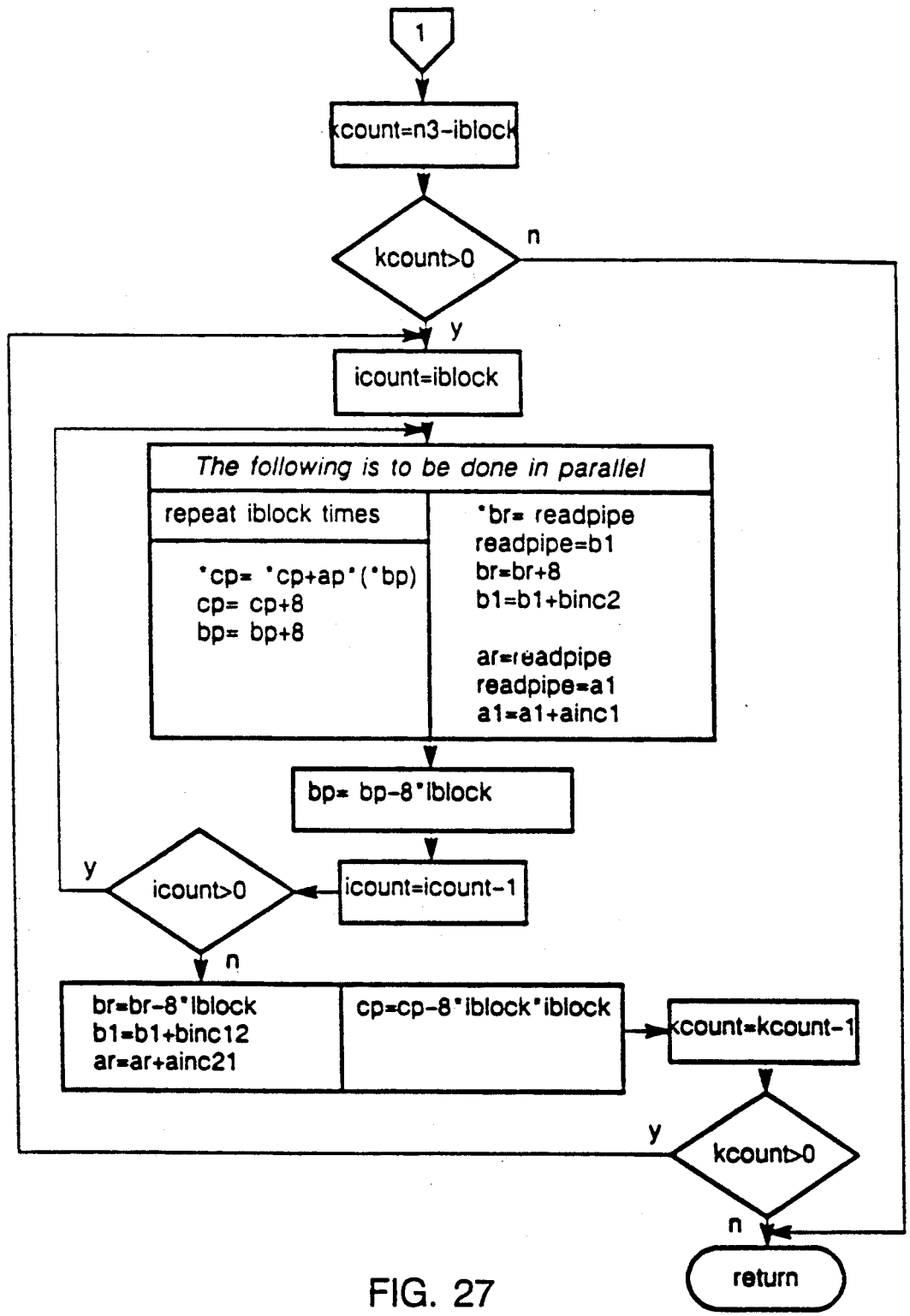

Now that the c matrix block has been read into the cache, there is no need to read it again, so the rest of the term matrix block pairs are computed in the loop of FIG. 27, which is similar to that of FIG. 26, except that it does not fetch or store the c elements into or from cache memory. The block macro now returns to the calling subroutine mu8blk, which also returns to its calling subroutine which returns to the main domine routine for that processor.

The assembly language program presented in appendix A generally follows the above-described flowchart, and it may be consulted for additional implementational details.

It is noted that, while the subroutine domine performs a deterministic, static allocation of blocks to processors, other allocations are possible, for example, dynamic self-scheduling, in which a processor completing a block selects the next block to be completed.

It is also noted that the flowchart and code for mu8blk allow for either or both of the term matrices A and B to be transposed. This is accomplished by performing a different initialization for the info parameter block. The increments found at elements 3, 4, 7, 8, 14 and 15 of the info block are adjusted accordingly.

It is further noted that this method can be used in conjunction with Strassen's technique or another asymptotic complexity reduction method, for multiplying large matrices. In this case, the technique would be applied to the matrix recursively until it was no longer efficient to do so. The resulting sub-matrices could then be tackled using the above-described procedure.

Other embodiments are within the scope of the following claims.

APPENDIX A

```
subroutine dmm(nproc,lda,a,b,c,n,m)
    real*8 a(0:lda-1,0:*),b(0:lda-1,0:*),c(0:lda-1,0:*)
cvd$ cncall
    do iproc=0,nproc-1
        call domine(iproc,nproc,lda,a,b,c,n,m)
    enddo
    return
    end
```

```
      recursive subroutine domine ( iproc, nproc, lda, a, b, c, n, m )
c
c   Each processor (given by  iproc ) in an Alliant complex of size  nproc
c   runs this subroutine to determine and do its share of blocks of a matrix
c   multiply-add  c = c + a*b, where all share the leading dimension lda,
c   a   is  n by m,  b  is  m by n, and  c  is therefore  n by n.
c
c   RESTRICTIONS:  n is an integer multiple of m
c                  m is 20
c
c Input arguments:
c    iproc    = current processor # (numbered from 0)
c    nproc    = total processors
c    lda      = leading dimension of a, b, and c
c    n        = number of rows of a, columns of b, and rows of c
c    m        = number of columns of a, rows of b, and columns of c
c    a        = matrix of leading dimension  lda  and dimension  n by  m
c    b        = matrix of leading dimension  lda  and dimension  m by  n
c
c Input/Output arguments:
c    c        = matrix of leading dimension  lda  and dimension  n by  n
c
c Local cacheable variables used by mu8blk
c    bcache, ccache, info
c
c External routines:
c    mu8ld:   (to be inlined)  simple fortran routine to isolate details of info
c    mu8blk:  (the magic)  cache pipelined 20 x 20 block processor
c
      real*8 a(0:lda-1,0:*),b(0:lda-1,0:*),c(0:lda-1,0:*)
      real*8 bcache(0:m-1,2),ccache(0:m-1,0:m-1,2)
      integer info(24)
c
c  nb   = number of blocks on a side
c  nb2  = total number
c  num  = minimum number each processor must take
c  left = number of processors that must take an extra block
      nb = n/m
      nb2 = nb*nb
      num = nb2/nproc
      left = nb2-num*nproc
c
      call initinfo(info,lda,m,bcache,ccache)
c
c Calculate the number of blocks to do (myvnv) and the first one to do (myvov)
      if (iproc.lt.left) then
        myvnv = num+1
      else
        myvnv = num
      endif
      if (iproc.le.left) then
        myvov = iproc*(num+1)
      else
        myvov = left*(num+1) + (iproc-left)*num
      endif
      if (myvnv.eq.0) return
c
c Initialize i and j
      i = m*mod(myvov,nb)
      j = m*(myvov/nb)
      print 98, iproc,myvnv, myvov, i,j
98    format (' iproc, myvnv, myvov, i, j:',5i5)

c------------------------------------------------------------------------
c Step 1: load first a, b, and c and push
      call mu8ld  ( info, loc(a(i,0)), loc(b(0,j)), loc(c(i,j)) )
      print 99, iproc,i,j,(k,info(k), k=1,18)
99    format
     & (' Processor # ',i2,' Running block i,j = ',2i4,' Info:'
     & /9(2(i3':',i16)/) )
      call mu8blk ( info )
c------------------------------------------------------------------------
c If there is only one block to do: push the pipe to advance it
      if (myvnv .eq. 1) then
        call mu8ld  ( info, 0, 0, 0 )
        print 99, iproc,i,j,(k,info(k), k=1,18)
        call mu8blk ( info )
```

```
c------------------------------------------------------------------
c------------------------------------------------------------------
c  If there 2 or more, push second a, b and c
      else
        i = i+m
        if (i.ge.n) then
          i = 0
          j = j+m
        endif
        call mu8ld   ( info, loc(a(i,0)), loc(b(0,j)), loc(c(i,j)) )
        print 99, iproc,i,j,(k,info(k), k=1,18)
        call mu8blk ( info )
c------------------------------------------------------------------
c------------------------------------------------------------------
c------------------------------------------------------------------
c  This loop pushes blocks 3 through the end (if any)
        do ib = 3, myvnv
          i = i+m
          if (i.ge.n) then
            i = 0
            j = j+m
          endif
          call mu8ld   ( info, loc(a(i,0)), loc(b(0,j)), loc(c(i,j)) )
          print 99, iproc,i,j,(k,info(k), k=1,18)
          call mu8blk ( info )
        enddo
c------------------------------------------------------------------
c------------------------------------------------------------------
c  Push the last block just entered to stage 2
        call mu8ld   ( info, 0, 0, 0 )
        print 99, iproc,i,j,(k,info(k), k=1,18)
        call mu8blk ( info )
      endif
c------------------------------------------------------------------
c  Push to empty last c
      print 99, iproc,i,j,(k,info(k), k=1,18)
      call mu8blk ( info )
c
      return
      end
      recursive subroutine mu8ld ( info, ia, ib, ic )
c  Stow the addresses provided into their secret slots
      parameter ia0=1, ib0=5, ic0=11
      integer info(24)
      info(ia0) = ia
      info(ib0) = ib
      info(ic0) = ic
c
      return
      end
         .mdefine         "ra0",          {r30}
         .mdefine         "ra1",          {r29}
         .mdefine         "raincl",       {r28}
         .mdefine         "rainc21",      {r27}
         .mdefine         "rb0",          {r26}
         .mdefine         "rb1",          {r25}
         .mdefine         "rbinc2",       {r24}
         .mdefine         "rbinc12",      {r23}
         .mdefine         "rbr",          {r22}
         .mdefine         "rbp",          {r21}
         .mdefine         "rc0",          {r20}
         .mdefine         "rc1",          {r19}
         .mdefine         "rc2",          {r18}
         .mdefine         "rcinc2",       {r17}
         .mdefine         "rinfo",        {r16}
         .mdefine         "rcinc12",      {r15}
         .mdefine         "rcr",          {r14}
         .mdefine         "rcp",          {r13}
         .mdefine         "rcps",         {r12}
         .mdefine         "ricount",      {r11}
         .mdefine         "rkcount",      {r10}
         .mdefine         "rnn3",         {r9}
         .mdefine         "rminus1",      {r8}
// Entry code
```

```
        .globl    _mu8blk_
_mu8blk_:
        adds      -72,sp,sp                    // move stack pointer
        st.l      fp,56(sp)                    // save old frame pointer
        adds      56,sp,fp                     // new frame pointer
        st.l      r1,4(fp)                     // save return address
// save registers
        fst.d     f2,-8(fp)
        fst.d     f4,-16(fp)
        fst.d     f6,-24(fp)
        st.l      r8,-28(fp)
        st.l      r9,-32(fp)
        st.l      r10,-36(fp)
        st.l      r11,-40(fp)
        st.l      r12,-44(fp)
        st.l      r13,-48(fp)
        st.l      r14,-52(fp)
        st.l      r15,-56(fp)
// fetch arguments
        ld.l      0(rinfo),ra0                 // a0 = loc(aa(i,0))
        ld.l      4(rinfo),ra1                 // previous a0
        ld.l      8(rinfo),rainc1              // aa dim1 byte increm.
        ld.l      12(rinfo),rainc21            // ainc2-19*ainc1
        ld.l      16(rinfo),rb0                // b0 = loc(bb(0,j))
        ld.l      20(rinfo),rb1                // previous b0
        ld.l      24(rinfo),rbinc2             // bb dim2 byte increm.
        ld.l      28(rinfo),rbinc12            // binc1-19*binc2
        ld.l      32(rinfo),rbr                // br = loc(bcache(0,1))
        ld.l      36(rinfo),rbp                // bp = loc(bcache(0,2))
        ld.l      40(rinfo),rc0                // c0 = loc(cc(i,j))
        ld.l      44(rinfo),rc1                // previous c0
        ld.l      48(rinfo),rc2                // previous c1
        ld.l      52(rinfo),rcinc2             // cc dim2 byte increm.
        ld.l      56(rinfo),rcinc12            // cinc1-19*cinc2
        ld.l      60(rinfo),rcr                // cr = loc(ccache(0,0,1))
        ld.l      64(rinfo),rcp                // cp = loc(ccache(0,0,2))
        ld.l      68(rinfo),rnn3               // nn3
// Advance block pipeline by storing block pointers
        st.l      ra0,4(rinfo)                 // a1 = a0
        st.l      rb0,20(rinfo)                // b1 = b0
        st.l      rc1,48(rinfo)                // c2 = c1
        st.l      rc0,44(rinfo)                // c1 = c0
        st.l      rcr,64(rinfo)                // cp = cr
        st.l      rcp,60(rinfo)                // cr = old cp adds      -1,r0,rminus1                // constant for bla instructions bte       0,rc1,label1                 // if (C1) then // Read first A1 element and first B1 row pfld.d    0(rb1),f0                    // b1(0,0)
        pfld.d    rbinc2(rb1)++,f0             // b1(0,1)
        pfld.d    rbinc2(rb1)++,f0             // b1(0,2)
        pfld.d    rbinc2(rb1)++,f28            // b1(0,3)
        pfld.d    rbinc2(rb1)++,f26            // b1(0,4)
        fst.d     f28,0(rbp)                   // bp(0)
        pfld.d    rbinc2(rb1)++,f28            // b1(0,5)
        fst.d     f26,8(rbp)                   // bp(1)
        pfld.d    rbinc2(rb1)++,f26            // b1(0,6)
        fst.d     f28,16(rbp)                  // bp(2)
        pfld.d    rbinc2(rb1)++,f28            // b1(0,7)
        fst.d     f26,24(rbp)                  // bp(3)
        pfld.d    rbinc2(rb1)++,f26            // b1(0,8)
        fst.d     f28,32(rbp)                  // bp(4)
        pfld.d    rbinc2(rb1)++,f28            // b1(0,9)
        fst.d     f26,40(rbp)                  // bp(5)
        pfld.d    rbinc2(rb1)++,f26            // b1(0,10)
        fst.d     f28,48(rbp)                  // bp(6)
        pfld.d    rbinc2(rb1)++,f28            // b1(0,11)
        fst.d     f26,56(rbp)                  // bp(7)
        pfld.d    rbinc2(rb1)++,f26            // b1(0,12)
        fst.d     f28,64(rbp)                  // bp(8)
        pfld.d    rbinc2(rb1)++,f28            // b1(0,13)
        fst.d     f26,72(rbp)                  // bp(9)
```

```
        pfld.d          rbinc2(rb1)++,f26       // b1(0,14)
        fst.d           f28,80(rbp)             // bp(10)
        pfld.d          rbinc2(rb1)++,f28       // b1(0,15)
        fst.d           f26,88(rbp)             // bp(11)
        pfld.d          rbinc2(rb1)++,f26       // b1(0,16)
        fst.d           f28,96(rbp)             // bp(12)
        pfld.d          rbinc2(rb1)++,f28       // b1(0,17)
        fst.d           f26,104(rbp)            // bp(13)
        pfld.d          rbinc2(rb1)++,f26       // b1(0,18)
        fst.d           f28,112(rbp)            // bp(14)
        pfld.d          rbinc2(rb1)++,f28       // b1(0,19)
        fst.d           f26,120(rbp)            // bp(15)
        pfld.d          0(ra1),f26              // a1(1,0)
        fst.d           f28,128(rbp)            // bp(16)
        pfld.d          rbinc12(rb1)++,f28      // b1(1,0)
        fst.d           f26,136(rbp)            // bp(17)

bte             0,rc0,label2            // if (C0) then
        pfld.d          0(rc0),f26              // c0(0,0)

br              label3                  // else
        nop                                     // delayed branch
label2:
// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE pfld.d          0(ra1),f26              // -- label3:                                         // end if

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE fst.d           f28,144(rbp)            // bp(18)
        fst.d           f26,152(rbp)            // bp(19)
        mov             rcp,rcps                // cps = cp label1:                                         // end if

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE bte             0,rc2,label4            // if (C2) then bte             0,rc1,label5            // if (C1) then
        bte             0,rc0,label6            // if (C0) then // * WRITE + Compute + READ * adds            19,r0,rkcount           // kcount = 19 (20 iter)

.align          8                       // align for dual instr. mode
// Pipeline Fill:
```

```
// j=0
        d.fnop
        fld.q       0(rbp),f8              // bp(0:1)
        d.fnop
        pfld.d      raincl(ral)++,f24      // ar = al(I*nl+i,k)

d.pfmul.dd  f24,f8,f0              // ap*bp(0), --
        fld.q       0(rcp),f20             // cp(0:1)
        d.fnop
        fld.q       16(rbp),f12            // bp(2:3)
        d.pfmul.dd  f24,f10,f0             // ap*bp(1), --
        nop
        d.fnop
        pfld.d      rbinc2(rb1)++,f28      // bl(k,J*nl+i)
// j=4
        d.pfmul.dd  f24,f12,f2             // ap*bp(2), ap*bp(0)
        fld.q       16(rcp)++,f16          // cp(2:3)
        d.pfadd.dd  f20,f2,f0              // cp(i,0)+ap*bp(0),--
        fld.q       32(rbp),f8             // bp(4:5)
        d.pfmul.dd  f24,f14,f2             // ap*bp(3), ap*bp(1)
        nop
        d.pfadd.dd  f22,f2,f0              // cp(i,1)+ap*bp(1),--
        fst.d       f28,0(rbr)             // br(i)

d.pfmul.dd  f24,f8,f2              // ap*bp(4), ap*bp(2)
        fld.q       16(rcp)++,f20          // cp(4:5)
        d.pfadd.dd  f16,f2,f0              // cp(i,2)+ap*bp(2),--
        fld.q       48(rbp),f12            // bp(6:7)
        d.pfmul.dd  f24,f10,f2             // ap*bp(5), ap*bp(3)
        nop
        d.pfadd.dd  f18,f2,f4              // cp(i,3)+ap*bp(3),cp(i,0)
        fld.d       0(rcr),f28             // cr(i,k)
// j=8
        d.pfmul.dd  f24,f12,f2             // ap*bp(6), ap*bp(4)
        fld.q       16(rcp)++,f16          // cp(6:7)
        d.pfadd.dd  f20,f2,f6              // cp(i,4)+ap*bp(4),cp(i,1)
        fld.q       64(rbp),f8             // bp(8:9)
        d.pfmul.dd  f24,f14,f2             // ap*bp(7), ap*bp(5)
        fst.q       f4,0(rcps)             // cp(i,0:1)
        d.pfadd.dd  f22,f2,f4              // cp(i,5)+ap*bp(5),cp(i,2)
        fst.d       f28,0(rc2)             // c2(i,k)

d.pfmul.dd  f24,f8,f2              // ap*bp(8), ap*bp(6)
        fld.q       16(rcp)++,f20          // cp(8:9)
        d.pfadd.dd  f16,f2,f6              // cp(i,6)+ap*bp(6),cp(i,3)
        fld.q       80(rbp),f12            // bp(10:11)
        d.pfmul.dd  f24,f10,f2             // ap*bp(9), ap*bp(7)
        fst.q       f4,16(rcps)++          // cp(i,2:3)
        d.pfadd.dd  f18,f2,f4              // cp(i,7)+ap*bp(7),cp(i,4)
        pfld.d      rcinc2(rc0)++,f28      // c0(i,k)
// j=12
        d.pfmul.dd  f24,f12,f2             // ap*bp(10), ap*bp(8)
        fld.q       16(rcp)++,f16          // cp(10:11)
        d.pfadd.dd  f20,f2,f6              // cp(i,8)+ap*bp(8),cp(i,5)
        fld.q       96(rbp),f8             // bp(12:13)
        d.pfmul.dd  f24,f14,f2             // ap*bp(11), ap*bp(9)
        fst.q       f4,16(rcps)++          // cp(i,4:5)
        d.pfadd.dd  f22,f2,f4              // cp(i,9)+ap*bp(9),cp(i,6)
        fst.d       f28,0(rcr)             // cr(i,k)

d.pfmul.dd  f24,f8,f2              // ap*bp(12), ap*bp(10)
        fld.q       16(rcp)++,f20          // cp(12:13)
        d.pfadd.dd  f16,f2,f6              // cp(i,10)+ap*bp(10),cp(i,7)
        fld.q       112(rbp),f12           // bp(14:15)
        d.pfmul.dd  f24,f10,f2             // ap*bp(13), ap*bp(11)
        fst.q       f4,16(rcps)++          // cp(i,6:7)
        d.pfadd.dd  f18,f2,f4              // cp(i,11)+ap*bp(11),cp(i,8)
        nop
// j=16
        d.pfmul.dd  f24,f12,f2             // ap*bp(14), ap*bp(12)
        fld.q       16(rcp)++,f16          // cp(14:15)
        d.pfadd.dd  f20,f2,f6              // cp(i,12)+ap*bp(12),cp(i,9)
        fld.q       128(rbp),f8            // bp(16:17)
        d.pfmul.dd  f24,f14,f2             // ap*bp(15), ap*bp(13)
        fst.q       f4,16(rcps)++          // cp(i,8:9)
        d.pfadd.dd  f22,f2,f4              // cp(i,13)+ap*bp(13),cp(i,10)
        nop
```

```
        d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)

d.fnop
        br              label8                  // start i loop
        d.fnop
        nop                                     // delayed branch
label17:                                        // top of k loop

// DEBUGGING CODE - LEAVING DUAL INSTRUCTION MODE fnop
        nop
        fnop
        nop
        nop                                     // set breakpoint here
        nop
// END DEBUG CODE - RETURNING TO DUAL INSTR MODE
// 19th I iteration // j=0
        d.pfadd.dd      f20,f2,f6               // cp(i,16)+ap*bp(16),cp(i,13)
        fld.q           0(rbp),f8               // bp(0:1)
        d.pfmul.dd      f24,f14,f2              // ap*bp(19), ap*bp(17)
        fst.q           f4,16(rcps)++           // cp(i,12:13)
        d.pfadd.dd      f22,f2,f4               // cp(i,17)+ap*bp(17),cp(i,14)
        pfld.d          rainc21(ra1)++,f24      // ar = a1(I*n1+i,k)

d.pfmul.dd      f24,f8,f2               // ap*bp(0), ap*bp(18)
        fld.q           16(rcp)++,f20           // cp(0:1)
        d.pfadd.dd      f16,f2,f6               // cp(i,18)+ap*bp(18),cp(i,15)
        fld.q           16(rbp),f12             // bp(2:3)
        d.pfmul.dd      f24,f10,f2              // ap*bp(1), ap*bp(19)
        fst.q           f4,16(rcps)++           // cp(i,14:15)
        d.pfadd.dd      f18,f2,f4               // cp(i,19)+ap*bp(19),cp(i,16)
        pfld.d          rbinc12(rb1)++,f28      // b1(k,J*n1+i)

// j=4
        d.pfmul.dd      f24,f12,f2              // ap*bp(2), ap*bp(0)
        fld.q           16(rcp)++,f16           // cp(2:3)
        d.pfadd.dd      f20,f2,f6               // cp(i,0)+ap*bp(0),cp(i,17)
        fld.q           32(rbp),f8              // bp(4:5)
        d.pfmul.dd      f24,f14,f2              // ap*bp(3), ap*bp(1)
        fst.q           f4,16(rcps)++           // cp(i,16:17)
        d.pfadd.dd      f22,f2,f4               // cp(i,1)+ap*bp(1),cp(i,18)
        fst.d           f28,8(rbr)++            // br(i)

d.pfmul.dd      f24,f8,f2               // ap*bp(4), ap*bp(2)
        fld.q           16(rcp)++,f20           // cp(4:5)
        d.pfadd.dd      f16,f2,f6               // cp(i,2)+ap*bp(2),cp(i,19)
        fld.q           48(rbp),f12             // bp(6:7)
        d.pfmul.dd      f24,f10,f2              // ap*bp(5), ap*bp(3)
        fst.q           f4,16(rcps)++           // cp(i,18:19)
        d.pfadd.dd      f18,f2,f4               // cp(i,3)+ap*bp(3),cp(i,0)
        fld.d           8(rcr),f28              // cr(i,k)

// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,16(rcps)++           // cp(i,0:1)
        d.pfadd.dd      f22,f2,f4               // cp(i,5)+ap*bp(5),cp(i,2)
        fst.d           f28,rcinc2(rc2)++       // c2(i,k)

d.pfmul.dd      f24,f8,f2               // ap*bp(8), ap*bp(6)
        fld.q           16(rcp)++,f20           // cp(8:9)
        d.pfadd.dd      f16,f2,f6               // cp(i,6)+ap*bp(6),cp(i,3)
        fld.q           80(rbp),f12             // bp(10:11)
        d.pfmul.dd      f24,f10,f2              // ap*bp(9), ap*bp(7)
        fst.q           f4,16(rcps)++           // cp(i,2:3)
        d.pfadd.dd      f18,f2,f4               // cp(i,7)+ap*bp(7),cp(i,4)
        pfld.d          rcinc12(rc0)++,f28      // c0(i,k)
```

```
// j=12
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        fst.d           f28,8(rcr)++            // cr(i,k)

d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
// j=16
        d.pfmul.dd      f24,f12,f2              // ap*bp(14), ap*bp(12)
        fld.q           16(rcp)++,f16           // cp(14:15)
        d.pfadd.dd      f20,f2,f6               // cp(i,12)+ap*bp(12),cp(i,9)
        fld.q           128(rbp),f8             // bp(16:17)
        d.pfmul.dd      f24,f14,f2              // ap*bp(15), ap*bp(13)
        fst.q           f4,16(rcps)++           // cp(i,8:9)
        d.pfadd.dd      f22,f2,f4               // cp(i,13)+ap*bp(13),cp(i,10)
        nop d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)
        d.pfadd.dd      f18,f2,f4               // cp(i,15)+ap*bp(15),cp(i,12)
        nop

// DEBUGGING CODE - LEAVING DUAL INSTRUCTION MODE fnop
          nop
        fnop
          nop
          nop                                   // set breakpoint here
          nop
// END DEBUG CODE - RETURNING TO DUAL INSTR MODE // K loop Body:

d.fnop
          mov           rbr,r31                 // swap br and bp
        d.fnop
          mov           rbp,rbr
        d.fnop
          adds          -152,r31,rbp            // and reset to 0th element.
// j=0
        d.pfmul.dd      f24,f12,f2              // ap*bp(18), ap*bp(16)
        fld.q           16(rcp)++,f16           // cp(18:19)
        d.pfadd.dd      f20,f2,f6               // cp(i,16)+ap*bp(16),cp(i,13)
        fld.q           0(rbp),f8               // bp(0:1)
        d.pfmul.dd      f24,f14,f2              // ap*bp(19), ap*bp(17)
        fst.q           f4,16(rcps)++           // cp(i,12:13)
        d.pfadd.dd      f22,f2,f4               // cp(i,17)+ap*bp(17),cp(i,14)
        pfld.d          raincl(ra1)++,f24       // ar = a1(I*n1+i,k)

d.pfmul.dd      f24,f8,f2               // ap*bp(0), ap*bp(18)
        fld.q           -3184(rcp)++,f20        // cp(0:1)
        d.pfadd.dd      f16,f2,f6               // cp(i,18)+ap*bp(18),cp(i,15)
        fld.q           16(rbp),f12             // bp(2:3)
        d.pfmul.dd      f24,f10,f2              // ap*bp(1), ap*bp(19)
        fst.q           f4,16(rcps)++           // cp(i,14:15)
        d.pfadd.dd      f18,f2,f4               // cp(i,19)+ap*bp(19),cp(i,16)
        pfld.d          rbinc2(rb1)++,f28       // b1(k,J*n1+i)
```

```
// j=4
        d.pfmul.dd      f24,f12,f2              // ap*bp(2), ap*bp(0)
        fld.q           16(rcp)++,f16           // cp(2:3)
        d.pfadd.dd      f20,f2,f6               // cp(i,0)+ap*bp(0),cp(i,17)
        fld.q           32(rbp),f8              // bp(4:5)
        d.pfmul.dd      f24,f14,f2              // ap*bp(3), ap*bp(1)
        fst.q           f4,16(rcps)++           // cp(i,16:17)
        d.pfadd.dd      f22,f2,f4               // cp(i,1)+ap*bp(1),cp(i,18)
        fst.d           f28,0(rbr)              // br(i)

d.pfmul.dd      f24,f8,f2               // ap*bp(4), ap*bp(2)
        fld.q           16(rcp)++,f20           // cp(4:5)
        d.pfadd.dd      f16,f2,f6               // cp(i,2)+ap*bp(2),cp(i,19)
        fld.q           48(rbp),f12             // bp(6:7)
        d.pfmul.dd      f24,f10,f2              // ap*bp(5), ap*bp(3)
        fst.q           f4,16(rcps)++           // cp(i,18:19)
        d.pfadd.dd      f18,f2,f4               // cp(i,3)+ap*bp(3),cp(i,0)
        fld.d           8(rcr),f28              // cr(i,k)
// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,-3184(rcps)++        // cp(i,0:1)
        d.pfadd.dd      f22,f2,f4               // cp(i,5)+ap*bp(5),cp(i,2)
        fst.d           f28,rcinc12(rc2)++      // c2(i,k)

d.pfmul.dd      f24,f8,f2               // ap*bp(8), ap*bp(6)
        fld.q           16(rcp)++,f20           // cp(8:9)
        d.pfadd.dd      f16,f2,f6               // cp(i,6)+ap*bp(6),cp(i,3)
        fld.q           80(rbp),f12             // bp(10:11)
        d.pfmul.dd      f24,f10,f2              // ap*bp(9), ap*bp(7)
        fst.q           f4,16(rcps)++           // cp(i,2:3)
        d.pfadd.dd      f18,f2,f4               // cp(i,7)+ap*bp(7),cp(i,4)
        pfld.d          rcinc2(rc0)++,f28       // c0(i,k)
// j=12
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        fst.d           f28,8(rcr)++            // cr(i,k)

d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
// j=16
        d.pfmul.dd      f24,f12,f2              // ap*bp(14), ap*bp(12)
        fld.q           16(rcp)++,f16           // cp(14:15)
        d.pfadd.dd      f20,f2,f6               // cp(i,12)+ap*bp(12),cp(i,9)
        fld.q           128(rbp),f8             // bp(16:17)
        d.pfmul.dd      f24,f14,f2              // ap*bp(15), ap*bp(13)
        fst.q           f4,16(rcps)++           // cp(i,8:9)
        d.pfadd.dd      f22,f2,f4               // cp(i,13)+ap*bp(13),cp(i,10)
        nop d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)

label8:                                         // init i loop

// DEBUGGING CODE - LEAVING DUAL INSTRUCTION MODE
```

```
            fnop
              nop
            fnop
              nop
              nop                                              // set breakpoint here
              nop
// END DEBUG CODE - RETURNING TO DUAL INSTR MODE // I loop Body:

d.fnop
              adds          17,r0,ricount              // icount = 17
            d.pfadd.dd      f18,f2,f4                  // cp(i,15)+ap*bp(15),cp(i,12)
              bla           rminus1,ricount,label13    // delayed branch, 18 iter
// j=0
            d.pfmul.dd      f24,f12,f2                 // ap*bp(18), ap*bp(16)
              fld.q         16(rcp)++,f16              // cp(18:19)

label13:
            d.pfadd.dd      f20,f2,f6                  // cp(i,16)+ap*bp(16),cp(i,13)
              fld.q         0(rbp),f8                  // bp(0:1)
            d.pfmul.dd      f24,f14,f2                 // ap*bp(19), ap*bp(17)
              fst.q         f4,16(rcps)++              // cp(i,12:13)
            d.pfadd.dd      f22,f2,f4                  // cp(i,17)+ap*bp(17),cp(i,14)
              pfld.d        raincl(ra1)++,f24          // ar = al(I*nl+i,k)

d.pfmul.dd      f24,f8,f2                  // ap*bp(0), ap*bp(18)
              fld.q         16(rcp)++,f20              // cp(0:1)
            d.pfadd.dd      f16,f2,f6                  // cp(i,18)+ap*bp(18),cp(i,15)
              fld.q         16(rbp),f12                // bp(2:3)
            d.pfmul.dd      f24,f10,f2                 // ap*bp(1), ap*bp(19)
              fst.q         f4,16(rcps)++              // cp(i,14:15)
            d.pfadd.dd      f18,f2,f4                  // cp(i,19)+ap*bp(19),cp(i,16)
              pfld.d        rbinc2(rb1)++,f28          // bl(k,J*nl+i)
// j=4
            d.pfmul.dd      f24,f12,f2                 // ap*bp(2), ap*bp(0)
              fld.q         16(rcp)++,f16              // cp(2:3)
            d.pfadd.dd      f20,f2,f6                  // cp(i,0)+ap*bp(0),cp(i,17)
              fld.q         32(rbp),f8                 // bp(4:5)
            d.pfmul.dd      f24,f14,f2                 // ap*bp(3), ap*bp(1)
              fst.q         f4,16(rcps)++              // cp(i,16:17)
            d.pfadd.dd      f22,f2,f4                  // cp(i,1)+ap*bp(1),cp(i,18)
              fst.d         f28,8(rbr)++               // br(i)

d.pfmul.dd      f24,f8,f2                  // ap*bp(4), ap*bp(2)
              fld.q         16(rcp)++,f20              // cp(4:5)
            d.pfadd.dd      f16,f2,f6                  // cp(i,2)+ap*bp(2),cp(i,19)
              fld.q         48(rbp),f12                // bp(6:7)
            d.pfmul.dd      f24,f10,f2                 // ap*bp(5), ap*bp(3)
              fst.q         f4,16(rcps)++              // cp(i,18:19)
            d.pfadd.dd      f18,f2,f4                  // cp(i,3)+ap*bp(3),cp(i,0)
              fld.d         8(rcr),f28                 // cr(i,k)
// j=8
            d.pfmul.dd      f24,f12,f2                 // ap*bp(6), ap*bp(4)
              fld.q         16(rcp)++,f16              // cp(6:7)
            d.pfadd.dd      f20,f2,f6                  // cp(i,4)+ap*bp(4),cp(i,1)
              fld.q         64(rbp),f8                 // bp(8:9)
            d.pfmul.dd      f24,f14,f2                 // ap*bp(7), ap*bp(5)
              fst.q         f4,16(rcps)++              // cp(i,0:1)
            d.pfadd.dd      f22,f2,f4                  // cp(i,5)+ap*bp(5),cp(i,2)
              fst.d         f28,rcinc2(rc2)++          // c2(i,k)

d.pfmul.dd      f24,f8,f2                  // ap*bp(8), ap*bp(6)
              fld.q         16(rcp)++,f20              // cp(8:9)
            d.pfadd.dd      f16,f2,f6                  // cp(i,6)+ap*bp(6),cp(i,3)
              fld.q         80(rbp),f12                // bp(10:11)
            d.pfmul.dd      f24,f10,f2                 // ap*bp(9), ap*bp(7)
              fst.q         f4,16(rcps)++              // cp(i,2:3)
            d.pfadd.dd      f18,f2,f4                  // cp(i,7)+ap*bp(7),cp(i,4)
              pfld.d        rcinc2(rc0)++,f28          // c0(i,k)
```

// j=12
```
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        fst.d           f28,8(rcr)++            // cr(i,k)

d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
```
// j=16
```
        d.pfmul.dd      f24,f12,f2              // ap*bp(14), ap*bp(12)
        fld.q           16(rcp)++,f16           // cp(14:15)
        d.pfadd.dd      f20,f2,f6               // cp(i,12)+ap*bp(12),cp(i,9)
        fld.q           128(rbp),f8             // bp(16:17)
        d.pfmul.dd      f24,f14,f2              // ap*bp(15), ap*bp(13)
        fst.q           f4,16(rcps)++           // cp(i,8:9)
        d.pfadd.dd      f22,f2,f4               // cp(i,13)+ap*bp(13),cp(i,10)
        nop d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)
        d.pfadd.dd      f18,f2,f4               // cp(i,15)+ap*bp(15),cp(i,12)
        bla             rminus1,ricount,label13 // delayed branch, 18 iter
        d.pfmul.dd      f24,f12,f2              // ap*bp(18), ap*bp(16)
        fld.q           16(rcp)++,f16           // cp(18:19)

d.fnop
        adds            -1,rkcount,rkcount      // kcount--
        d.fnop
        bnc             label7                  // if(kcount>1) go to label7 d.fnop
        adds            -21,rnn3,rkcount        // kcount = nn3-21
        d.fnop
        bc              label11                 // if(kcount<0) go to label11
```

// DEBUGGING CODE - LEAVING DUAL INSTRUCTION MODE

```
        fnop
         nop
        fnop
         nop
         nop                                    // set breakpoint here
         nop
```
// END DEBUG CODE - RETURNING TO DUAL INSTR MODE

```
        d.fnop
        br              label10                 // start i loop
        d.fnop
        nop                                     // delayed branch label19:                                        // top of k loop
```

// DEBUGGING CODE - LEAVING DUAL INSTRUCTION MODE

```
        fnop
         nop
        fnop
         nop
```

```
          nop                              // set breakpoint here
          nop
// END DEBUG CODE - RETURNING TO DUAL INSTR MODE // 19th I iteration // j=0
        d.pfadd.dd    f20,f2,f6            // cp(i,16)+ap*bp(16),cp(i,13)
          fld.q       0(rbp),f8            // bp(0:1)
        d.pfmul.dd    f24,f14,f2           // ap*bp(19), ap*bp(17)
          fst.q       f4,16(rcps)++        // cp(i,12:13)
        d.pfadd.dd    f22,f2,f4            // cp(i,17)+ap*bp(17),cp(i,14)
          pfld.d      rainc21(ral)++,f24   // ar = al(I*nl+i,k)

d.pfmul.dd    f24,f8,f2            // ap*bp(0), ap*bp(18)
          fld.q       16(rcp)++,f20        // cp(0:1)
        d.pfadd.dd    f16,f2,f6            // cp(i,18)+ap*bp(18),cp(i,15)
          fld.q       16(rbp),f12          // bp(2:3)
        d.pfmul.dd    f24,f10,f2           // ap*bp(1), ap*bp(19)
          fst.q       f4,16(rcps)++        // cp(i,14:15)
        d.pfadd.dd    f18,f2,f4            // cp(i,19)+ap*bp(19),cp(i,16)
          pfld.d      rbinc12(rbl)++,f28   // bl(k,J*nl+i)
// j=4
        d.pfmul.dd    f24,f12,f2           // ap*bp(2), ap*bp(0)
          fld.q       16(rcp)++,f16        // cp(2:3)
        d.pfadd.dd    f20,f2,f6            // cp(i,0)+ap*bp(0),cp(i,17)
          fld.q       32(rbp),f8           // bp(4:5)
        d.pfmul.dd    f24,f14,f2           // ap*bp(3), ap*bp(1)
          fst.q       f4,16(rcps)++        // cp(i,16:17)
        d.pfadd.dd    f22,f2,f4            // cp(i,1)+ap*bp(1),cp(i,18)
          fst.d       f28,8(rbr)++         // br(i)

d.pfmul.dd    f24,f8,f2            // ap*bp(4), ap*bp(2)
          fld.q       16(rcp)++,f20        // cp(4:5)
        d.pfadd.dd    f16,f2,f6            // cp(i,2)+ap*bp(2),cp(i,19)
          fld.q       48(rbp),f12          // bp(6:7)
        d.pfmul.dd    f24,f10,f2           // ap*bp(5), ap*bp(3)
          fst.q       f4,16(rcps)++        // cp(i,18:19)
        d.pfadd.dd    f18,f2,f4            // cp(i,3)+ap*bp(3),cp(i,0)
          nop
// j=8
        d.pfmul.dd    f24,f12,f2           // ap*bp(6), ap*bp(4)
          fld.q       16(rcp)++,f16        // cp(6:7)
        d.pfadd.dd    f20,f2,f6            // cp(i,4)+ap*bp(4),cp(i,1)
          fld.q       64(rbp),f8           // bp(8:9)
        d.pfmul.dd    f24,f14,f2           // ap*bp(7), ap*bp(5)
          fst.q       f4,16(rcps)++        // cp(i,0:1)
        d.pfadd.dd    f22,f2,f4            // cp(i,5)+ap*bp(5),cp(i,2)
          nop d.pfmul.dd    f24,f8,f2            // ap*bp(8), ap*bp(6)
          fld.q       16(rcp)++,f20        // cp(8:9)
        d.pfadd.dd    f16,f2,f6            // cp(i,6)+ap*bp(6),cp(i,3)
          fld.q       80(rbp),f12          // bp(10:11)
        d.pfmul.dd    f24,f10,f2           // ap*bp(9), ap*bp(7)
          fst.q       f4,16(rcps)++        // cp(i,2:3)
        d.pfadd.dd    f18,f2,f4            // cp(i,7)+ap*bp(7),cp(i,4)
          pfld.d      8(ral),f0            // dummy load pipeline push
// j=12
        d.pfmul.dd    f24,f12,f2           // ap*bp(10), ap*bp(8)
          fld.q       16(rcp)++,f16        // cp(10:11)
        d.pfadd.dd    f20,f2,f6            // cp(i,8)+ap*bp(8),cp(i,5)
          fld.q       96(rbp),f8           // bp(12:13)
        d.pfmul.dd    f24,f14,f2           // ap*bp(11), ap*bp(9)
          fst.q       f4,16(rcps)++        // cp(i,4:5)
        d.pfadd.dd    f22,f2,f4            // cp(i,9)+ap*bp(9),cp(i,6)
          nop d.pfmul.dd    f24,f8,f2            // ap*bp(12), ap*bp(10)
          fld.q       16(rcp)++,f20        // cp(12:13)
        d.pfadd.dd    f16,f2,f6            // cp(i,10)+ap*bp(10),cp(i,7)
          fld.q       112(rbp),f12         // bp(14:15)
```

```
            d.pfmul.dd      f24,f10,f2          // ap*bp(13), ap*bp(11)
            fst.q           f4,16(rcps)++       // cp(i,6:7)
            d.pfadd.dd      f18,f2,f4           // cp(i,11)+ap*bp(11),cp(i,8)
            nop
// j=16
            d.pfmul.dd      f24,f12,f2          // ap*bp(14), ap*bp(12)
            fld.q           16(rcp)++,f16       // cp(14:15)
            d.pfadd.dd      f20,f2,f6           // cp(i,12)+ap*bp(12),cp(i,9)
            fld.q           128(rbp),f8         // bp(16:17)
            d.pfmul.dd      f24,f14,f2          // ap*bp(15), ap*bp(13)
            fst.q           f4,16(rcps)++       // cp(i,8:9)
            d.pfadd.dd      f22,f2,f4           // cp(i,13)+ap*bp(13),cp(i,10)
            nop d.pfmul.dd      f24,f8,f2           // ap*bp(16), ap*bp(14)
            fld.q           16(rcp)++,f20       // cp(16:17)
            d.pfadd.dd      f16,f2,f6           // cp(i,14)+ap*bp(14),cp(i,11)
            fld.q           144(rbp),f12        // bp(18:19)
            d.pfmul.dd      f24,f10,f2          // ap*bp(17), ap*bp(15)
            fst.q           f4,16(rcps)++       // cp(i,10:11)
            d.pfadd.dd      f18,f2,f4           // cp(i,15)+ap*bp(15),cp(i,12)
            nop

// DEBUGGING CODE - LEAVING DUAL INSTRUCTION MODE fnop
            nop
            fnop
            nop
            nop                                 // set breakpoint here
            nop
// END DEBUG CODE - RETURNING TO DUAL INSTR MODE // K loop Body:

d.fnop
            mov             rbr,r31             // swap br and bp
            d.fnop
            mov             rbp,rbr
            d.fnop
            adds            -152,r31,rbp        // and reset to 0th element.
// j=0
            d.pfmul.dd      f24,f12,f2          // ap*bp(18), ap*bp(16)
            fld.q           16(rcp)++,f16       // cp(18:19)
            d.pfadd.dd      f20,f2,f6           // cp(i,16)+ap*bp(16),cp(i,13)
            fld.q           0(rbp),f8           // bp(0:1)
            d.pfmul.dd      f24,f14,f2          // ap*bp(19), ap*bp(17)
            fst.q           f4,16(rcps)++       // cp(i,12:13)
            d.pfadd.dd      f22,f2,f4           // cp(i,17)+ap*bp(17),cp(i,14)
            pfld.d          raincl(ra1)++,f24   // ar = a1(I*nl+i,k)

d.pfmul.dd      f24,f8,f2           // ap*bp(0), ap*bp(18)
            fld.q           -3184(rcp)++,f20    // cp(0:1)
            d.pfadd.dd      f16,f2,f6           // cp(i,18)+ap*bp(18),cp(i,15)
            fld.q           16(rbp),f12         // bp(2:3)
            d.pfmul.dd      f24,f10,f2          // ap*bp(1), ap*bp(19)
            fst.q           f4,16(rcps)++       // cp(i,14:15)
            d.pfadd.dd      f18,f2,f4           // cp(i,19)+ap*bp(19),cp(i,16)
            pfld.d          rbinc2(rb1)++,f28   // b1(k,J*nl+i)
// j=4
            d.pfmul.dd      f24,f12,f2          // ap*bp(2), ap*bp(0)
            fld.q           16(rcp)++,f16       // cp(2:3)
            d.pfadd.dd      f20,f2,f6           // cp(i,0)+ap*bp(0),cp(i,17)
            fld.q           32(rbp),f8          // bp(4:5)
            d.pfmul.dd      f24,f14,f2          // ap*bp(3), ap*bp(1)
            fst.q           f4,16(rcps)++       // cp(i,16:17)
            d.pfadd.dd      f22,f2,f4           // cp(i,1)+ap*bp(1),cp(i,18)
            fst.d           f28,0(rbr)          // br(i)

d.pfmul.dd      f24,f8,f2           // ap*bp(4), ap*bp(2)
            fld.q           16(rcp)++,f20       // cp(4:5)
```

```
              d.pfadd.dd      f16,f2,f6           // cp(i,2)+ap*bp(2),cp(i,19)
              fld.q           48(rbp),f12         // bp(6:7)
              d.pfmul.dd      f24,f10,f2          // ap*bp(5), ap*bp(3)
              fst.q           f4,16(rcps)++       // cp(i,18:19)
              d.pfadd.dd      f18,f2,f4           // cp(i,3)+ap*bp(3),cp(i,0)
              nop
// j=8
              d.pfmul.dd      f24,f12,f2          // ap*bp(6), ap*bp(4)
              fld.q           16(rcp)++,f16       // cp(6:7)
              d.pfadd.dd      f20,f2,f6           // cp(i,4)+ap*bp(4),cp(i,1)
              fld.q           64(rbp),f8          // bp(8:9)
              d.pfmul.dd      f24,f14,f2          // ap*bp(7), ap*bp(5)
              fst.q           f4,-3184(rcps)++    // cp(i,0:1)
              d.pfadd.dd      f22,f2,f4           // cp(i,5)+ap*bp(5),cp(i,2)
              nop d.pfmul.dd      f24,f8,f2           // ap*bp(8), ap*bp(6)
              fld.q           16(rcp)++,f20       // cp(8:9)
              d.pfadd.dd      f16,f2,f6           // cp(i,6)+ap*bp(6),cp(i,3)
              fld.q           80(rbp),f12         // bp(10:11)
              d.pfmul.dd      f24,f10,f2          // ap*bp(9), ap*bp(7)
              fst.q           f4,16(rcps)++       // cp(i,2:3)
              d.pfadd.dd      f18,f2,f4           // cp(i,7)+ap*bp(7),cp(i,4)
              pfld.d          8(ra1),f0           // dummy load pipeline push
// j=12
              d.pfmul.dd      f24,f12,f2          // ap*bp(10), ap*bp(8)
              fld.q           16(rcp)++,f16       // cp(10:11)
              d.pfadd.dd      f20,f2,f6           // cp(i,8)+ap*bp(8),cp(i,5)
              fld.q           96(rbp),f8          // bp(12:13)
              d.pfmul.dd      f24,f14,f2          // ap*bp(11), ap*bp(9)
              fst.q           f4,16(rcps)++       // cp(i,4:5)
              d.pfadd.dd      f22,f2,f4           // cp(i,9)+ap*bp(9),cp(i,6)
              nop d.pfmul.dd      f24,f8,f2           // ap*bp(12), ap*bp(10)
              fld.q           16(rcp)++,f20       // cp(12:13)
              d.pfadd.dd      f16,f2,f6           // cp(i,10)+ap*bp(10),cp(i,7)
              fld.q           112(rbp),f12        // bp(14:15)
              d.pfmul.dd      f24,f10,f2          // ap*bp(13), ap*bp(11)
              fst.q           f4,16(rcps)++       // cp(i,6:7)
              d.pfadd.dd      f18,f2,f4           // cp(i,11)+ap*bp(11),cp(i,8)
              nop
// j=16
              d.pfmul.dd      f24,f12,f2          // ap*bp(14), ap*bp(12)
              fld.q           16(rcp)++,f16       // cp(14:15)
              d.pfadd.dd      f20,f2,f6           // cp(i,12)+ap*bp(12),cp(i,9)
              fld.q           128(rbp),f8         // bp(16:17)
              d.pfmul.dd      f24,f14,f2          // ap*bp(15), ap*bp(13)
              fst.q           f4,16(rcps)++       // cp(i,8:9)
              d.pfadd.dd      f22,f2,f4           // cp(i,13)+ap*bp(13),cp(i,10)
              nop d.pfmul.dd      f24,f8,f2           // ap*bp(16), ap*bp(14)
              fld.q           16(rcp)++,f20       // cp(16:17)
              d.pfadd.dd      f16,f2,f6           // cp(i,14)+ap*bp(14),cp(i,11)
              fld.q           144(rbp),f12        // bp(18:19)
              d.pfmul.dd      f24,f10,f2          // ap*bp(17), ap*bp(15)
              fst.q           f4,16(rcps)++       // cp(i,10:11)

label10:                                          // init i loop

// DEBUGGING CODE - LEAVING DUAL INSTRUCTION MODE fnop
              nop
              fnop
              nop
              nop                                 // set breakpoint here
              nop
// END DEBUG CODE - RETURNING TO DUAL INSTR MODE
```

```
// I loop Body:

d.fnop
         adds         17,r0,ricount          // icount = 17
         d.pfadd.dd   f18,f2,f4              // cp(i,15)+ap*bp(15),cp(i,12)
         bla          rminus1,ricount,label14 // delayed branch, 18 iter
// j=0
         d.pfmul.dd   f24,f12,f2             // ap*bp(18), ap*bp(16)
         fld.q        16(rcp)++,f16          // cp(18:19)

label14:
         d.pfadd.dd   f20,f2,f6              // cp(i,16)+ap*bp(16),cp(i,13)
         fld.q        0(rbp),f8              // bp(0:1)
         d.pfmul.dd   f24,f14,f2             // ap*bp(19), ap*bp(17)
         fst.q        f4,16(rcps)++          // cp(i,12:13)
         d.pfadd.dd   f22,f2,f4              // cp(i,17)+ap*bp(17),cp(i,14)
         pfld.d       raincl(ra1)++,f24      // ar = al(I*nl+i,k)

d.pfmul.dd   f24,f8,f2              // ap*bp(0), ap*bp(18)
         fld.q        16(rcp)++,f20          // cp(0:1)
         d.pfadd.dd   f16,f2,f6              // cp(i,18)+ap*bp(18),cp(i,15)
         fld.q        16(rbp),f12            // bp(2:3)
         d.pfmul.dd   f24,f10,f2             // ap*bp(1), ap*bp(19)
         fst.q        f4,16(rcps)++          // cp(i,14:15)
         d.pfadd.dd   f18,f2,f4              // cp(i,19)+ap*bp(19),cp(i,16)
         pfld.d       rbinc2(rb1)++,f28      // bl(k,J*nl+i)
// j=4
         d.pfmul.dd   f24,f12,f2             // ap*bp(2), ap*bp(0)
         fld.q        16(rcp)++,f16          // cp(2:3)
         d.pfadd.dd   f20,f2,f6              // cp(i,0)+ap*bp(0),cp(i,17)
         fld.q        32(rbp),f8             // bp(4:5)
         d.pfmul.dd   f24,f14,f2             // ap*bp(3), ap*bp(1)
         fst.q        f4,16(rcps)++          // cp(i,16:17)
         d.pfadd.dd   f22,f2,f4              // cp(i,1)+ap*bp(1),cp(i,18)
         fst.d        f28,8(rbr)++           // br(i)

d.pfmul.dd   f24,f8,f2              // ap*bp(4), ap*bp(2)
         fld.q        16(rcp)++,f20          // cp(4:5)
         d.pfadd.dd   f16,f2,f6              // cp(i,2)+ap*bp(2),cp(i,19)
         fld.q        48(rbp),f12            // bp(6:7)
         d.pfmul.dd   f24,f10,f2             // ap*bp(5), ap*bp(3)
         fst.q        f4,16(rcps)++          // cp(i,18:19)
         d.pfadd.dd   f18,f2,f4              // cp(i,3)+ap*bp(3),cp(i,0)
         nop
// j=8
         d.pfmul.dd   f24,f12,f2             // ap*bp(6), ap*bp(4)
         fld.q        16(rcp)++,f16          // cp(6:7)
         d.pfadd.dd   f20,f2,f6              // cp(i,4)+ap*bp(4),cp(i,1)
         fld.q        64(rbp),f8             // bp(8:9)
         d.pfmul.dd   f24,f14,f2             // ap*bp(7), ap*bp(5)
         fst.q        f4,16(rcps)++          // cp(i,0:1)
         d.pfadd.dd   f22,f2,f4              // cp(i,5)+ap*bp(5),cp(i,2)
         nop d.pfmul.dd   f24,f8,f2              // ap*bp(8), ap*bp(6)
         fld.q        16(rcp)++,f20          // cp(8:9)
         d.pfadd.dd   f16,f2,f6              // cp(i,6)+ap*bp(6),cp(i,3)
         fld.q        80(rbp),f12            // bp(10:11)
         d.pfmul.dd   f24,f10,f2             // ap*bp(9), ap*bp(7)
         fst.q        f4,16(rcps)++          // cp(i,2:3)
         d.pfadd.dd   f18,f2,f4              // cp(i,7)+ap*bp(7),cp(i,4)
         pfld.d       8(ra1),f0              // dummy load pipeline push
// j=12
         d.pfmul.dd   f24,f12,f2             // ap*bp(10), ap*bp(8)
         fld.q        16(rcp)++,f16          // cp(10:11)
         d.pfadd.dd   f20,f2,f6              // cp(i,8)+ap*bp(8),cp(i,5)
         fld.q        96(rbp),f8             // bp(12:13)
         d.pfmul.dd   f24,f14,f2             // ap*bp(11), ap*bp(9)
         fst.q        f4,16(rcps)++          // cp(i,4:5)
         d.pfadd.dd   f22,f2,f4              // cp(i,9)+ap*bp(9),cp(i,6)
         nop
```

```
          d.pfmul.dd    f24,f8,f2              // ap*bp(12), ap*bp(10)
          fld.q         16(rcp)++,f20          // cp(12:13)
          d.pfadd.dd    f16,f2,f6              // cp(i,10)+ap*bp(10),cp(i,7)
          fld.q         112(rbp),f12           // bp(14:15)
          d.pfmul.dd    f24,f10,f2             // ap*bp(13), ap*bp(11)
          fst.q         f4,16(rcps)++          // cp(i,6:7)
          d.pfadd.dd    f18,f2,f4              // cp(i,11)+ap*bp(11),cp(i,8)
          nop
// j=16
          d.pfmul.dd    f24,f12,f2             // ap*bp(14), ap*bp(12)
          fld.q         16(rcp)++,f16          // cp(14:15)
          d.pfadd.dd    f20,f2,f6              // cp(i,12)+ap*bp(12),cp(i,9)
          fld.q         128(rbp),f8            // bp(16:17)
          d.pfmul.dd    f24,f14,f2             // ap*bp(15), ap*bp(13)
          fst.q         f4,16(rcps)++          // cp(i,8:9)
          d.pfadd.dd    f22,f2,f4              // cp(i,13)+ap*bp(13),cp(i,10)
          nop d.pfmul.dd    f24,f8,f2              // ap*bp(16), ap*bp(14)
          fld.q         16(rcp)++,f20          // cp(16:17)
          d.pfadd.dd    f16,f2,f6              // cp(i,14)+ap*bp(14),cp(i,11)
          fld.q         144(rbp),f12           // bp(18:19)
          d.pfmul.dd    f24,f10,f2             // ap*bp(17), ap*bp(15)
          fst.q         f4,16(rcps)++          // cp(i,10:11)
          d.pfadd.dd    f18,f2,f4              // cp(i,15)+ap*bp(15),cp(i,12)
          bla           rminus1,ricount,label14 // delayed branch, 18 iter
          d.pfmul.dd    f24,f12,f2             // ap*bp(18), ap*bp(16)
          fld.q         16(rcp)++,f16          // cp(18:19)

d.fnop
          adds          -1,rkcount,rkcount     // kcount--
          d.fnop
          bnc           label9                 // if(kcount>1) go to label9
label11:                                       // init i loop

// DEBUGGING CODE - LEAVING DUAL INSTRUCTION MODE fnop
          nop
          fnop
          nop
          nop                                  // set breakpoint here
          nop
// END DEBUG CODE - RETURNING TO DUAL INSTR MODE // 19th I iteration // j=0
          d.pfadd.dd    f20,f2,f6              // cp(i,16)+ap*bp(16),cp(i,13)
          fld.q         0(rbp),f8              // bp(0:1)
          d.pfmul.dd    f24,f14,f2             // ap*bp(19), ap*bp(17)
          fst.q         f4,16(rcps)++          // cp(i,12:13)
          d.pfadd.dd    f22,f2,f4              // cp(i,17)+ap*bp(17),cp(i,14)
          pfld.d        rainc21(ra1)++,f24     // ar = a1(I*n1+i,k)

d.pfmul.dd    f24,f8,f2              // ap*bp(0), ap*bp(18)
          fld.q         16(rcp)++,f20          // cp(0:1)
          d.pfadd.dd    f16,f2,f6              // cp(i,18)+ap*bp(18),cp(i,15)
          fld.q         16(rbp),f12            // bp(2:3)
          d.pfmul.dd    f24,f10,f2             // ap*bp(1), ap*bp(19)
          fst.q         f4,16(rcps)++          // cp(i,14:15)
          d.pfadd.dd    f18,f2,f4              // cp(i,19)+ap*bp(19),cp(i,16)
          pfld.d        rbinc12(rb1)++,f28     // b1(k,J*n1+i)
// j=4
          d.pfmul.dd    f24,f12,f2             // ap*bp(2), ap*bp(0)
          fld.q         16(rcp)++,f16          // cp(2:3)
          d.pfadd.dd    f20,f2,f6              // cp(i,0)+ap*bp(0),cp(i,17)
          fld.q         32(rbp),f8             // bp(4:5)
          d.pfmul.dd    f24,f14,f2             // ap*bp(3), ap*bp(1)
          fst.q         f4,16(rcps)++          // cp(i,16:17)
          d.pfadd.dd    f22,f2,f4              // cp(i,1)+ap*bp(1),cp(i,18)
          fst.d         f28,8(rbr)++           // br(i)
```

```
        d.pfmul.dd    f24,f8,f2           // ap*bp(4), ap*bp(2)
        fld.q         16(rcp)++,f20       // cp(4:5)
        d.pfadd.dd    f16,f2,f6           // cp(i,2)+ap*bp(2),cp(i,19)
        fld.q         48(rbp),f12         // bp(6:7)
        d.pfmul.dd    f24,f10,f2          // ap*bp(5), ap*bp(3)
        fst.q         f4,16(rcps)++       // cp(i,18:19)
        d.pfadd.dd    f18,f2,f4           // cp(i,3)+ap*bp(3),cp(i,0)
        fld.d         8(rcr),f28          // cr(i,k)
// j=8
        d.pfmul.dd    f24,f12,f2          // ap*bp(6), ap*bp(4)
        fld.q         16(rcp)++,f16       // cp(6:7)
        d.pfadd.dd    f20,f2,f6           // cp(i,4)+ap*bp(4),cp(i,1)
        fld.q         64(rbp),f8          // bp(8:9)
        d.pfmul.dd    f24,f14,f2          // ap*bp(7), ap*bp(5)
        fst.q         f4,16(rcps)++       // cp(i,0:1)
        d.pfadd.dd    f22,f2,f4           // cp(i,5)+ap*bp(5),cp(i,2)
        fst.d         f28,rcinc2(rc2)++   // c2(i,k)

d.pfmul.dd    f24,f8,f2           // ap*bp(8), ap*bp(6)
        fld.q         16(rcp)++,f20       // cp(8:9)
        d.pfadd.dd    f16,f2,f6           // cp(i,6)+ap*bp(6),cp(i,3)
        fld.q         80(rbp),f12         // bp(10:11)
        d.pfmul.dd    f24,f10,f2          // ap*bp(9), ap*bp(7)
        fst.q         f4,16(rcps)++       // cp(i,2:3)
        d.pfadd.dd    f18,f2,f4           // cp(i,7)+ap*bp(7),cp(i,4)
        pfld.d        rcinc12(rc0)++,f28  // c0(i,k)
// j=12
        d.pfmul.dd    f24,f12,f2          // ap*bp(10), ap*bp(8)
        fld.q         16(rcp)++,f16       // cp(10:11)
        d.pfadd.dd    f20,f2,f6           // cp(i,8)+ap*bp(8),cp(i,5)
        fld.q         96(rbp),f8          // bp(12:13)
        d.pfmul.dd    f24,f14,f2          // ap*bp(11), ap*bp(9)
        fst.q         f4,16(rcps)++       // cp(i,4:5)
        d.pfadd.dd    f22,f2,f4           // cp(i,9)+ap*bp(9),cp(i,6)
        fst.d         f28,8(rcr)++        // cr(i,k)

d.pfmul.dd    f24,f8,f2           // ap*bp(12), ap*bp(10)
        fld.q         16(rcp)++,f20       // cp(12:13)
        d.pfadd.dd    f16,f2,f6           // cp(i,10)+ap*bp(10),cp(i,7)
        fld.q         112(rbp),f12        // bp(14:15)
        d.pfmul.dd    f24,f10,f2          // ap*bp(13), ap*bp(11)
        fst.q         f4,16(rcps)++       // cp(i,6:7)
        d.pfadd.dd    f18,f2,f4           // cp(i,11)+ap*bp(11),cp(i,8)
        nop
// j=16
        d.pfmul.dd    f24,f12,f2          // ap*bp(14), ap*bp(12)
        fld.q         16(rcp)++,f16       // cp(14:15)
        d.pfadd.dd    f20,f2,f6           // cp(i,12)+ap*bp(12),cp(i,9)
        fld.q         128(rbp),f8         // bp(16:17)
        d.pfmul.dd    f24,f14,f2          // ap*bp(15), ap*bp(13)
        fst.q         f4,16(rcps)++       // cp(i,8:9)
        d.pfadd.dd    f22,f2,f4           // cp(i,13)+ap*bp(13),cp(i,10)
        nop d.pfmul.dd    f24,f8,f2           // ap*bp(16), ap*bp(14)
        fld.q         16(rcp)++,f20       // cp(16:17)
        d.pfadd.dd    f16,f2,f6           // cp(i,14)+ap*bp(14),cp(i,11)
        fld.q         144(rbp),f12        // bp(18:19)
        d.pfmul.dd    f24,f10,f2          // ap*bp(17), ap*bp(15)
        fst.q         f4,16(rcps)++       // cp(i,10:11)
        d.pfadd.dd    f18,f2,f4           // cp(i,15)+ap*bp(15),cp(i,12)
        nop // Pipeline Drain:

// j=0
        d.pfmul.dd    f24,f12,f2          // ap*bp(18), ap*bp(16)
        fld.q         16(rcp)++,f16       // cp(18:19)
        d.pfadd.dd    f20,f2,f6           // cp(19,16)+ap*bp(16),cp(19,13)
        nop
```

```
            d.pfmul.dd      f24,f14,f2          // ap*bp(19), ap*bp(17)
              fst.q         f4,16(rcps)++       // cp(19,12:13)
            d.pfadd.dd      f22,f2,f4           // cp(19,17)+ap*bp(17),cp(19,14)
              nop d.pfmul.dd      f0,f0,f2            // --, ap*bp(18)
              nop
            d.pfadd.dd      f16,f2,f6           // cp(19,18)+ap*bp(18),cp(19,15)
              nop
            d.pfmul.dd      f0,f0,f2            // --, ap*bp(19)
              fst.q         f4,16(rcps)++       // cp(19,14:15)
            d.pfadd.dd      f18,f2,f4           // cp(19,19)+ap*bp(19),cp(19,16)
              pfld.d        0(rb1),f28          // bl(k,J*n1+i)
// j=4
            d.pfadd.dd      f0,f0,f6            // --, cp(19,17)
              nop
            d.fnop
              fst.q         f4,16(rcps)++       // cp(19,16:17)
            d.pfadd.dd      f0,f0,f4            // --, cp(19,18)
              nop d.pfadd.dd      f0,f0,f6            // --, cp(19,19)
              nop
            d.fnop
              fst.q         f4,16(rcps)++       // cp(19,18:19)
// j=8

// j=12

// j=16

//      exit dual instruction mode
            fnop
              nop
            fnop
              nop br              label15             // else
              nop                               // delayed branch
label6:
// DEBUGGING CODE - LEAVING DUAL INSTRUCTION MODE fnop
              nop
            fnop
              nop
            nop                                 // set breakpoint here
            nop
// END DEBUG CODE - RETURNING TO DUAL INSTR MODE // * WRITE + compute *
// * WRITE + Compute +       * adds            19,r0,rkcount       // kcount = 19 (20 iter)

.align          8                   // align for dual instr. mode
// Pipeline Fill:

// j=0
            d.fnop
              fld.q         0(rbp),f8           // bp(0:1)
            d.fnop
              pfld.d        raincl(ral)++,f24   // ar = al(I*n1+i,k)

d.pfmul.dd      f24,f8,f0           // ap*bp(0), --
              fld.q         0(rcp),f20          // cp(0:1)
            d.fnop
              fld.q         16(rbp),f12         // bp(2:3)
```

```
           d.pfmul.dd    f24,f10,f0            // ap*bp(1), --
           nop
           d.fnop
           pfld.d        rbinc2(rb1)++,f28     // b1(k,J*nl+i)
// j=4
           d.pfmul.dd    f24,f12,f2            // ap*bp(2), ap*bp(0)
           fld.q         16(rcp)++,f16         // cp(2:3)
           d.pfadd.dd    f20,f2,f0             // cp(i,0)+ap*bp(0),--
           fld.q         32(rbp),f8            // bp(4:5)
           d.pfmul.dd    f24,f14,f2            // ap*bp(3), ap*bp(1)
           nop
           d.pfadd.dd    f22,f2,f0             // cp(i,1)+ap*bp(1),--
           fst.d         f28,0(rbr)            // br(i)

d.pfmul.dd    f24,f8,f2             // ap*bp(4), ap*bp(2)
           fld.q         16(rcp)++,f20         // cp(4:5)
           d.pfadd.dd    f16,f2,f0             // cp(i,2)+ap*bp(2),--
           fld.q         48(rbp),f12           // bp(6:7)
           d.pfmul.dd    f24,f10,f2            // ap*bp(5), ap*bp(3)
           nop
           d.pfadd.dd    f18,f2,f4             // cp(i,3)+ap*bp(3),cp(i,0)
           fld.d         0(rcr),f28            // cr(i,k)
// j=8
           d.pfmul.dd    f24,f12,f2            // ap*bp(6), ap*bp(4)
           fld.q         16(rcp)++,f16         // cp(6:7)
           d.pfadd.dd    f20,f2,f6             // cp(i,4)+ap*bp(4),cp(i,1)
           fld.q         64(rbp),f8            // bp(8:9)
           d.pfmul.dd    f24,f14,f2            // ap*bp(7), ap*bp(5)
           fst.q         f4,0(rcps)            // cp(i,0:1)
           d.pfadd.dd    f22,f2,f4             // cp(i,5)+ap*bp(5),cp(i,2)
           fst.d         f28,0(rc2)            // c2(i,k)

d.pfmul.dd    f24,f8,f2             // ap*bp(8), ap*bp(6)
           fld.q         16(rcp)++,f20         // cp(8:9)
           d.pfadd.dd    f16,f2,f6             // cp(i,6)+ap*bp(6),cp(i,3)
           fld.q         80(rbp),f12           // bp(10:11)
           d.pfmul.dd    f24,f10,f2            // ap*bp(9), ap*bp(7)
           fst.q         f4,16(rcps)++         // cp(i,2:3)
           d.pfadd.dd    f18,f2,f4             // cp(i,7)+ap*bp(7),cp(i,4)
           pfld.d        8(ra1),f0             // dummy load pipeline push
// j=12
           d.pfmul.dd    f24,f12,f2            // ap*bp(10), ap*bp(8)
           fld.q         16(rcp)++,f16         // cp(10:11)
           d.pfadd.dd    f20,f2,f6             // cp(i,8)+ap*bp(8),cp(i,5)
           fld.q         96(rbp),f8            // bp(12:13)
           d.pfmul.dd    f24,f14,f2            // ap*bp(11), ap*bp(9)
           fst.q         f4,16(rcps)++         // cp(i,4:5)
           d.pfadd.dd    f22,f2,f4             // cp(i,9)+ap*bp(9),cp(i,6)
           nop d.pfmul.dd    f24,f8,f2             // ap*bp(12), ap*bp(10)
           fld.q         16(rcp)++,f20         // cp(12:13)
           d.pfadd.dd    f16,f2,f6             // cp(i,10)+ap*bp(10),cp(i,7)
           fld.q         112(rbp),f12          // bp(14:15)
           d.pfmul.dd    f24,f10,f2            // ap*bp(13), ap*bp(11)
           fst.q         f4,16(rcps)++         // cp(i,6:7)
           d.pfadd.dd    f18,f2,f4             // cp(i,11)+ap*bp(11),cp(i,8)
           nop
// j=16
           d.pfmul.dd    f24,f12,f2            // ap*bp(14), ap*bp(12)
           fld.q         16(rcp)++,f16         // cp(14:15)
           d.pfadd.dd    f20,f2,f6             // cp(i,12)+ap*bp(12),cp(i,9)
           fld.q         128(rbp),f8           // bp(16:17)
           d.pfmul.dd    f24,f14,f2            // ap*bp(15), ap*bp(13)
           fst.q         f4,16(rcps)++         // cp(i,8:9)
           d.pfadd.dd    f22,f2,f4             // cp(i,13)+ap*bp(13),cp(i,10)
           nop d.pfmul.dd    f24,f8,f2             // ap*bp(16), ap*bp(14)
           fld.q         16(rcp)++,f20         // cp(16:17)
           d.pfadd.dd    f16,f2,f6             // cp(i,14)+ap*bp(14),cp(i,11)
           fld.q         144(rbp),f12          // bp(18:19)
           d.pfmul.dd    f24,f10,f2            // ap*bp(17), ap*bp(15)
           fst.q         f4,16(rcps)++         // cp(i,10:11)
```

```
                d.fnop
                  br            label17                 // start i loop
                d.fnop
                  nop                                   // delayed branch
label16:                                                // top of k loop

// DEBUGGING CODE - LEAVING DUAL INSTRUCTION MODE fnop
          nop
        fnop
          nop
          nop                                           // set breakpoint here
          nop
// END DEBUG CODE - RETURNING TO DUAL INSTR MODE // 19th I iteration // j=0
        d.pfadd.dd      f20,f2,f6               // cp(i,16)+ap*bp(16),cp(i,13)
          fld.q         0(rbp),f8               // bp(0:1)
        d.pfmul.dd      f24,f14,f2              // ap*bp(19), ap*bp(17)
          fst.q         f4,16(rcps)++           // cp(i,12:13)
        d.pfadd.dd      f22,f2,f4               // cp(i,17)+ap*bp(17),cp(i,14)
          pfld.d        rainc21(ra1)++,f24      // ar = a1(I*n1+i,k)

d.pfmul.dd      f24,f8,f2               // ap*bp(0), ap*bp(18)
          fld.q         16(rcp)++,f20           // cp(0:1)
        d.pfadd.dd      f16,f2,f6               // cp(i,18)+ap*bp(18),cp(i,15)
          fld.q         16(rbp),f12             // bp(2:3)
        d.pfmul.dd      f24,f10,f2              // ap*bp(1), ap*bp(19)
          fst.q         f4,16(rcps)++           // cp(i,14:15)
        d.pfadd.dd      f18,f2,f4               // cp(i,19)+ap*bp(19),cp(i,16)
          pfld.d        rbinc12(rb1)++,f28      // b1(k,J*n1+i)
// j=4
        d.pfmul.dd      f24,f12,f2              // ap*bp(2), ap*bp(0)
          fld.q         16(rcp)++,f16           // cp(2:3)
        d.pfadd.dd      f20,f2,f6               // cp(i,0)+ap*bp(0),cp(i,17)
          fld.q         32(rbp),f8              // bp(4:5)
        d.pfmul.dd      f24,f14,f2              // ap*bp(3), ap*bp(1)
          fst.q         f4,16(rcps)++           // cp(i,16:17)
        d.pfadd.dd      f22,f2,f4               // cp(i,1)+ap*bp(1),cp(i,18)
          fst.d         f28,8(rbr)++            // br(i)

d.pfmul.dd      f24,f8,f2               // ap*bp(4), ap*bp(2)
          fld.q         16(rcp)++,f20           // cp(4:5)
        d.pfadd.dd      f16,f2,f6               // cp(i,2)+ap*bp(2),cp(i,19)
          fld.q         48(rbp),f12             // bp(6:7)
        d.pfmul.dd      f24,f10,f2              // ap*bp(5), ap*bp(3)
          fst.q         f4,16(rcps)++           // cp(i,18:19)
        d.pfadd.dd      f18,f2,f4               // cp(i,3)+ap*bp(3),cp(i,0)
          fld.d         8(rcr)++,f28            // cr(i,k)
// j=8
        d.pfmul.dd      f24,f12,f2              // ap*bp(6), ap*bp(4)
          fld.q         16(rcp)++,f16           // cp(6:7)
        d.pfadd.dd      f20,f2,f6               // cp(i,4)+ap*bp(4),cp(i,1)
          fld.q         64(rbp),f8              // bp(8:9)
        d.pfmul.dd      f24,f14,f2              // ap*bp(7), ap*bp(5)
          fst.q         f4,16(rcps)++           // cp(i,0:1)
        d.pfadd.dd      f22,f2,f4               // cp(i,5)+ap*bp(5),cp(i,2)
          fst.d         f28,rcinc2(rc2)++       // c2(i,k)

d.pfmul.dd      f24,f8,f2               // ap*bp(8), ap*bp(6)
          fld.q         16(rcp)++,f20           // cp(8:9)
        d.pfadd.dd      f16,f2,f6               // cp(i,6)+ap*bp(6),cp(i,3)
          fld.q         80(rbp),f12             // bp(10:11)
        d.pfmul.dd      f24,f10,f2              // ap*bp(9), ap*bp(7)
          fst.q         f4,16(rcps)++           // cp(i,2:3)
        d.pfadd.dd      f18,f2,f4               // cp(i,7)+ap*bp(7),cp(i,4)
          pfld.d        8(ra1),f0               // dummy load pipeline push
```

```
// j=12
        d.pfmul.dd    f24,f12,f2          // ap*bp(10), ap*bp(8)
        fld.q         16(rcp)++,f16       // cp(10:11)
        d.pfadd.dd    f20,f2,f6           // cp(i,8)+ap*bp(8),cp(i,5)
        fld.q         96(rbp),f8          // bp(12:13)
        d.pfmul.dd    f24,f14,f2          // ap*bp(11), ap*bp(9)
        fst.q         f4,16(rcps)++       // cp(i,4:5)
        d.pfadd.dd    f22,f2,f4           // cp(i,9)+ap*bp(9),cp(i,6)
        nop d.pfmul.dd    f24,f8,f2           // ap*bp(12), ap*bp(10)
        fld.q         16(rcp)++,f20       // cp(12:13)
        d.pfadd.dd    f16,f2,f6           // cp(i,10)+ap*bp(10),cp(i,7)
        fld.q         112(rbp),f12        // bp(14:15)
        d.pfmul.dd    f24,f10,f2          // ap*bp(13), ap*bp(11)
        fst.q         f4,16(rcps)++       // cp(i,6:7)
        d.pfadd.dd    f18,f2,f4           // cp(i,11)+ap*bp(11),cp(i,8)
        nop
// j=16
        d.pfmul.dd    f24,f12,f2          // ap*bp(14), ap*bp(12)
        fld.q         16(rcp)++,f16       // cp(14:15)
        d.pfadd.dd    f20,f2,f6           // cp(i,12)+ap*bp(12),cp(i,9)
        fld.q         128(rbp),f8         // bp(16:17)
        d.pfmul.dd    f24,f14,f2          // ap*bp(15), ap*bp(13)
        fst.q         f4,16(rcps)++       // cp(i,8:9)
        d.pfadd.dd    f22,f2,f4           // cp(i,13)+ap*bp(13),cp(i,10)
        nop d.pfmul.dd    f24,f8,f2           // ap*bp(16), ap*bp(14)
        fld.q         16(rcp)++,f20       // cp(16:17)
        d.pfadd.dd    f16,f2,f6           // cp(i,14)+ap*bp(14),cp(i,11)
        fld.q         144(rbp),f12        // bp(18:19)
        d.pfmul.dd    f24,f10,f2          // ap*bp(17), ap*bp(15)
        fst.q         f4,16(rcps)++       // cp(i,10:11)
        d.pfadd.dd    f18,f2,f4           // cp(i,15)+ap*bp(15),cp(i,12)
        nop

// DEBUGGING CODE - LEAVING DUAL INSTRUCTION MODE fnop
        nop
        fnop
        nop
        nop                               // set breakpoint here
        nop
// END DEBUG CODE - RETURNING TO DUAL INSTR MODE // K loop Body:

d.fnop
        mov           rbr,r31             // swap br and bp
        d.fnop
        mov           rbp,rbr
        d.fnop
        adds          -152,r31,rbp        // and reset to 0th element.
// j=0
        d.pfmul.dd    f24,f12,f2          // ap*bp(18), ap*bp(16)
        fld.q         16(rcp)++,f16       // cp(18:19)
        d.pfadd.dd    f20,f2,f6           // cp(i,16)+ap*bp(16),cp(i,13)
        fld.q         0(rbp),f8           // bp(0:1)
        d.pfmul.dd    f24,f14,f2          // ap*bp(19), ap*bp(17)
        fst.q         f4,16(rcps)++       // cp(i,12:13)
        d.pfadd.dd    f22,f2,f4           // cp(i,17)+ap*bp(17),cp(i,14)
        pfld.d        raincl(ra1)++,f24   // ar = a1(I*n1+i,k)

d.pfmul.dd    f24,f8,f2           // ap*bp(0), ap*bp(18)
        fld.q         -3184(rcp)++,f20    // cp(0:1)
        d.pfadd.dd    f16,f2,f6           // cp(i,18)+ap*bp(18),cp(i,15)
        fld.q         16(rbp),f12         // bp(2:3)
        d.pfmul.dd    f24,f10,f2          // ap*bp(1), ap*bp(19)
        fst.q         f4,16(rcps)++       // cp(i,14:15)
```

```
          d.pfadd.dd    f18,f2,f4              // cp(i,19)+ap*bp(19),cp(i,16)
          pfld.d        rbinc2(rb1)++,f28      // b1(k,J*n1+i)
// j=4
          d.pfmul.dd    f24,f12,f2             // ap*bp(2), ap*bp(0)
          fld.q         16(rcp)++,f16          // cp(2:3)
          d.pfadd.dd    f20,f2,f6              // cp(i,0)+ap*bp(0),cp(i,17)
          fld.q         32(rbp),f8             // bp(4:5)
          d.pfmul.dd    f24,f14,f2             // ap*bp(3), ap*bp(1)
          fst.q         f4,16(rcps)++          // cp(i,16:17)
          d.pfadd.dd    f22,f2,f4              // cp(i,1)+ap*bp(1),cp(i,18)
          fst.d         f28,0(rbr)             // br(i)

d.pfmul.dd    f24,f8,f2              // ap*bp(4), ap*bp(2)
          fld.q         16(rcp)++,f20          // cp(4:5)
          d.pfadd.dd    f16,f2,f6              // cp(i,2)+ap*bp(2),cp(i,19)
          fld.q         48(rbp),f12            // bp(6:7)
          d.pfmul.dd    f24,f10,f2             // ap*bp(5), ap*bp(3)
          fst.q         f4,16(rcps)++          // cp(i,18:19)
          d.pfadd.dd    f18,f2,f4              // cp(i,3)+ap*bp(3),cp(i,0)
          fld.d         8(rcr)++,f28           // cr(i,k)
// j=8
          d.pfmul.dd    f24,f12,f2             // ap*bp(6), ap*bp(4)
          fld.q         16(rcp)++,f16          // cp(6:7)
          d.pfadd.dd    f20,f2,f6              // cp(i,4)+ap*bp(4),cp(i,1)
          fld.q         64(rbp),f8             // bp(8:9)
          d.pfmul.dd    f24,f14,f2             // ap*bp(7), ap*bp(5)
          fst.q         f4,-3184(rcps)++       // cp(i,0:1)
          d.pfadd.dd    f22,f2,f4              // cp(i,5)+ap*bp(5),cp(i,2)
          fst.d         f28,rcinc12(rc2)++     // c2(i,k)

d.pfmul.dd    f24,f8,f2              // ap*bp(8), ap*bp(6)
          fld.q         16(rcp)++,f20          // cp(8:9)
          d.pfadd.dd    f16,f2,f6              // cp(i,6)+ap*bp(6),cp(i,3)
          fld.q         80(rbp),f12            // bp(10:11)
          d.pfmul.dd    f24,f10,f2             // ap*bp(9), ap*bp(7)
          fst.q         f4,16(rcps)++          // cp(i,2:3)
          d.pfadd.dd    f18,f2,f4              // cp(i,7)+ap*bp(7),cp(i,4)
          pfld.d        8(ra1),f0              // dummy load pipeline push
// j=12
          d.pfmul.dd    f24,f12,f2             // ap*bp(10), ap*bp(8)
          fld.q         16(rcp)++,f16          // cp(10:11)
          d.pfadd.dd    f20,f2,f6              // cp(i,8)+ap*bp(8),cp(i,5)
          fld.q         96(rbp),f8             // bp(12:13)
          d.pfmul.dd    f24,f14,f2             // ap*bp(11), ap*bp(9)
          fst.q         f4,16(rcps)++          // cp(i,4:5)
          d.pfadd.dd    f22,f2,f4              // cp(i,9)+ap*bp(9),cp(i,6)
          nop d.pfmul.dd    f24,f8,f2              // ap*bp(12), ap*bp(10)
          fld.q         16(rcp)++,f20          // cp(12:13)
          d.pfadd.dd    f16,f2,f6              // cp(i,10)+ap*bp(10),cp(i,7)
          fld.q         112(rbp),f12           // bp(14:15)
          d.pfmul.dd    f24,f10,f2             // ap*bp(13), ap*bp(11)
          fst.q         f4,16(rcps)++          // cp(i,6:7)
          d.pfadd.dd    f18,f2,f4              // cp(i,11)+ap*bp(11),cp(i,8)
          nop
// j=16
          d.pfmul.dd    f24,f12,f2             // ap*bp(14), ap*bp(12)
          fld.q         16(rcp)++,f16          // cp(14:15)
          d.pfadd.dd    f20,f2,f6              // cp(i,12)+ap*bp(12),cp(i,9)
          fld.q         128(rbp),f8            // bp(16:17)
          d.pfmul.dd    f24,f14,f2             // ap*bp(15), ap*bp(13)
          fst.q         f4,16(rcps)++          // cp(i,8:9)
          d.pfadd.dd    f22,f2,f4              // cp(i,13)+ap*bp(13),cp(i,10)
          nop d.pfmul.dd    f24,f8,f2              // ap*bp(16), ap*bp(14)
          fld.q         16(rcp)++,f20          // cp(16:17)
          d.pfadd.dd    f16,f2,f6              // cp(i,14)+ap*bp(14),cp(i,11)
          fld.q         144(rbp),f12           // bp(18:19)
          d.pfmul.dd    f24,f10,f2             // ap*bp(17), ap*bp(15)
          fst.q         f4,16(rcps)++          // cp(i,10:11)
``` label17:                                                  // init i loop

// DEBUGGING CODE - LEAVING DUAL INSTRUCTION MODE

```
        fnop
          nop
        fnop
          nop
        nop                                              // set breakpoint here
        nop
```
// END DEBUG CODE - RETURNING TO DUAL INSTR MODE // I loop Body:

```
        d.fnop
          adds         17,r0,ricount        // icount = 17
        d.pfadd.dd     f18,f2,f4            // cp(i,15)+ap*bp(15),cp(i,12)
          bla          rminusl,ricount,label22  // delayed branch, 18 iter
// j=0
        d.pfmul.dd     f24,f12,f2           // ap*bp(18), ap*bp(16)
          fld.q        16(rcp)++,f16        // cp(18:19)

label22:
        d.pfadd.dd     f20,f2,f6            // cp(i,16)+ap*bp(16),cp(i,13)
          fld.q        0(rbp),f8            // bp(0:1)
        d.pfmul.dd     f24,f14,f2           // ap*bp(19), ap*bp(17)
          fst.q        f4,16(rcps)++        // cp(i,12:13)
        d.pfadd.dd     f22,f2,f4            // cp(i,17)+ap*bp(17),cp(i,14)
          pfld.d       raincl(ral)++,f24    // ar = al(I*nl+i,k)

d.pfmul.dd     f24,f8,f2            // ap*bp(0), ap*bp(18)
          fld.q        16(rcp)++,f20        // cp(0:1)
        d.pfadd.dd     f16,f2,f6            // cp(i,18)+ap*bp(18),cp(i,15)
          fld.q        16(rbp),f12          // bp(2:3)
        d.pfmul.dd     f24,f10,f2           // ap*bp(1), ap*bp(19)
          fst.q        f4,16(rcps)++        // cp(i,14:15)
        d.pfadd.dd     f18,f2,f4            // cp(i,19)+ap*bp(19),cp(i,16)
          pfld.d       rbinc2(rbl)++,f28    // bl(k,J*nl+i)
// j=4
        d.pfmul.dd     f24,f12,f2           // ap*bp(2), ap*bp(0)
          fld.q        16(rcp)++,f16        // cp(2:3)
        d.pfadd.dd     f20,f2,f6            // cp(i,0)+ap*bp(0),cp(i,17)
          fld.q        32(rbp),f8           // bp(4:5)
        d.pfmul.dd     f24,f14,f2           // ap*bp(3), ap*bp(1)
          fst.q        f4,16(rcps)++        // cp(i,16:17)
        d.pfadd.dd     f22,f2,f4            // cp(i,1)+ap*bp(1),cp(i,18)
          fst.d        f28,8(rbr)++         // br(i)

d.pfmul.dd     f24,f8,f2            // ap*bp(4), ap*bp(2)
          fld.q        16(rcp)++,f20        // cp(4:5)
        d.pfadd.dd     f16,f2,f6            // cp(i,2)+ap*bp(2),cp(i,19)
          fld.q        48(rbp),f12          // bp(6:7)
        d.pfmul.dd     f24,f10,f2           // ap*bp(5), ap*bp(3)
          fst.q        f4,16(rcps)++        // cp(i,18:19)
        d.pfadd.dd     f18,f2,f4            // cp(i,3)+ap*bp(3),cp(i,0)
          fld.d        8(rcr)++,f28         // cr(i,k)
// j=8
        d.pfmul.dd     f24,f12,f2           // ap*bp(6), ap*bp(4)
          fld.q        16(rcp)++,f16        // cp(6:7)
        d.pfadd.dd     f20,f2,f6            // cp(i,4)+ap*bp(4),cp(i,1)
          fld.q        64(rbp),f8           // bp(8:9)
        d.pfmul.dd     f24,f14,f2           // ap*bp(7), ap*bp(5)
          fst.q        f4,16(rcps)++        // cp(i,0:1)
        d.pfadd.dd     f22,f2,f4            // cp(i,5)+ap*bp(5),cp(i,2)
          fst.d        f28,rcinc2(rc2)++    // c2(i,k)

d.pfmul.dd     f24,f8,f2            // ap*bp(8), ap*bp(6)
          fld.q        16(rcp)++,f20        // cp(8:9)
        d.pfadd.dd     f16,f2,f6            // cp(i,6)+ap*bp(6),cp(i,3)
          fld.q        80(rbp),f12          // bp(10:11)
        d.pfmul.dd     f24,f10,f2           // ap*bp(9), ap*bp(7)
          fst.q        f4,16(rcps)++        // cp(i,2:3)
        d.pfadd.dd     f18,f2,f4            // cp(i,7)+ap*bp(7),cp(i,4)
          pfld.d       8(ral),f0            // dummy load pipeline push
```

```
// j=12
        d.pfmul.dd      f24,f12,f2              // ap*bp(10), ap*bp(8)
          fld.q         16(rcp)++,f16           // cp(10:11)
        d.pfadd.dd      f20,f2,f6               // cp(i,8)+ap*bp(8),cp(i,5)
          fld.q         96(rbp),f8              // bp(12:13)
        d.pfmul.dd      f24,f14,f2              // ap*bp(11), ap*bp(9)
          fst.q         f4,16(rcps)++           // cp(i,4:5)
        d.pfadd.dd      f22,f2,f4               // cp(i,9)+ap*bp(9),cp(i,6)
          nop d.pfmul.dd      f24,f8,f2               // ap*bp(12), ap*bp(10)
          fld.q         16(rcp)++,f20           // cp(12:13)
        d.pfadd.dd      f16,f2,f6               // cp(i,10)+ap*bp(10),cp(i,7)
          fld.q         112(rbp),f12            // bp(14:15)
        d.pfmul.dd      f24,f10,f2              // ap*bp(13), ap*bp(11)
          fst.q         f4,16(rcps)++           // cp(i,6:7)
        d.pfadd.dd      f18,f2,f4               // cp(i,11)+ap*bp(11),cp(i,8)
          nop
// j=16
        d.pfmul.dd      f24,f12,f2              // ap*bp(14), ap*bp(12)
          fld.q         16(rcp)++,f16           // cp(14:15)
        d.pfadd.dd      f20,f2,f6               // cp(i,12)+ap*bp(12),cp(i,9)
          fld.q         128(rbp),f8             // bp(16:17)
        d.pfmul.dd      f24,f14,f2              // ap*bp(15), ap*bp(13)
          fst.q         f4,16(rcps)++           // cp(i,8:9)
        d.pfadd.dd      f22,f2,f4               // cp(i,13)+ap*bp(13),cp(i,10)
          nop d.pfmul.dd      f24,f8,f2               // ap*bp(16), ap*bp(14)
          fld.q         16(rcp)++,f20           // cp(16:17)
        d.pfadd.dd      f16,f2,f6               // cp(i,14)+ap*bp(14),cp(i,11)
          fld.q         144(rbp),f12            // bp(18:19)
        d.pfmul.dd      f24,f10,f2              // ap*bp(17), ap*bp(15)
          fst.q         f4,16(rcps)++           // cp(i,10:11)
        d.pfadd.dd      f18,f2,f4               // cp(i,15)+ap*bp(15),cp(i,12)
          bla           rminus1,ricount,label22 // delayed branch, 18 iter
        d.pfmul.dd      f24,f12,f2              // ap*bp(18), ap*bp(16)
          fld.q         16(rcp)++,f16           // cp(18:19)

d.fnop
          adds          -1,rkcount,rkcount      // kcount--
        d.fnop
          bnc           label16                 // if(kcount>1) go to label16 d.fnop
          adds          -21,rnn3,rkcount        // kcount = nn3-21
        d.fnop
          bc            label20                 // if(kcount<0) go to label20

// DEBUGGING CODE - LEAVING DUAL INSTRUCTION MODE fnop
          nop
        fnop
          nop
          nop                                   // set breakpoint here
          nop
// END DEBUG CODE - RETURNING TO DUAL INSTR MODE d.fnop
          br            label19                 // start i loop
        d.fnop
          nop                                   // delayed branch label18:                                        // top of k loop

// DEBUGGING CODE - LEAVING DUAL INSTRUCTION MODE fnop
          nop
```

```
        fnop
         nop
    nop                              // set breakpoint here
    nop
// END DEBUG CODE - RETURNING TO DUAL INSTR MODE // 19th I iteration // j=0
        d.pfadd.dd      f20,f2,f6             // cp(i,16)+ap*bp(16),cp(i,13)
        fld.q           0(rbp),f8             // bp(0:1)
        d.pfmul.dd      f24,f14,f2            // ap*bp(19), ap*bp(17)
        fst.q           f4,16(rcps)++         // cp(i,12:13)
        d.pfadd.dd      f22,f2,f4             // cp(i,17)+ap*bp(17),cp(i,14)
        pfld.d          rainc21(ral)++,f24    // ar = al(I*nl+i,k)

d.pfmul.dd      f24,f8,f2             // ap*bp(0), ap*bp(18)
        fld.q           16(rcp)++,f20         // cp(0:1)
        d.pfadd.dd      f16,f2,f6             // cp(i,18)+ap*bp(18),cp(i,15)
        fld.q           16(rbp),f12           // bp(2:3)
        d.pfmul.dd      f24,f10,f2            // ap*bp(1), ap*bp(19)
        fst.q           f4,16(rcps)++         // cp(i,14:15)
        d.pfadd.dd      f18,f2,f4             // cp(i,19)+ap*bp(19),cp(i,16)
        pfld.d          rbinc12(rbl)++,f28    // bl(k,J*nl+i)
// j=4
        d.pfmul.dd      f24,f12,f2            // ap*bp(2), ap*bp(0)
        fld.q           16(rcp)++,f16         // cp(2:3)
        d.pfadd.dd      f20,f2,f6             // cp(i,0)+ap*bp(0),cp(i,17)
        fld.q           32(rbp),f8            // bp(4:5)
        d.pfmul.dd      f24,f14,f2            // ap*bp(3), ap*bp(1)
        fst.q           f4,16(rcps)++         // cp(i,16:17)
        d.pfadd.dd      f22,f2,f4             // cp(i,1)+ap*bp(1),cp(i,18)
        fst.d           f28,8(rbr)++          // br(i)

d.pfmul.dd      f24,f8,f2             // ap*bp(4), ap*bp(2)
        fld.q           16(rcp)++,f20         // cp(4:5)
        d.pfadd.dd      f16,f2,f6             // cp(i,2)+ap*bp(2),cp(i,19)
        fld.q           48(rbp),f12           // bp(6:7)
        d.pfmul.dd      f24,f10,f2            // ap*bp(5), ap*bp(3)
        fst.q           f4,16(rcps)++         // cp(i,18:19)
        d.pfadd.dd      f18,f2,f4             // cp(i,3)+ap*bp(3),cp(i,0)
        nop
// j=8
        d.pfmul.dd      f24,f12,f2            // ap*bp(6), ap*bp(4)
        fld.q           16(rcp)++,f16         // cp(6:7)
        d.pfadd.dd      f20,f2,f6             // cp(i,4)+ap*bp(4),cp(i,1)
        fld.q           64(rbp),f8            // bp(8:9)
        d.pfmul.dd      f24,f14,f2            // ap*bp(7), ap*bp(5)
        fst.q           f4,16(rcps)++         // cp(i,0:1)
        d.pfadd.dd      f22,f2,f4             // cp(i,5)+ap*bp(5),cp(i,2)
        nop d.pfmul.dd      f24,f8,f2             // ap*bp(8), ap*bp(6)
        fld.q           16(rcp)++,f20         // cp(8:9)
        d.pfadd.dd      f16,f2,f6             // cp(i,6)+ap*bp(6),cp(i,3)
        fld.q           80(rbp),f12           // bp(10:11)
        d.pfmul.dd      f24,f10,f2            // ap*bp(9), ap*bp(7)
        fst.q           f4,16(rcps)++         // cp(i,2:3)
        d.pfadd.dd      f18,f2,f4             // cp(i,7)+ap*bp(7),cp(i,4)
        pfld.d          8(ral),f0             // dummy load pipeline push
// j=12
        d.pfmul.dd      f24,f12,f2            // ap*bp(10), ap*bp(8)
        fld.q           16(rcp)++,f16         // cp(10:11)
        d.pfadd.dd      f20,f2,f6             // cp(i,8)+ap*bp(8),cp(i,5)
        fld.q           96(rbp),f8            // bp(12:13)
        d.pfmul.dd      f24,f14,f2            // ap*bp(11), ap*bp(9)
        fst.q           f4,16(rcps)++         // cp(i,4:5)
        d.pfadd.dd      f22,f2,f4             // cp(i,9)+ap*bp(9),cp(i,6)
        nop d.pfmul.dd      f24,f8,f2             // ap*bp(12), ap*bp(10)
        fld.q           16(rcp)++,f20         // cp(12:13)
```

```
            d.pfadd.dd      f16,f2,f6            // cp(i,10)+ap*bp(10),cp(i,7)
              fld.q         112(rbp),f12         // bp(14:15)
            d.pfmul.dd      f24,f10,f2           // ap*bp(13), ap*bp(11)
              fst.q         f4,16(rcps)++        // cp(i,6:7)
            d.pfadd.dd      f18,f2,f4            // cp(i,11)+ap*bp(11),cp(i,8)
              nop
// j=16
            d.pfmul.dd      f24,f12,f2           // ap*bp(14), ap*bp(12)
              fld.q         16(rcp)++,f16        // cp(14:15)
            d.pfadd.dd      f20,f2,f6            // cp(i,12)+ap*bp(12),cp(i,9)
              fld.q         128(rbp),f8          // bp(16:17)
            d.pfmul.dd      f24,f14,f2           // ap*bp(15), ap*bp(13)
              fst.q         f4,16(rcps)++        // cp(i,8:9)
            d.pfadd.dd      f22,f2,f4            // cp(i,13)+ap*bp(13),cp(i,10)
              nop d.pfmul.dd      f24,f8,f2            // ap*bp(16), ap*bp(14)
              fld.q         16(rcp)++,f20        // cp(16:17)
            d.pfadd.dd      f16,f2,f6            // cp(i,14)+ap*bp(14),cp(i,11)
              fld.q         144(rbp),f12         // bp(18:19)
            d.pfmul.dd      f24,f10,f2           // ap*bp(17), ap*bp(15)
              fst.q         f4,16(rcps)++        // cp(i,10:11)
            d.pfadd.dd      f18,f2,f4            // cp(i,15)+ap*bp(15),cp(i,12)
              nop

// DEBUGGING CODE - LEAVING DUAL INSTRUCTION MODE fnop
          nop
        fnop
          nop
          nop                                    // set breakpoint here
          nop
// END DEBUG CODE - RETURNING TO DUAL INSTR MODE // K loop Body:

d.fnop
              mov           rbr,r31              // swap br and bp
            d.fnop
              mov           rbp,rbr
            d.fnop
              adds          -152,r31,rbp         // and reset to 0th element.
// j=0
            d.pfmul.dd      f24,f12,f2           // ap*bp(18), ap*bp(16)
              fld.q         16(rcp)++,f16        // cp(18:19)
            d.pfadd.dd      f20,f2,f6            // cp(i,16)+ap*bp(16),cp(i,13)
              fld.q         0(rbp),f8            // bp(0:1)
            d.pfmul.dd      f24,f14,f2           // ap*bp(19), ap*bp(17)
              fst.q         f4,16(rcps)++        // cp(i,12:13)
            d.pfadd.dd      f22,f2,f4            // cp(i,17)+ap*bp(17),cp(i,14)
              pfld.d        raincl(ra1)++,f24    // ar = a1(I*n1+i,k)

d.pfmul.dd      f24,f8,f2            // ap*bp(0), ap*bp(18)
              fld.q         -3184(rcp)++,f20     // cp(0:1)
            d.pfadd.dd      f16,f2,f6            // cp(i,18)+ap*bp(18),cp(i,15)
              fld.q         16(rbp),f12          // bp(2:3)
            d.pfmul.dd      f24,f10,f2           // ap*bp(1), ap*bp(19)
              fst.q         f4,16(rcps)++        // cp(i,14:15)
            d.pfadd.dd      f18,f2,f4            // cp(i,19)+ap*bp(19),cp(i,16)
              pfld.d        rbinc2(rb1)++,f28    // b1(k,J*n1+i)
// j=4
            d.pfmul.dd      f24,f12,f2           // ap*bp(2), ap*bp(0)
              fld.q         16(rcp)++,f16        // cp(2:3)
            d.pfadd.dd      f20,f2,f6            // cp(i,0)+ap*bp(0),cp(i,17)
              fld.q         32(rbp),f8           // bp(4:5)
            d.pfmul.dd      f24,f14,f2           // ap*bp(3), ap*bp(1)
              fst.q         f4,16(rcps)++        // cp(i,16:17)
            d.pfadd.dd      f22,f2,f4            // cp(i,1)+ap*bp(1),cp(i,18)
              fst.d         f28,0(rbr)           // br(i)
```

```
            d.pfmul.dd      f24,f8,f2            // ap*bp(4), ap*bp(2)
            fld.q           16(rcp)++,f20        // cp(4:5)
            d.pfadd.dd      f16,f2,f6            // cp(i,2)+ap*bp(2),cp(i,19)
            fld.q           48(rbp),f12          // bp(6:7)
            d.pfmul.dd      f24,f10,f2           // ap*bp(5), ap*bp(3)
            fst.q           f4,16(rcps)++        // cp(i,18:19)
            d.pfadd.dd      f18,f2,f4            // cp(i,3)+ap*bp(3),cp(i,0)
            nop
// j=8
            d.pfmul.dd      f24,f12,f2           // ap*bp(6), ap*bp(4)
            fld.q           16(rcp)++,f16        // cp(6:7)
            d.pfadd.dd      f20,f2,f6            // cp(i,4)+ap*bp(4),cp(i,1)
            fld.q           64(rbp),f8           // bp(8:9)
            d.pfmul.dd      f24,f14,f2           // ap*bp(7), ap*bp(5)
            fst.q           f4,-3184(rcps)++     // cp(i,0:1)
            d.pfadd.dd      f22,f2,f4            // cp(i,5)+ap*bp(5),cp(i,2)
            nop d.pfmul.dd      f24,f8,f2            // ap*bp(8), ap*bp(6)
            fld.q           16(rcp)++,f20        // cp(8:9)
            d.pfadd.dd      f16,f2,f6            // cp(i,6)+ap*bp(6),cp(i,3)
            fld.q           80(rbp),f12          // bp(10:11)
            d.pfmul.dd      f24,f10,f2           // ap*bp(9), ap*bp(7)
            fst.q           f4,16(rcps)++        // cp(i,2:3)
            d.pfadd.dd      f18,f2,f4            // cp(i,7)+ap*bp(7),cp(i,4)
            pfld.d          8(ra1),f0            // dummy load pipeline push
// j=12
            d.pfmul.dd      f24,f12,f2           // ap*bp(10), ap*bp(8)
            fld.q           16(rcp)++,f16        // cp(10:11)
            d.pfadd.dd      f20,f2,f6            // cp(i,8)+ap*bp(8),cp(i,5)
            fld.q           96(rbp),f8           // bp(12:13)
            d.pfmul.dd      f24,f14,f2           // ap*bp(11), ap*bp(9)
            fst.q           f4,16(rcps)++        // cp(i,4:5)
            d.pfadd.dd      f22,f2,f4            // cp(i,9)+ap*bp(9),cp(i,6)
            nop d.pfmul.dd      f24,f8,f2            // ap*bp(12), ap*bp(10)
            fld.q           16(rcp)++,f20        // cp(12:13)
            d.pfadd.dd      f16,f2,f6            // cp(i,10)+ap*bp(10),cp(i,7)
            fld.q           112(rbp),f12         // bp(14:15)
            d.pfmul.dd      f24,f10,f2           // ap*bp(13), ap*bp(11)
            fst.q           f4,16(rcps)++        // cp(i,6:7)
            d.pfadd.dd      f18,f2,f4            // cp(i,11)+ap*bp(11),cp(i,8)
            nop
// j=16
            d.pfmul.dd      f24,f12,f2           // ap*bp(14), ap*bp(12)
            fld.q           16(rcp)++,f16        // cp(14:15)
            d.pfadd.dd      f20,f2,f6            // cp(i,12)+ap*bp(12),cp(i,9)
            fld.q           128(rbp),f8          // bp(16:17)
            d.pfmul.dd      f24,f14,f2           // ap*bp(15), ap*bp(13)
            fst.q           f4,16(rcps)++        // cp(i,8:9)
            d.pfadd.dd      f22,f2,f4            // cp(i,13)+ap*bp(13),cp(i,10)
            nop d.pfmul.dd      f24,f8,f2            // ap*bp(16), ap*bp(14)
            fld.q           16(rcp)++,f20        // cp(16:17)
            d.pfadd.dd      f16,f2,f6            // cp(i,14)+ap*bp(14),cp(i,11)
            fld.q           144(rbp),f12         // bp(18:19)
            d.pfmul.dd      f24,f10,f2           // ap*bp(17), ap*bp(15)
            fst.q           f4,16(rcps)++        // cp(i,10:11)
label19:                                         // init i loop

// DEBUGGING CODE - LEAVING DUAL INSTRUCTION MODE fnop
            nop
            fnop
            nop                                  // set breakpoint here
            nop
            nop
```

// END DEBUG CODE - RETURNING TO DUAL INSTR MODE

// I loop Body:

```
            d.fnop
                adds            17,r0,ricount           // icount = 17
            d.pfadd.dd          f18,f2,f4               // cp(i,15)+ap*bp(15),cp(i,12)
                bla             rminus1,ricount,label23 // delayed branch, 18 iter
// j=0
            d.pfmul.dd          f24,f12,f2              // ap*bp(18), ap*bp(16)
                fld.q           16(rcp)++,f16           // cp(18:19)

label23:
            d.pfadd.dd          f20,f2,f6               // cp(i,16)+ap*bp(16),cp(i,13)
                fld.q           0(rbp),f8               // bp(0:1)
            d.pfmul.dd          f24,f14,f2              // ap*bp(19), ap*bp(17)
                fst.q           f4,16(rcps)++           // cp(i,12:13)
            d.pfadd.dd          f22,f2,f4               // cp(i,17)+ap*bp(17),cp(i,14)
                pfld.d          raincl(ra1)++,f24       // ar = a1(I*n1+i,k)

d.pfmul.dd          f24,f8,f2               // ap*bp(0), ap*bp(18)
                fld.q           16(rcp)++,f20           // cp(0:1)
            d.pfadd.dd          f16,f2,f6               // cp(i,18)+ap*bp(18),cp(i,15)
                fld.q           16(rbp),f12             // bp(2:3)
            d.pfmul.dd          f24,f10,f2              // ap*bp(1), ap*bp(19)
                fst.q           f4,16(rcps)++           // cp(i,14:15)
            d.pfadd.dd          f18,f2,f4               // cp(i,19)+ap*bp(19),cp(i,16)
                pfld.d          rbinc2(rb1)++,f28       // b1(k,J*n1+i)
// j=4
            d.pfmul.dd          f24,f12,f2              // ap*bp(2), ap*bp(0)
                fld.q           16(rcp)++,f16           // cp(2:3)
            d.pfadd.dd          f20,f2,f6               // cp(i,0)+ap*bp(0),cp(i,17)
                fld.q           32(rbp),f8              // bp(4:5)
            d.pfmul.dd          f24,f14,f2              // ap*bp(3), ap*bp(1)
                fst.q           f4,16(rcps)++           // cp(i,16:17)
            d.pfadd.dd          f22,f2,f4               // cp(i,1)+ap*bp(1),cp(i,18)
                fst.d           f28,8(rbr)++            // br(i)

d.pfmul.dd          f24,f8,f2               // ap*bp(4), ap*bp(2)
                fld.q           16(rcp)++,f20           // cp(4:5)
            d.pfadd.dd          f16,f2,f6               // cp(i,2)+ap*bp(2),cp(i,19)
                fld.q           48(rbp),f12             // bp(6:7)
            d.pfmul.dd          f24,f10,f2              // ap*bp(5), ap*bp(3)
                fst.q           f4,16(rcps)++           // cp(i,18:19)
            d.pfadd.dd          f18,f2,f4               // cp(i,3)+ap*bp(3),cp(i,0)
                nop
// j=8
            d.pfmul.dd          f24,f12,f2              // ap*bp(6), ap*bp(4)
                fld.q           16(rcp)++,f16           // cp(6:7)
            d.pfadd.dd          f20,f2,f6               // cp(i,4)+ap*bp(4),cp(i,1)
                fld.q           64(rbp),f8              // bp(8:9)
            d.pfmul.dd          f24,f14,f2              // ap*bp(7), ap*bp(5)
                fst.q           f4,16(rcps)++           // cp(i,0:1)
            d.pfadd.dd          f22,f2,f4               // cp(i,5)+ap*bp(5),cp(i,2)
                nop d.pfmul.dd          f24,f8,f2               // ap*bp(8), ap*bp(6)
                fld.q           16(rcp)++,f20           // cp(8:9)
            d.pfadd.dd          f16,f2,f6               // cp(i,6)+ap*bp(6),cp(i,3)
                fld.q           80(rbp),f12             // bp(10:11)
            d.pfmul.dd          f24,f10,f2              // ap*bp(9), ap*bp(7)
                fst.q           f4,16(rcps)++           // cp(i,2:3)
            d.pfadd.dd          f18,f2,f4               // cp(i,7)+ap*bp(7),cp(i,4)
                pfld.d          8(ra1),f0               // dummy load pipeline push
// j=12
            d.pfmul.dd          f24,f12,f2              // ap*bp(10), ap*bp(8)
                fld.q           16(rcp)++,f16           // cp(10:11)
            d.pfadd.dd          f20,f2,f6               // cp(i,8)+ap*bp(8),cp(i,5)
                fld.q           96(rbp),f8              // bp(12:13)
            d.pfmul.dd          f24,f14,f2              // ap*bp(11), ap*bp(9)
                fst.q           f4,16(rcps)++           // cp(i,4:5)
            d.pfadd.dd          f22,f2,f4               // cp(i,9)+ap*bp(9),cp(i,6)
                nop
```

```
            d.pfmul.dd      f24,f8,f2               // ap*bp(12), ap*bp(10)
              fld.q         16(rcp)++,f20           // cp(12:13)
            d.pfadd.dd      f16,f2,f6               // cp(i,10)+ap*bp(10),cp(i,7)
              fld.q         112(rbp),f12            // bp(14:15)
            d.pfmul.dd      f24,f10,f2              // ap*bp(13), ap*bp(11)
              fst.q         f4,16(rcps)++           // cp(i,6:7)
            d.pfadd.dd      f18,f2,f4               // cp(i,11)+ap*bp(11),cp(i,8)
              nop // j=16
            d.pfmul.dd      f24,f12,f2              // ap*bp(14), ap*bp(12)
              fld.q         16(rcp)++,f16           // cp(14:15)
            d.pfadd.dd      f20,f2,f6               // cp(i,12)+ap*bp(12),cp(i,9)
              fld.q         128(rbp),f8             // bp(16:17)
            d.pfmul.dd      f24,f14,f2              // ap*bp(15), ap*bp(13)
              fst.q         f4,16(rcps)++           // cp(i,8:9)
            d.pfadd.dd      f22,f2,f4               // cp(i,13)+ap*bp(13),cp(i,10)
              nop d.pfmul.dd      f24,f8,f2               // ap*bp(16), ap*bp(14)
              fld.q         16(rcp)++,f20           // cp(16:17)
            d.pfadd.dd      f16,f2,f6               // cp(i,14)+ap*bp(14),cp(i,11)
              fld.q         144(rbp),f12            // bp(18:19)
            d.pfmul.dd      f24,f10,f2              // ap*bp(17), ap*bp(15)
              fst.q         f4,16(rcps)++           // cp(i,10:11)
            d.pfadd.dd      f18,f2,f4               // cp(i,15)+ap*bp(15),cp(i,12)
              bla           rminus1,ricount,label23 // delayed branch, 18 iter
            d.pfmul.dd      f24,f12,f2              // ap*bp(18), ap*bp(16)
              fld.q         16(rcp)++,f16           // cp(18:19)

d.fnop
              adds          -1,rkcount,rkcount      // kcount--
            d.fnop
              bnc           label18                 // if(kcount>1) go to label18 label20:                                            // init i loop

// DEBUGGING CODE - LEAVING DUAL INSTRUCTION MODE fnop
          nop
        fnop
          nop                                       // set breakpoint here
          nop
// END DEBUG CODE - RETURNING TO DUAL INSTR MODE // 19th I iteration // j=0
            d.pfadd.dd      f20,f2,f6               // cp(i,16)+ap*bp(16),cp(i,13)
              fld.q         0(rbp),f8               // bp(0:1)
            d.pfmul.dd      f24,f14,f2              // ap*bp(19), ap*bp(17)
              fst.q         f4,16(rcps)++           // cp(i,12:13)
            d.pfadd.dd      f22,f2,f4               // cp(i,17)+ap*bp(17),cp(i,14)
              pfld.d        rainc21(ral)++,f24      // ar = al(I*n1+i,k)

d.pfmul.dd      f24,f8,f2               // ap*bp(0), ap*bp(18)
              fld.q         16(rcp)++,f20           // cp(0:1)
            d.pfadd.dd      f16,f2,f6               // cp(i,18)+ap*bp(18),cp(i,15)
              fld.q         16(rbp),f12             // bp(2:3)
            d.pfmul.dd      f24,f10,f2              // ap*bp(1), ap*bp(19)
              fst.q         f4,16(rcps)++           // cp(i,14:15)
            d.pfadd.dd      f18,f2,f4               // cp(i,19)+ap*bp(19),cp(i,16)
              pfld.d        rbinc12(rb1)++,f28      // bl(k,J*n1+i)

// j=4
            d.pfmul.dd      f24,f12,f2              // ap*bp(2), ap*bp(0)
              fld.q         16(rcp)++,f16           // cp(2:3)
            d.pfadd.dd      f20,f2,f6               // cp(i,0)+ap*bp(0),cp(i,17)
              fld.q         32(rbp),f8              // bp(4:5)
            d.pfmul.dd      f24,f14,f2              // ap*bp(3), ap*bp(1)
              fst.q         f4,16(rcps)++           // cp(i,16:17)
            d.pfadd.dd      f22,f2,f4               // cp(i,1)+ap*bp(1),cp(i,18)
              fst.d         f28,8(rbr)++            // br(i)
```

```
          d.pfmul.dd    f24,f8,f2              // ap*bp(4), ap*bp(2)
          fld.q         16(rcp)++,f20          // cp(4:5)
          d.pfadd.dd    f16,f2,f6              // cp(i,2)+ap*bp(2),cp(i,19)
          fld.q         48(rbp),f12            // bp(6:7)
          d.pfmul.dd    f24,f10,f2             // ap*bp(5), ap*bp(3)
          fst.q         f4,16(rcps)++          // cp(i,18:19)
          d.pfadd.dd    f18,f2,f4              // cp(i,3)+ap*bp(3),cp(i,0)
          fld.d         8(rcr)++,f28           // cr(i,k)
// j=8
          d.pfmul.dd    f24,f12,f2             // ap*bp(6), ap*bp(4)
          fld.q         16(rcp)++,f16          // cp(6:7)
          d.pfadd.dd    f20,f2,f6              // cp(i,4)+ap*bp(4),cp(i,1)
          fld.q         64(rbp),f8             // bp(8:9)
          d.pfmul.dd    f24,f14,f2             // ap*bp(7), ap*bp(5)
          fst.q         f4,16(rcps)++          // cp(i,0:1)
          d.pfadd.dd    f22,f2,f4              // cp(i,5)+ap*bp(5),cp(i,2)
          fst.d         f28,rcinc2(rc2)++      // c2(i,k)
          d.pfmul.dd    f24,f8,f2              // ap*bp(8), ap*bp(6)
          fld.q         16(rcp)++,f20          // cp(8:9)
          d.pfadd.dd    f16,f2,f6              // cp(i,6)+ap*bp(6),cp(i,3)
          fld.q         80(rbp),f12            // bp(10:11)
          d.pfmul.dd    f24,f10,f2             // ap*bp(9), ap*bp(7)
          fst.q         f4,16(rcps)++          // cp(i,2:3)
          d.pfadd.dd    f18,f2,f4              // cp(i,7)+ap*bp(7),cp(i,4)
          pfld.d        8(ra1),f0              // dummy load pipeline push
// j=12
          d.pfmul.dd    f24,f12,f2             // ap*bp(10), ap*bp(8)
          fld.q         16(rcp)++,f16          // cp(10:11)
          d.pfadd.dd    f20,f2,f6              // cp(i,8)+ap*bp(8),cp(i,5)
          fld.q         96(rbp),f8             // bp(12:13)
          d.pfmul.dd    f24,f14,f2             // ap*bp(11), ap*bp(9)
          fst.q         f4,16(rcps)++          // cp(i,4:5)
          d.pfadd.dd    f22,f2,f4              // cp(i,9)+ap*bp(9),cp(i,6)
          nop d.pfmul.dd    f24,f8,f2              // ap*bp(12), ap*bp(10)
          fld.q         16(rcp)++,f20          // cp(12:13)
          d.pfadd.dd    f16,f2,f6              // cp(i,10)+ap*bp(10),cp(i,7)
          fld.q         112(rbp),f12           // bp(14:15)
          d.pfmul.dd    f24,f10,f2             // ap*bp(13), ap*bp(11)
          fst.q         f4,16(rcps)++          // cp(i,6:7)
          d.pfadd.dd    f18,f2,f4              // cp(i,11)+ap*bp(11),cp(i,8)
          nop
// j=16
          d.pfmul.dd    f24,f12,f2             // ap*bp(14), ap*bp(12)
          fld.q         16(rcp)++,f16          // cp(14:15)
          d.pfadd.dd    f20,f2,f6              // cp(i,12)+ap*bp(12),cp(i,9)
          fld.q         128(rbp),f8            // bp(16:17)
          d.pfmul.dd    f24,f14,f2             // ap*bp(15), ap*bp(13)
          fst.q         f4,16(rcps)++          // cp(i,8:9)
          d.pfadd.dd    f22,f2,f4              // cp(i,13)+ap*bp(13),cp(i,10)
          nop d.pfmul.dd    f24,f8,f2              // ap*bp(16), ap*bp(14)
          fld.q         16(rcp)++,f20          // cp(16:17)
          d.pfadd.dd    f16,f2,f6              // cp(i,14)+ap*bp(14),cp(i,11)
          fld.q         144(rbp),f12           // bp(18:19)
          d.pfmul.dd    f24,f10,f2             // ap*bp(17), ap*bp(15)
          fst.q         f4,16(rcps)++          // cp(i,10:11)
          d.pfadd.dd    f18,f2,f4              // cp(i,15)+ap*bp(15),cp(i,12)
          nop // Pipeline Drain:

// j=0
          d.pfmul.dd    f24,f12,f2             // ap*bp(18), ap*bp(16)
          fld.q         16(rcp)++,f16          // cp(18:19)
          d.pfadd.dd    f20,f2,f6              // cp(19,16)+ap*bp(16),cp(19,13)
          nop
          d.pfmul.dd    f24,f14,f2             // ap*bp(19), ap*bp(17)
          fst.q         f4,16(rcps)++          // cp(19,12:13)
          d.pfadd.dd    f22,f2,f4              // cp(19,17)+ap*bp(17),cp(19,14)
          nop
```

```
          d.pfmul.dd      f0,f0,f2              // --, ap*bp(18)
            nop
          d.pfadd.dd      f16,f2,f6             // cp(19,18)+ap*bp(18),cp(19,15)
            nop
          d.pfmul.dd      f0,f0,f2              // --, ap*bp(19)
            fst.q         f4,16(rcps)++         // cp(19,14:15)
          d.pfadd.dd      f18,f2,f4             // cp(19,19)+ap*bp(19),cp(19,16)
            pfld.d        0(rb1),f28            // bl(k,J*n1+i)
// j=4
          d.pfadd.dd      f0,f0,f6              // --, cp(19,17)
            nop
          d.fnop
            fst.q         f4,16(rcps)++         // cp(19,16:17)
          d.pfadd.dd      f0,f0,f4              // --, cp(19,18)
            nop d.pfadd.dd      f0,f0,f6              // --, cp(19,19)
            nop
          d.fnop
            fst.q         f4,16(rcps)++         // cp(19,18:19)
// j=8

// j=12

// j=16

//        exit dual instruction mode
          fnop
            nop
          fnop
            nop label15:                                        // end if

// DEBUGGING CODE - LEAVING DUAL INSTRUCTION MODE fnop
            nop
          fnop
            nop
          nop                                   // set breakpoint here
          nop
// END DEBUG CODE - RETURNING TO DUAL INSTR MODE br              label24               // else
          nop                                   // delayed branch
label5:

// DEBUGGING CODE - LEAVING DUAL INSTRUCTION MODE fnop
            nop
          fnop
            nop
          nop                                   // set breakpoint here
          nop
// END DEBUG CODE - RETURNING TO DUAL INSTR MODE // Write cr into C2 adds            18,r0,rkcount         // kcount=18
          fld.d           0(rcr),f26            // cr(0,0)
          fld.d           8(rcr)++,f28          // cr(0,1)
          fst.d           f26,0(rc2)            //           c2(0,0)
          fld.d           8(rcr)++,f26          // cr(0,2)
          fst.d           f28,rcinc2(rc2)++     //           c2(0,1)
          fld.d           8(rcr)++,f28          // cr(0,3)
          fst.d           f26,rcinc2(rc2)++     //           c2(0,2)
          fld.d           8(rcr)++,f26          // cr(0,4)
          fst.d           f28,rcinc2(rc2)++     //           c2(0,3)
          fld.d           8(rcr)++,f28          // cr(0,5)
```

```
          fst.d      f26,rcinc2(rc2)++        //            c2(0,4)
          fld.d      8(rcr)++,f26             // cr(0,6)
          fst.d      f28,rcinc2(rc2)++        //            c2(0,5)
          fld.d      8(rcr)++,f28             // cr(0,7)
          fst.d      f26,rcinc2(rc2)++        //            c2(0,6)
          fld.d      8(rcr)++,f26             // cr(0,8)
          fst.d      f28,rcinc2(rc2)++        //            c2(0,7)
          fld.d      8(rcr)++,f28             // cr(0,9)
          fst.d      f26,rcinc2(rc2)++        //            c2(0,8)
          fld.d      8(rcr)++,f26             // cr(0,10)
          fst.d      f28,rcinc2(rc2)++        //            c2(0,9)
          fld.d      8(rcr)++,f28             // cr(0,11)
          fst.d      f26,rcinc2(rc2)++        //            c2(0,10)
          fld.d      8(rcr)++,f26             // cr(0,12)
          fst.d      f28,rcinc2(rc2)++        //            c2(0,11)
          fld.d      8(rcr)++,f28             // cr(0,13)
          fst.d      f26,rcinc2(rc2)++        //            c2(0,12)
          fld.d      8(rcr)++,f26             // cr(0,14)
          fst.d      f28,rcinc2(rc2)++        //            c2(0,13)
          fld.d      8(rcr)++,f28             // cr(0,15)
          fst.d      f26,rcinc2(rc2)++        //            c2(0,14)
          fld.d      8(rcr)++,f26             // cr(0,16)
          fst.d      f28,rcinc2(rc2)++        //            c2(0,15)
          fld.d      8(rcr)++,f28             // cr(0,17)
          fst.d      f26,rcinc2(rc2)++        //            c2(0,16)
          fld.d      8(rcr)++,f26             // cr(0,18)
          fst.d      f28,rcinc2(rc2)++        //            c2(0,17)
          fld.d      8(rcr)++,f28             // cr(0,19)

bla        rminus1,rkcount,label25  // set up 19 iterations
          fst.d      f26,rcinc2(rc2)++        //            c2(0,18)

label25:
          fld.d      8(rcr)++,f26             // cr(k,0)
          fst.d      f28,rcinc2(rc2)++        //            c2(k,19)
          fld.d      8(rcr)++,f28             // cr(k,1)
          fst.d      f26,rcinc12(rc2)++       //            c2(k,0)
          fld.d      8(rcr)++,f26             // cr(k,3)
          fst.d      f28,rcinc2(rc2)++        //            c2(k,2)
          fld.d      8(rcr)++,f28             // cr(k,4)
          fst.d      f26,rcinc2(rc2)++        //            c2(k,3)
          fld.d      8(rcr)++,f26             // cr(k,5)
          fst.d      f28,rcinc2(rc2)++        //            c2(k,4)
          fld.d      8(rcr)++,f28             // cr(k,6)
          fst.d      f26,rcinc2(rc2)++        //            c2(k,5)
          fld.d      8(rcr)++,f26             // cr(k,7)
          fst.d      f28,rcinc2(rc2)++        //            c2(k,6)
          fld.d      8(rcr)++,f28             // cr(k,8)
          fst.d      f26,rcinc2(rc2)++        //            c2(k,7)
          fld.d      8(rcr)++,f26             // cr(k,9)
          fst.d      f28,rcinc2(rc2)++        //            c2(k,8)
          fld.d      8(rcr)++,f28             // cr(k,10)
          fst.d      f26,rcinc2(rc2)++        //            c2(k,9)
          fld.d      8(rcr)++,f26             // cr(k,11)
          fst.d      f28,rcinc2(rc2)++        //            c2(k,10)
          fld.d      8(rcr)++,f28             // cr(k,12)
          fst.d      f26,rcinc2(rc2)++        //            c2(k,11)
          fld.d      8(rcr)++,f26             // cr(k,13)
          fst.d      f28,rcinc2(rc2)++        //            c2(k,12)
          fld.d      8(rcr)++,f28             // cr(k,14)
          fst.d      f26,rcinc2(rc2)++        //            c2(k,13)
          fld.d      8(rcr)++,f26             // cr(k,15)
          fst.d      f28,rcinc2(rc2)++        //            c2(k,14)
          fld.d      8(rcr)++,f28             // cr(k,16)
          fst.d      f26,rcinc2(rc2)++        //            c2(k,15)
          fld.d      8(rcr)++,f26             // cr(k,17)
          fst.d      f28,rcinc2(rc2)++        //            c2(k,16)
          fld.d      8(rcr)++,f28             // cr(k,18)
          fst.d      f26,rcinc2(rc2)++        //            c2(k,17)
          fld.d      8(rcr)++,f26             // cr(k,18)
          fst.d      f28,rcinc2(rc2)++        //            c2(k,17)
          fld.d      8(rcr)++,f28             // cr(k,19)
```

```
        bla           rminus1,rkcount,label25   // loop 19 iterations
        fst.d         f26,rcinc2(rc2)++         //         c2(k,18)
        fst.d         f28,rcinc2(rc2)++         //         c2(19,19)

label24:                                        // end if

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE br            label26                   // else
        nop                                     // delayed branch
label4:

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE bte           0,rc1,label27             // if (C1) then bte           0,rc0,label28             // if (C0) then // * compute + READ *

// *       + Compute + READ * adds          19,r0,rkcount             // kcount = 19 (20 iter)

.align        8                         // align for dual instr. mode
// Pipeline Fill:

// j=0
        d.fnop
          fld.q       0(rbp),f8                 // bp(0:1)
        d.fnop
          pfld.d      raincl(ra1)++,f24         // ar = al(I*n1+i,k)

d.pfmul.dd    f24,f8,f0                 // ap*bp(0), --
          fld.q       0(rcp),f20                // cp(0:1)
        d.fnop
          fld.q       16(rbp),f12               // bp(2:3)
        d.pfmul.dd    f24,f10,f0                // ap*bp(1), --
          nop
        d.fnop
          pfld.d      rbinc2(rb1)++,f28         // bl(k,J*n1+i)
// j=4
        d.pfmul.dd    f24,f12,f2                // ap*bp(2), ap*bp(0)
          fld.q       16(rcp)++,f16             // cp(2:3)
        d.pfadd.dd    f20,f2,f0                 // cp(i,0)+ap*bp(0),--
          fld.q       32(rbp),f8                // bp(4:5)
        d.pfmul.dd    f24,f14,f2                // ap*bp(3), ap*bp(1)
          nop
        d.pfadd.dd    f22,f2,f0                 // cp(i,1)+ap*bp(1),--
          fst.d       f28,0(rbr)                // br(i)
```

```
            d.pfmul.dd    f24,f8,f2              // ap*bp(4), ap*bp(2)
            fld.q         16(rcp)++,f20          // cp(4:5)
            d.pfadd.dd    f16,f2,f0              // cp(i,2)+ap*bp(2),--
            fld.q         48(rbp),f12            // bp(6:7)
            d.pfmul.dd    f24,f10,f2             // ap*bp(5), ap*bp(3)
            nop
            d.pfadd.dd    f18,f2,f4              // cp(i,3)+ap*bp(3),cp(i,0)
            nop
// j=8
            d.pfmul.dd    f24,f12,f2             // ap*bp(6), ap*bp(4)
            fld.q         16(rcp)++,f16          // cp(6:7)
            d.pfadd.dd    f20,f2,f6              // cp(i,4)+ap*bp(4),cp(i,1)
            fld.q         64(rbp),f8             // bp(8:9)
            d.pfmul.dd    f24,f14,f2             // ap*bp(7), ap*bp(5)
            fst.q         f4,0(rcps)             // cp(i,0:1)
            d.pfadd.dd    f22,f2,f4              // cp(i,5)+ap*bp(5),cp(i,2)
            nop d.pfmul.dd    f24,f8,f2              // ap*bp(8), ap*bp(6)
            fld.q         16(rcp)++,f20          // cp(8:9)
            d.pfadd.dd    f16,f2,f6              // cp(i,6)+ap*bp(6),cp(i,3)
            fld.q         80(rbp),f12            // bp(10:11)
            d.pfmul.dd    f24,f10,f2             // ap*bp(9), ap*bp(7)
            fst.q         f4,16(rcps)++          // cp(i,2:3)
            d.pfadd.dd    f18,f2,f4              // cp(i,7)+ap*bp(7),cp(i,4)
            pfld.d        rcinc2(rc0)++,f28      // c0(i,k)
// j=12
            d.pfmul.dd    f24,f12,f2             // ap*bp(10), ap*bp(8)
            fld.q         16(rcp)++,f16          // cp(10:11)
            d.pfadd.dd    f20,f2,f6              // cp(i,8)+ap*bp(8),cp(i,5)
            fld.q         96(rbp),f8             // bp(12:13)
            d.pfmul.dd    f24,f14,f2             // ap*bp(11), ap*bp(9)
            fst.q         f4,16(rcps)++          // cp(i,4:5)
            d.pfadd.dd    f22,f2,f4              // cp(i,9)+ap*bp(9),cp(i,6)
            fst.d         f28,0(rcr)             // cr(i,k)

d.pfmul.dd    f24,f8,f2              // ap*bp(12), ap*bp(10)
            fld.q         16(rcp)++,f20          // cp(12:13)
            d.pfadd.dd    f16,f2,f6              // cp(i,10)+ap*bp(10),cp(i,7)
            fld.q         112(rbp),f12           // bp(14:15)
            d.pfmul.dd    f24,f10,f2             // ap*bp(13), ap*bp(11)
            fst.q         f4,16(rcps)++          // cp(i,6:7)
            d.pfadd.dd    f18,f2,f4              // cp(i,11)+ap*bp(11),cp(i,8)
            nop
// j=16
            d.pfmul.dd    f24,f12,f2             // ap*bp(14), ap*bp(12)
            fld.q         16(rcp)++,f16          // cp(14:15)
            d.pfadd.dd    f20,f2,f6              // cp(i,12)+ap*bp(12),cp(i,9)
            fld.q         128(rbp),f8            // bp(16:17)
            d.pfmul.dd    f24,f14,f2             // ap*bp(15), ap*bp(13)
            fst.q         f4,16(rcps)++          // cp(i,8:9)
            d.pfadd.dd    f22,f2,f4              // cp(i,13)+ap*bp(13),cp(i,10)
            nop d.pfmul.dd    f24,f8,f2              // ap*bp(16), ap*bp(14)
            fld.q         16(rcp)++,f20          // cp(16:17)
            d.pfadd.dd    f16,f2,f6              // cp(i,14)+ap*bp(14),cp(i,11)
            fld.q         144(rbp),f12           // bp(18:19)
            d.pfmul.dd    f24,f10,f2             // ap*bp(17), ap*bp(15)
            fst.q         f4,16(rcps)++          // cp(i,10:11)
            d.fnop
            br            label30                // start i loop
            d.fnop
            nop                                  // delayed branch
label29:                                         // top of k loop

// DEBUGGING CODE - LEAVING DUAL INSTRUCTION MODE fnop
            nop
            fnop
            nop
```

```
            nop                                // set breakpoint here
            nop
// END DEBUG CODE - RETURNING TO DUAL INSTR MODE // 19th I iteration // j=0
            d.pfadd.dd      f20,f2,f6          // cp(i,16)+ap*bp(16),cp(i,13)
            fld.q           0(rbp),f8          // bp(0:1)
            d.pfmul.dd      f24,f14,f2         // ap*bp(19), ap*bp(17)
            fst.q           f4,16(rcps)++      // cp(i,12:13)
            d.pfadd.dd      f22,f2,f4          // cp(i,17)+ap*bp(17),cp(i,14)
            pfld.d          rainc21(ra1)++,f24 // ar = a1(I*n1+i,k)

d.pfmul.dd      f24,f8,f2          // ap*bp(0), ap*bp(18)
            fld.q           16(rcp)++,f20      // cp(0:1)
            d.pfadd.dd      f16,f2,f6          // cp(i,18)+ap*bp(18),cp(i,15)
            fld.q           16(rbp),f12        // bp(2:3)
            d.pfmul.dd      f24,f10,f2         // ap*bp(1), ap*bp(19)
            fst.q           f4,16(rcps)++      // cp(i,14:15)
            d.pfadd.dd      f18,f2,f4          // cp(i,19)+ap*bp(19),cp(i,16)
            pfld.d          rbinc12(rb1)++,f28 // b1(k,J*n1+i)
// j=4
            d.pfmul.dd      f24,f12,f2         // ap*bp(2), ap*bp(0)
            fld.q           16(rcp)++,f16      // cp(2:3)
            d.pfadd.dd      f20,f2,f6          // cp(i,0)+ap*bp(0),cp(i,17)
            fld.q           32(rbp),f8         // bp(4:5)
            d.pfmul.dd      f24,f14,f2         // ap*bp(3), ap*bp(1)
            fst.q           f4,16(rcps)++      // cp(i,16:17)
            d.pfadd.dd      f22,f2,f4          // cp(i,1)+ap*bp(1),cp(i,18)
            fst.d           f28,8(rbr)++       // br(i)

d.pfmul.dd      f24,f8,f2          // ap*bp(4), ap*bp(2)
            fld.q           16(rcp)++,f20      // cp(4:5)
            d.pfadd.dd      f16,f2,f6          // cp(i,2)+ap*bp(2),cp(i,19)
            fld.q           48(rbp),f12        // bp(6:7)
            d.pfmul.dd      f24,f10,f2         // ap*bp(5), ap*bp(3)
            fst.q           f4,16(rcps)++      // cp(i,18:19)
            d.pfadd.dd      f18,f2,f4          // cp(i,3)+ap*bp(3),cp(i,0)
            nop
// j=8
            d.pfmul.dd      f24,f12,f2         // ap*bp(6), ap*bp(4)
            fld.q           16(rcp)++,f16      // cp(6:7)
            d.pfadd.dd      f20,f2,f6          // cp(i,4)+ap*bp(4),cp(i,1)
            fld.q           64(rbp),f8         // bp(8:9)
            d.pfmul.dd      f24,f14,f2         // ap*bp(7), ap*bp(5)
            fst.q           f4,16(rcps)++      // cp(i,0:1)
            d.pfadd.dd      f22,f2,f4          // cp(i,5)+ap*bp(5),cp(i,2)
            nop d.pfmul.dd      f24,f8,f2          // ap*bp(8), ap*bp(6)
            fld.q           16(rcp)++,f20      // cp(8:9)
            d.pfadd.dd      f16,f2,f6          // cp(i,6)+ap*bp(6),cp(i,3)
            fld.q           80(rbp),f12        // bp(10:11)
            d.pfmul.dd      f24,f10,f2         // ap*bp(9), ap*bp(7)
            fst.q           f4,16(rcps)++      // cp(i,2:3)
            d.pfadd.dd      f18,f2,f4          // cp(i,7)+ap*bp(7),cp(i,4)
            pfld.d          rcinc12(rc0)++,f28 // c0(i,k)
// j=12
            d.pfmul.dd      f24,f12,f2         // ap*bp(10), ap*bp(8)
            fld.q           16(rcp)++,f16      // cp(10:11)
            d.pfadd.dd      f20,f2,f6          // cp(i,8)+ap*bp(8),cp(i,5)
            fld.q           96(rbp),f8         // bp(12:13)
            d.pfmul.dd      f24,f14,f2         // ap*bp(11), ap*bp(9)
            fst.q           f4,16(rcps)++      // cp(i,4:5)
            d.pfadd.dd      f22,f2,f4          // cp(i,9)+ap*bp(9),cp(i,6)
            fst.d           f28,8(rcr)++       // cr(i,k)

d.pfmul.dd      f24,f8,f2          // ap*bp(12), ap*bp(10)
            fld.q           16(rcp)++,f20      // cp(12:13)
            d.pfadd.dd      f16,f2,f6          // cp(i,10)+ap*bp(10),cp(i,7)
            fld.q           112(rbp),f12       // bp(14:15)
```

```
              d.pfmul.dd       f24,f10,f2              // ap*bp(13), ap*bp(11)
                fst.q          f4,16(rcps)++           // cp(i,6:7)
              d.pfadd.dd       f18,f2,f4               // cp(i,11)+ap*bp(11),cp(i,8)
                nop
// j=16
              d.pfmul.dd       f24,f12,f2              // ap*bp(14), ap*bp(12)
                fld.q          16(rcp)++,f16           // cp(14:15)
              d.pfadd.dd       f20,f2,f6               // cp(i,12)+ap*bp(12),cp(i,9)
                fld.q          128(rbp),f8             // bp(16:17)
              d.pfmul.dd       f24,f14,f2              // ap*bp(15), ap*bp(13)
                fst.q          f4,16(rcps)++           // cp(i,8:9)
              d.pfadd.dd       f22,f2,f4               // cp(i,13)+ap*bp(13),cp(i,10)
                nop d.pfmul.dd       f24,f8,f2               // ap*bp(16), ap*bp(14)
                fld.q          16(rcp)++,f20           // cp(16:17)
              d.pfadd.dd       f16,f2,f6               // cp(i,14)+ap*bp(14),cp(i,11)
                fld.q          144(rbp),f12            // bp(18:19)
              d.pfmul.dd       f24,f10,f2              // ap*bp(17), ap*bp(15)
                fst.q          f4,16(rcps)++           // cp(i,10:11)
              d.pfadd.dd       f18,f2,f4               // cp(i,15)+ap*bp(15),cp(i,12)
                nop

// DEBUGGING CODE - LEAVING DUAL INSTRUCTION MODE fnop
                  nop
                fnop
                  nop
                  nop                                  // set breakpoint here
                  nop
// END DEBUG CODE - RETURNING TO DUAL INSTR MODE // K loop Body:

d.fnop
                mov            rbr,r31                 // swap br and bp
              d.fnop
                mov            rbp,rbr
              d.fnop
                adds           -152,r31,rbp            // and reset to 0th element.
// j=0
              d.pfmul.dd       f24,f12,f2              // ap*bp(18), ap*bp(16)
                fld.q          16(rcp)++,f16           // cp(18:19)
              d.pfadd.dd       f20,f2,f6               // cp(i,16)+ap*bp(16),cp(i,13)
                fld.q          0(rbp),f8               // bp(0:1)
              d.pfmul.dd       f24,f14,f2              // ap*bp(19), ap*bp(17)
                fst.q          f4,16(rcps)++           // cp(i,12:13)
              d.pfadd.dd       f22,f2,f4               // cp(i,17)+ap*bp(17),cp(i,14)
                pfld.d         raincl(ral)++,f24       // ar = al(I*n1+i,k)

d.pfmul.dd       f24,f8,f2               // ap*bp(0), ap*bp(18)
                fld.q          -3184(rcp)++,f20        // cp(0:1)
              d.pfadd.dd       f16,f2,f6               // cp(i,18)+ap*bp(18),cp(i,15)
                fld.q          16(rbp),f12             // bp(2:3)
              d.pfmul.dd       f24,f10,f2              // ap*bp(1), ap*bp(19)
                fst.q          f4,16(rcps)++           // cp(i,14:15)
              d.pfadd.dd       f18,f2,f4               // cp(i,19)+ap*bp(19),cp(i,16)
                pfld.d         rbinc2(rb1)++,f28       // bl(k,J*n1+i)
// j=4
              d.pfmul.dd       f24,f12,f2              // ap*bp(2), ap*bp(0)
                fld.q          16(rcp)++,f16           // cp(2:3)
              d.pfadd.dd       f20,f2,f6               // cp(i,0)+ap*bp(0),cp(i,17)
                fld.q          32(rbp),f8              // bp(4:5)
              d.pfmul.dd       f24,f14,f2              // ap*bp(3), ap*bp(1)
                fst.q          f4,16(rcps)++           // cp(i,16:17)
              d.pfadd.dd       f22,f2,f4               // cp(i,1)+ap*bp(1),cp(i,18)
                fst.d          f28,0(rbr)              // br(i)

d.pfmul.dd       f24,f8,f2               // ap*bp(4), ap*bp(2)
                fld.q          16(rcp)++,f20           // cp(4:5)
```

```
            d.pfadd.dd    f16,f2,f6              // cp(i,2)+ap*bp(2),cp(i,19)
            fld.q         48(rbp),f12            // bp(6:7)
            d.pfmul.dd    f24,f10,f2             // ap*bp(5), ap*bp(3)
            fst.q         f4,16(rcps)++          // cp(i,18:19)
            d.pfadd.dd    f18,f2,f4              // cp(i,3)+ap*bp(3),cp(i,0)
            nop
// j=8
            d.pfmul.dd    f24,f12,f2             // ap*bp(6), ap*bp(4)
            fld.q         16(rcp)++,f16          // cp(6:7)
            d.pfadd.dd    f20,f2,f6              // cp(i,4)+ap*bp(4),cp(i,1)
            fld.q         64(rbp),f8             // bp(8:9)
            d.pfmul.dd    f24,f14,f2             // ap*bp(7), ap*bp(5)
            fst.q         f4,-3184(rcps)++       // cp(i,0:1)
            d.pfadd.dd    f22,f2,f4              // cp(i,5)+ap*bp(5),cp(i,2)
            nop d.pfmul.dd    f24,f8,f2              // ap*bp(8), ap*bp(6)
            fld.q         16(rcp)++,f20          // cp(8:9)
            d.pfadd.dd    f16,f2,f6              // cp(i,6)+ap*bp(6),cp(i,3)
            fld.q         80(rbp),f12            // bp(10:11)
            d.pfmul.dd    f24,f10,f2             // ap*bp(9), ap*bp(7)
            fst.q         f4,16(rcps)++          // cp(i,2:3)
            d.pfadd.dd    f18,f2,f4              // cp(i,7)+ap*bp(7),cp(i,4)
            pfld.d        rcinc2(rc0)++,f28      // c0(i,k)
// j=12
            d.pfmul.dd    f24,f12,f2             // ap*bp(10), ap*bp(8)
            fld.q         16(rcp)++,f16          // cp(10:11)
            d.pfadd.dd    f20,f2,f6              // cp(i,8)+ap*bp(8),cp(i,5)
            fld.q         96(rbp),f8             // bp(12:13)
            d.pfmul.dd    f24,f14,f2             // ap*bp(11), ap*bp(9)
            fst.q         f4,16(rcps)++          // cp(i,4:5)
            d.pfadd.dd    f22,f2,f4              // cp(i,9)+ap*bp(9),cp(i,6)
            fst.d         f28,8(rcr)++           // cr(i,k)

d.pfmul.dd    f24,f8,f2              // ap*bp(12), ap*bp(10)
            fld.q         16(rcp)++,f20          // cp(12:13)
            d.pfadd.dd    f16,f2,f6              // cp(i,10)+ap*bp(10),cp(i,7)
            fld.q         112(rbp),f12           // bp(14:15)
            d.pfmul.dd    f24,f10,f2             // ap*bp(13), ap*bp(11)
            fst.q         f4,16(rcps)++          // cp(i,6:7)
            d.pfadd.dd    f18,f2,f4              // cp(i,11)+ap*bp(11),cp(i,8)
            nop
// j=16
            d.pfmul.dd    f24,f12,f2             // ap*bp(14), ap*bp(12)
            fld.q         16(rcp)++,f16          // cp(14:15)
            d.pfadd.dd    f20,f2,f6              // cp(i,12)+ap*bp(12),cp(i,9)
            fld.q         128(rbp),f8            // bp(16:17)
            d.pfmul.dd    f24,f14,f2             // ap*bp(15), ap*bp(13)
            fst.q         f4,16(rcps)++          // cp(i,8:9)
            d.pfadd.dd    f22,f2,f4              // cp(i,13)+ap*bp(13),cp(i,10)
            nop d.pfmul.dd    f24,f8,f2              // ap*bp(16), ap*bp(14)
            fld.q         16(rcp)++,f20          // cp(16:17)
            d.pfadd.dd    f16,f2,f6              // cp(i,14)+ap*bp(14),cp(i,11)
            fld.q         144(rbp),f12           // bp(18:19)
            d.pfmul.dd    f24,f10,f2             // ap*bp(17), ap*bp(15)
            fst.q         f4,16(rcps)++          // cp(i,10:11)

label30:                                         // init i loop

// DEBUGGING CODE - LEAVING DUAL INSTRUCTION MODE fnop
              nop
            fnop
              nop
            nop                                  // set breakpoint here
            nop
// END DEBUG CODE - RETURNING TO DUAL INSTR MODE
```

```
// I loop Body:

d.fnop
          adds            17,r0,ricount          // icount = 17
        d.pfadd.dd        f18,f2,f4              // cp(i,15)+ap*bp(15),cp(i,12)
          bla             rminus1,ricount,label35 // delayed branch, 18 iter
// j=0
        d.pfmul.dd        f24,f12,f2             // ap*bp(18), ap*bp(16)
          fld.q           16(rcp)++,f16          // cp(18:19)

label35:
        d.pfadd.dd        f20,f2,f6              // cp(i,16)+ap*bp(16),cp(i,13)
          fld.q           0(rbp),f8              // bp(0:1)
        d.pfmul.dd        f24,f14,f2             // ap*bp(19), ap*bp(17)
          fst.q           f4,16(rcps)++          // cp(i,12:13)
        d.pfadd.dd        f22,f2,f4              // cp(i,17)+ap*bp(17),cp(i,14)
          pfld.d          raincl(ra1)++,f24      // ar = a1(I*n1+i,k)

d.pfmul.dd        f24,f8,f2              // ap*bp(0), ap*bp(18)
          fld.q           16(rcp)++,f20          // cp(0:1)
        d.pfadd.dd        f16,f2,f6              // cp(i,18)+ap*bp(18),cp(i,15)
          fld.q           16(rbp),f12            // bp(2:3)
        d.pfmul.dd        f24,f10,f2             // ap*bp(1), ap*bp(19)
          fst.q           f4,16(rcps)++          // cp(i,14:15)
        d.pfadd.dd        f18,f2,f4              // cp(i,19)+ap*bp(19),cp(i,16)
          pfld.d          rbinc2(rb1)++,f28      // b1(k,J*n1+i)
// j=4
        d.pfmul.dd        f24,f12,f2             // ap*bp(2), ap*bp(0)
          fld.q           16(rcp)++,f16          // cp(2:3)
        d.pfadd.dd        f20,f2,f6              // cp(i,0)+ap*bp(0),cp(i,17)
          fld.q           32(rbp),f8             // bp(4:5)
        d.pfmul.dd        f24,f14,f2             // ap*bp(3), ap*bp(1)
          fst.q           f4,16(rcps)++          // cp(i,16:17)
        d.pfadd.dd        f22,f2,f4              // cp(i,1)+ap*bp(1),cp(i,18)
          fst.d           f28,8(rbr)++           // br(i)

d.pfmul.dd        f24,f8,f2              // ap*bp(4), ap*bp(2)
          fld.q           16(rcp)++,f20          // cp(4:5)
        d.pfadd.dd        f16,f2,f6              // cp(i,2)+ap*bp(2),cp(i,19)
          fld.q           48(rbp),f12            // bp(6:7)
        d.pfmul.dd        f24,f10,f2             // ap*bp(5), ap*bp(3)
          fst.q           f4,16(rcps)++          // cp(i,18:19)
        d.pfadd.dd        f18,f2,f4              // cp(i,3)+ap*bp(3),cp(i,0)
          nop
// j=8
        d.pfmul.dd        f24,f12,f2             // ap*bp(6), ap*bp(4)
          fld.q           16(rcp)++,f16          // cp(6:7)
        d.pfadd.dd        f20,f2,f6              // cp(i,4)+ap*bp(4),cp(i,1)
          fld.q           64(rbp),f8             // bp(8:9)
        d.pfmul.dd        f24,f14,f2             // ap*bp(7), ap*bp(5)
          fst.q           f4,16(rcps)++          // cp(i,0:1)
        d.pfadd.dd        f22,f2,f4              // cp(i,5)+ap*bp(5),cp(i,2)
          nop d.pfmul.dd        f24,f8,f2              // ap*bp(8), ap*bp(6)
          fld.q           16(rcp)++,f20          // cp(8:9)
        d.pfadd.dd        f16,f2,f6              // cp(i,6)+ap*bp(6),cp(i,3)
          fld.q           80(rbp),f12            // bp(10:11)
        d.pfmul.dd        f24,f10,f2             // ap*bp(9), ap*bp(7)
          fst.q           f4,16(rcps)++          // cp(i,2:3)
        d.pfadd.dd        f18,f2,f4              // cp(i,7)+ap*bp(7),cp(i,4)
          pfld.d          rcinc2(rc0)++,f28      // c0(i,k)
// j=12
        d.pfmul.dd        f24,f12,f2             // ap*bp(10), ap*bp(8)
          fld.q           16(rcp)++,f16          // cp(10:11)
        d.pfadd.dd        f20,f2,f6              // cp(i,8)+ap*bp(8),cp(i,5)
          fld.q           96(rbp),f8             // bp(12:13)
        d.pfmul.dd        f24,f14,f2             // ap*bp(11), ap*bp(9)
          fst.q           f4,16(rcps)++          // cp(i,4:5)
        d.pfadd.dd        f22,f2,f4              // cp(i,9)+ap*bp(9),cp(i,6)
          fst.d           f28,8(rcr)++           // cr(i,k)
```

```
        d.pfmul.dd      f24,f8,f2           // ap*bp(12), ap*bp(10)
          fld.q         16(rcp)++,f20       // cp(12:13)
        d.pfadd.dd      f16,f2,f6           // cp(i,10)+ap*bp(10),cp(i,7)
          fld.q         112(rbp),f12        // bp(14:15)
        d.pfmul.dd      f24,f10,f2          // ap*bp(13), ap*bp(11)
          fst.q         f4,16(rcps)++       // cp(i,6:7)
        d.pfadd.dd      f18,f2,f4           // cp(i,11)+ap*bp(11),cp(i,8)
          nop
// j=16
        d.pfmul.dd      f24,f12,f2          // ap*bp(14), ap*bp(12)
          fld.q         16(rcp)++,f16       // cp(14:15)
        d.pfadd.dd      f20,f2,f6           // cp(i,12)+ap*bp(12),cp(i,9)
          fld.q         128(rbp),f8         // bp(16:17)
        d.pfmul.dd      f24,f14,f2          // ap*bp(15), ap*bp(13)
          fst.q         f4,16(rcps)++       // cp(i,8:9)
        d.pfadd.dd      f22,f2,f4           // cp(i,13)+ap*bp(13),cp(i,10)
          nop d.pfmul.dd      f24,f8,f2           // ap*bp(16), ap*bp(14)
          fld.q         16(rcp)++,f20       // cp(16:17)
        d.pfadd.dd      f16,f2,f6           // cp(i,14)+ap*bp(14),cp(i,11)
          fld.q         144(rbp),f12        // bp(18:19)
        d.pfmul.dd      f24,f10,f2          // ap*bp(17), ap*bp(15)
          fst.q         f4,16(rcps)++       // cp(i,10:11)
        d.pfadd.dd      f18,f2,f4           // cp(i,15)+ap*bp(15),cp(i,12)
          bla           rminus1,ricount,label35 // delayed branch, 18 iter
        d.pfmul.dd      f24,f12,f2          // ap*bp(18), ap*bp(16)
          fld.q         16(rcp)++,f16       // cp(18:19)

d.fnop
          adds          -1,rkcount,rkcount  // kcount--
        d.fnop
          bnc           label29             // if(kcount>1) go to label29
        d.fnop
          adds          -21,rnn3,rkcount    // kcount = nn3-21
        d.fnop
          bc            label33             // if(kcount<0) go to label33

// DEBUGGING CODE - LEAVING DUAL INSTRUCTION MODE fnop
          nop
        fnop
          nop
        nop                                 // set breakpoint here
        nop
// END DEBUG CODE - RETURNING TO DUAL INSTR MODE d.fnop
          br            label32             // start i loop
        d.fnop
          nop                               // delayed branch label31:                                    // top of k loop

// DEBUGGING CODE - LEAVING DUAL INSTRUCTION MODE fnop
          nop
        fnop
          nop
        nop                                 // set breakpoint here
        nop
// END DEBUG CODE - RETURNING TO DUAL INSTR MODE // 19th I iteration // j=0
        d.pfadd.dd      f20,f2,f6           // cp(i,16)+ap*bp(16),cp(i,13)
          fld.q         0(rbp),f8           // bp(0:1)
        d.pfmul.dd      f24,f14,f2          // ap*bp(19), ap*bp(17)
          fst.q         f4,16(rcps)++       // cp(i,12:13)
```

```
        d.pfadd.dd      f22,f2,f4               // cp(i,17)+ap*bp(17),cp(i,14)
        pfld.d          rainc21(ra1)++,f24      // ar = a1(I*n1+i,k)

d.pfmul.dd      f24,f8,f2               // ap*bp(0), ap*bp(18)
        fld.q           16(rcp)++,f20           // cp(0:1)
        d.pfadd.dd      f16,f2,f6               // cp(i,18)+ap*bp(18),cp(i,15)
        fld.q           16(rbp),f12             // bp(2:3)
        d.pfmul.dd      f24,f10,f2              // ap*bp(1), ap*bp(19)
        fst.q           f4,16(rcps)++           // cp(i,14:15)
        d.pfadd.dd      f18,f2,f4               // cp(i,19)+ap*bp(19),cp(i,16)
        pfld.d          rbinc12(rb1)++,f28      // b1(k,J*n1+i)
// j=4
        d.pfmul.dd      f24,f12,f2              // ap*bp(2), ap*bp(0)
        fld.q           16(rcp)++,f16           // cp(2:3)
        d.pfadd.dd      f20,f2,f6               // cp(i,0)+ap*bp(0),cp(i,17)
        fld.q           32(rbp),f8              // bp(4:5)
        d.pfmul.dd      f24,f14,f2              // ap*bp(3), ap*bp(1)
        fst.q           f4,16(rcps)++           // cp(i,16:17)
        d.pfadd.dd      f22,f2,f4               // cp(i,1)+ap*bp(1),cp(i,18)
        fst.d           f28,8(rbr)++            // br(i)

d.pfmul.dd      f24,f8,f2               // ap*bp(4), ap*bp(2)
        fld.q           16(rcp)++,f20           // cp(4:5)
        d.pfadd.dd      f16,f2,f6               // cp(i,2)+ap*bp(2),cp(i,19)
        fld.q           48(rbp),f12             // bp(6:7)
        d.pfmul.dd      f24,f10,f2              // ap*bp(5), ap*bp(3)
        fst.q           f4,16(rcps)++           // cp(i,18:19)
        d.pfadd.dd      f18,f2,f4               // cp(i,3)+ap*bp(3),cp(i,0)
        nop
// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,16(rcps)++           // cp(i,0:1)
        d.pfadd.dd      f22,f2,f4               // cp(i,5)+ap*bp(5),cp(i,2)
        nop d.pfmul.dd      f24,f8,f2               // ap*bp(8), ap*bp(6)
        fld.q           16(rcp)++,f20           // cp(8:9)
        d.pfadd.dd      f16,f2,f6               // cp(i,6)+ap*bp(6),cp(i,3)
        fld.q           80(rbp),f12             // bp(10:11)
        d.pfmul.dd      f24,f10,f2              // ap*bp(9), ap*bp(7)
        fst.q           f4,16(rcps)++           // cp(i,2:3)
        d.pfadd.dd      f18,f2,f4               // cp(i,7)+ap*bp(7),cp(i,4)
        pfld.d          8(ra1),f0               // dummy load pipeline push
// j=12
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        nop d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
// j=16
        d.pfmul.dd      f24,f12,f2              // ap*bp(14), ap*bp(12)
        fld.q           16(rcp)++,f16           // cp(14:15)
        d.pfadd.dd      f20,f2,f6               // cp(i,12)+ap*bp(12),cp(i,9)
        fld.q           128(rbp),f8             // bp(16:17)
        d.pfmul.dd      f24,f14,f2              // ap*bp(15), ap*bp(13)
        fst.q           f4,16(rcps)++           // cp(i,8:9)
        d.pfadd.dd      f22,f2,f4               // cp(i,13)+ap*bp(13),cp(i,10)
        nop
```

```
        d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)
        d.pfadd.dd      f18,f2,f4               // cp(i,15)+ap*bp(15),cp(i,12)
        nop

// DEBUGGING CODE - LEAVING DUAL INSTRUCTION MODE fnop
          nop
        fnop
          nop
          nop                                   // set breakpoint here
          nop
// END DEBUG CODE - RETURNING TO DUAL INSTR MODE // K loop Body:

d.fnop
          mov           rbr,r31                 // swap br and bp
        d.fnop
          mov           rbp,rbr
        d.fnop
          adds          -152,r31,rbp            // and reset to 0th element.
// j=0
        d.pfmul.dd      f24,f12,f2              // ap*bp(18), ap*bp(16)
        fld.q           16(rcp)++,f16           // cp(18:19)
        d.pfadd.dd      f20,f2,f6               // cp(i,16)+ap*bp(16),cp(i,13)
        fld.q           0(rbp),f8               // bp(0:1)
        d.pfmul.dd      f24,f14,f2              // ap*bp(19), ap*bp(17)
        fst.q           f4,16(rcps)++           // cp(i,12:13)
        d.pfadd.dd      f22,f2,f4               // cp(i,17)+ap*bp(17),cp(i,14)
        pfld.d          raincl(ra1)++,f24       // ar = a1(I*n1+i,k)

d.pfmul.dd      f24,f8,f2               // ap*bp(0), ap*bp(18)
        fld.q           -3184(rcp)++,f20        // cp(0:1)
        d.pfadd.dd      f16,f2,f6               // cp(i,18)+ap*bp(18),cp(i,15)
        fld.q           16(rbp),f12             // bp(2:3)
        d.pfmul.dd      f24,f10,f2              // ap*bp(1), ap*bp(19)
        fst.q           f4,16(rcps)++           // cp(i,14:15)
        d.pfadd.dd      f18,f2,f4               // cp(i,19)+ap*bp(19),cp(i,16)
        pfld.d          rbinc2(rb1)++,f28       // b1(k,J*n1+i)
// j=4
        d.pfmul.dd      f24,f12,f2              // ap*bp(2), ap*bp(0)
        fld.q           16(rcp)++,f16           // cp(2:3)
        d.pfadd.dd      f20,f2,f6               // cp(i,0)+ap*bp(0),cp(i,17)
        fld.q           32(rbp),f8              // bp(4:5)
        d.pfmul.dd      f24,f14,f2              // ap*bp(3), ap*bp(1)
        fst.q           f4,16(rcps)++           // cp(i,16:17)
        d.pfadd.dd      f22,f2,f4               // cp(i,1)+ap*bp(1),cp(i,18)
        fst.d           f28,0(rbr)              // br(i)

d.pfmul.dd      f24,f8,f2               // ap*bp(4), ap*bp(2)
        fld.q           16(rcp)++,f20           // cp(4:5)
        d.pfadd.dd      f16,f2,f6               // cp(i,2)+ap*bp(2),cp(i,19)
        fld.q           48(rbp),f12             // bp(6:7)
        d.pfmul.dd      f24,f10,f2              // ap*bp(5), ap*bp(3)
        fst.q           f4,16(rcps)++           // cp(i,18:19)
        d.pfadd.dd      f18,f2,f4               // cp(i,3)+ap*bp(3),cp(i,0)
        nop
// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,-3184(rcps)++        // cp(i,0:1)
        d.pfadd.dd      f22,f2,f4               // cp(i,5)+ap*bp(5),cp(i,2)
        nop
```

```
        d.pfmul.dd      f24,f8,f2             // ap*bp(8), ap*bp(6)
        fld.q           16(rcp)++,f20         // cp(8:9)
        d.pfadd.dd      f16,f2,f6             // cp(i,6)+ap*bp(6),cp(i,3)
        fld.q           80(rbp),f12           // bp(10:11)
        d.pfmul.dd      f24,f10,f2            // ap*bp(9), ap*bp(7)
        fst.q           f4,16(rcps)++         // cp(i,2:3)
        d.pfadd.dd      f18,f2,f4             // cp(i,7)+ap*bp(7),cp(i,4)
        pfld.d          8(ra1),f0             // dummy load pipeline push
// j=12
        d.pfmul.dd      f24,f12,f2            // ap*bp(10), ap*bp(8)
        fld.q           16(rcp)++,f16         // cp(10:11)
        d.pfadd.dd      f20,f2,f6             // cp(i,8)+ap*bp(8),cp(i,5)
        fld.q           96(rbp),f8            // bp(12:13)
        d.pfmul.dd      f24,f14,f2            // ap*bp(11), ap*bp(9)
        fst.q           f4,16(rcps)++         // cp(i,4:5)
        d.pfadd.dd      f22,f2,f4             // cp(i,9)+ap*bp(9),cp(i,6)
        nop d.pfmul.dd      f24,f8,f2             // ap*bp(12), ap*bp(10)
        fld.q           16(rcp)++,f20         // cp(12:13)
        d.pfadd.dd      f16,f2,f6             // cp(i,10)+ap*bp(10),cp(i,7)
        fld.q           112(rbp),f12          // bp(14:15)
        d.pfmul.dd      f24,f10,f2            // ap*bp(13), ap*bp(11)
        fst.q           f4,16(rcps)++         // cp(i,6:7)
        d.pfadd.dd      f18,f2,f4             // cp(i,11)+ap*bp(11),cp(i,8)
        nop
// j=16
        d.pfmul.dd      f24,f12,f2            // ap*bp(14), ap*bp(12)
        fld.q           16(rcp)++,f16         // cp(14:15)
        d.pfadd.dd      f20,f2,f6             // cp(i,12)+ap*bp(12),cp(i,9)
        fld.q           128(rbp),f8           // bp(16:17)
        d.pfmul.dd      f24,f14,f2            // ap*bp(15), ap*bp(13)
        fst.q           f4,16(rcps)++         // cp(i,8:9)
        d.pfadd.dd      f22,f2,f4             // cp(i,13)+ap*bp(13),cp(i,10)
        nop d.pfmul.dd      f24,f8,f2             // ap*bp(16), ap*bp(14)
        fld.q           16(rcp)++,f20         // cp(16:17)
        d.pfadd.dd      f16,f2,f6             // cp(i,14)+ap*bp(14),cp(i,11)
        fld.q           144(rbp),f12          // bp(18:19)
        d.pfmul.dd      f24,f10,f2            // ap*bp(17), ap*bp(15)
        fst.q           f4,16(rcps)++         // cp(i,10:11)

label32:                                      // init i loop

// DEBUGGING CODE - LEAVING DUAL INSTRUCTION MODE fnop
          nop
        fnop
          nop
          nop                                 // set breakpoint here
          nop
// END DEBUG CODE - RETURNING TO DUAL INSTR MODE // I loop Body:

d.fnop
          adds          17,r0,ricount         // icount = 17
        d.pfadd.dd      f18,f2,f4             // cp(i,15)+ap*bp(15),cp(i,12)
          bla           rminus1,ricount,label36 // delayed branch, 18 iter
// j=0
        d.pfmul.dd      f24,f12,f2            // ap*bp(18), ap*bp(16)
          fld.q         16(rcp)++,f16         // cp(18:19)

label36:
        d.pfadd.dd      f20,f2,f6             // cp(i,16)+ap*bp(16),cp(i,13)
          fld.q         0(rbp),f8             // bp(0:1)
        d.pfmul.dd      f24,f14,f2            // ap*bp(19), ap*bp(17)
          fst.q         f4,16(rcps)++         // cp(i,12:13)
        d.pfadd.dd      f22,f2,f4             // cp(i,17)+ap*bp(17),cp(i,14)
          pfld.d        raincl(ra1)++,f24     // ar = a1(I*n1+i,k)
```

```
              d.pfmul.dd    f24,f8,f2              // ap*bp(0), ap*bp(18)
              fld.q         16(rcp)++,f20          // cp(0:1)
              d.pfadd.dd    f16,f2,f6              // cp(i,18)+ap*bp(18),cp(i,15)
              fld.q         16(rbp),f12            // bp(2:3)
              d.pfmul.dd    f24,f10,f2             // ap*bp(1), ap*bp(19)
              fst.q         f4,16(rcps)++          // cp(i,14:15)
              d.pfadd.dd    f18,f2,f4              // cp(i,19)+ap*bp(19),cp(i,16)
              pfld.d        rbinc2(rb1)++,f28      // bl(k,J*n1+i)
// j=4
              d.pfmul.dd    f24,f12,f2             // ap*bp(2), ap*bp(0)
              fld.q         16(rcp)++,f16          // cp(2:3)
              d.pfadd.dd    f20,f2,f6              // cp(i,0)+ap*bp(0),cp(i,17)
              fld.q         32(rbp),f8             // bp(4:5)
              d.pfmul.dd    f24,f14,f2             // ap*bp(3), ap*bp(1)
              fst.q         f4,16(rcps)++          // cp(i,16:17)
              d.pfadd.dd    f22,f2,f4              // cp(i,1)+ap*bp(1),cp(i,18)
              fst.d         f28,8(rbr)++           // br(i)

d.pfmul.dd    f24,f8,f2              // ap*bp(4), ap*bp(2)
              fld.q         16(rcp)++,f20          // cp(4:5)
              d.pfadd.dd    f16,f2,f6              // cp(i,2)+ap*bp(2),cp(i,19)
              fld.q         48(rbp),f12            // bp(6:7)
              d.pfmul.dd    f24,f10,f2             // ap*bp(5), ap*bp(3)
              fst.q         f4,16(rcps)++          // cp(i,18:19)
              d.pfadd.dd    f18,f2,f4              // cp(i,3)+ap*bp(3),cp(i,0)
              nop
// j=8
              d.pfmul.dd    f24,f12,f2             // ap*bp(6), ap*bp(4)
              fld.q         16(rcp)++,f16          // cp(6:7)
              d.pfadd.dd    f20,f2,f6              // cp(i,4)+ap*bp(4),cp(i,1)
              fld.q         64(rbp),f8             // bp(8:9)
              d.pfmul.dd    f24,f14,f2             // ap*bp(7), ap*bp(5)
              fst.q         f4,16(rcps)++          // cp(i,0:1)
              d.pfadd.dd    f22,f2,f4              // cp(i,5)+ap*bp(5),cp(i,2)
              nop d.pfmul.dd    f24,f8,f2              // ap*bp(8), ap*bp(6)
              fld.q         16(rcp)++,f20          // cp(8:9)
              d.pfadd.dd    f16,f2,f6              // cp(i,6)+ap*bp(6),cp(i,3)
              fld.q         80(rbp),f12            // bp(10:11)
              d.pfmul.dd    f24,f10,f2             // ap*bp(9), ap*bp(7)
              fst.q         f4,16(rcps)++          // cp(i,2:3)
              d.pfadd.dd    f18,f2,f4              // cp(i,7)+ap*bp(7),cp(i,4)
              pfld.d        8(ra1),f0              // dummy load pipeline push
// j=12
              d.pfmul.dd    f24,f12,f2             // ap*bp(10), ap*bp(8)
              fld.q         16(rcp)++,f16          // cp(10:11)
              d.pfadd.dd    f20,f2,f6              // cp(i,8)+ap*bp(8),cp(i,5)
              fld.q         96(rbp),f8             // bp(12:13)
              d.pfmul.dd    f24,f14,f2             // ap*bp(11), ap*bp(9)
              fst.q         f4,16(rcps)++          // cp(i,4:5)
              d.pfadd.dd    f22,f2,f4              // cp(i,9)+ap*bp(9),cp(i,6)
              nop d.pfmul.dd    f24,f8,f2              // ap*bp(12), ap*bp(10)
              fld.q         16(rcp)++,f20          // cp(12:13)
              d.pfadd.dd    f16,f2,f6              // cp(i,10)+ap*bp(10),cp(i,7)
              fld.q         112(rbp),f12           // bp(14:15)
              d.pfmul.dd    f24,f10,f2             // ap*bp(13), ap*bp(11)
              fst.q         f4,16(rcps)++          // cp(i,6:7)
              d.pfadd.dd    f18,f2,f4              // cp(i,11)+ap*bp(11),cp(i,8)
              nop
// j=16
              d.pfmul.dd    f24,f12,f2             // ap*bp(14), ap*bp(12)
              fld.q         16(rcp)++,f16          // cp(14:15)
              d.pfadd.dd    f20,f2,f6              // cp(i,12)+ap*bp(12),cp(i,9)
              fld.q         128(rbp),f8            // bp(16:17)
              d.pfmul.dd    f24,f14,f2             // ap*bp(15), ap*bp(13)
              fst.q         f4,16(rcps)++          // cp(i,8:9)
              d.pfadd.dd    f22,f2,f4              // cp(i,13)+ap*bp(13),cp(i,10)
              nop
```

```
        d.pfmul.dd      f24,f8,f2                       // ap*bp(16), ap*bp(14)
          fld.q         16(rcp)++,f20                   //  cp(16:17)
        d.pfadd.dd      f16,f2,f6                       // cp(i,14)+ap*bp(14),cp(i,11)
          fld.q         144(rbp),f12                    // bp(18:19)
        d.pfmul.dd      f24,f10,f2                      // ap*bp(17), ap*bp(15)
          fst.q         f4,16(rcps)++                   // cp(i,10:11)
        d.pfadd.dd      f18,f2,f4                       // cp(i,15)+ap*bp(15),cp(i,12)
          bla           rminus1,ricount,label36         // delayed branch, 18 iter
        d.pfmul.dd      f24,f12,f2                      // ap*bp(18), ap*bp(16)
          fld.q         16(rcp)++,f16                   // cp(18:19)

d.fnop
          adds          -1,rkcount,rkcount              // kcount--
        d.fnop
          bnc           label31                         // if(kcount>1) go to label31 label33:                                                // init i loop

// DEBUGGING CODE - LEAVING DUAL INSTRUCTION MODE fnop
          nop
        fnop
          nop
        nop                                             // set breakpoint here
          nop
// END DEBUG CODE - RETURNING TO DUAL INSTR MODE // 19th I iteration // j=0
        d.pfadd.dd      f20,f2,f6                       // cp(i,16)+ap*bp(16),cp(i,13)
          fld.q         0(rbp),f8                       // bp(0:1)
        d.pfmul.dd      f24,f14,f2                      // ap*bp(19), ap*bp(17)
          fst.q         f4,16(rcps)++                   // cp(i,12:13)
        d.pfadd.dd      f22,f2,f4                       // cp(i,17)+ap*bp(17),cp(i,14)
          pfld.d        rainc21(ra1)++,f24              // ar = a1(I*n1+i,k)

d.pfmul.dd      f24,f8,f2                       // ap*bp(0), ap*bp(18)
          fld.q         16(rcp)++,f20                   // cp(0:1)
        d.pfadd.dd      f16,f2,f6                       // cp(i,18)+ap*bp(18),cp(i,15)
          fld.q         16(rbp),f12                     // bp(2:3)
        d.pfmul.dd      f24,f10,f2                      // ap*bp(1), ap*bp(19)
          fst.q         f4,16(rcps)++                   // cp(i,14:15)
        d.pfadd.dd      f18,f2,f4                       // cp(i,19)+ap*bp(19),cp(i,16)
          pfld.d        rbinc12(rb1)++,f28              // b1(k,J*n1+i)
// j=4
        d.pfmul.dd      f24,f12,f2                      // ap*bp(2), ap*bp(0)
          fld.q         16(rcp)++,f16                   // cp(2:3)
        d.pfadd.dd      f20,f2,f6                       // cp(i,0)+ap*bp(0),cp(i,17)
          fld.q         32(rbp),f8                      // bp(4:5)
        d.pfmul.dd      f24,f14,f2                      // ap*bp(3), ap*bp(1)
          fst.q         f4,16(rcps)++                   // cp(i,16:17)
        d.pfadd.dd      f22,f2,f4                       // cp(i,1)+ap*bp(1),cp(i,18)
          fst.d         f28,8(rbr)++                    // br(i)

d.pfmul.dd      f24,f8,f2                       // ap*bp(4), ap*bp(2)
          fld.q         16(rcp)++,f20                   // cp(4:5)
        d.pfadd.dd      f16,f2,f6                       // cp(i,2)+ap*bp(2),cp(i,19)
          fld.q         48(rbp),f12                     // bp(6:7)
        d.pfmul.dd      f24,f10,f2                      // ap*bp(5), ap*bp(3)
          fst.q         f4,16(rcps)++                   // cp(i,18:19)
        d.pfadd.dd      f18,f2,f4                       // cp(i,3)+ap*bp(3),cp(i,0)
          nop
// j=8
        d.pfmul.dd      f24,f12,f2                      // ap*bp(6), ap*bp(4)
          fld.q         16(rcp)++,f16                   // cp(6:7)
        d.pfadd.dd      f20,f2,f6                       // cp(i,4)+ap*bp(4),cp(i,1)
          fld.q         64(rbp),f8                      // bp(8:9)
        d.pfmul.dd      f24,f14,f2                      // ap*bp(7), ap*bp(5)
          fst.q         f4,16(rcps)++                   // cp(i,0:1)
        d.pfadd.dd      f22,f2,f4                       // cp(i,5)+ap*bp(5),cp(i,2)
          nop
```

```
            d.pfmul.dd      f24,f8,f2          // ap*bp(8), ap*bp(6)
            fld.q           16(rcp)++,f20      // cp(8:9)
            d.pfadd.dd      f16,f2,f6          // cp(i,6)+ap*bp(6),cp(i,3)
            fld.q           80(rbp),f12        // bp(10:11)
            d.pfmul.dd      f24,f10,f2         // ap*bp(9), ap*bp(7)
            fst.q           f4,16(rcps)++      // cp(i,2:3)
            d.pfadd.dd      f18,f2,f4          // cp(i,7)+ap*bp(7),cp(i,4)
            pfld.d          rcincl2(rc0)++,f28 // c0(i,k)
// j=12
            d.pfmul.dd      f24,f12,f2         // ap*bp(10), ap*bp(8)
            fld.q           16(rcp)++,f16      // cp(10:11)
            d.pfadd.dd      f20,f2,f6          // cp(i,8)+ap*bp(8),cp(i,5)
            fld.q           96(rbp),f8         // bp(12:13)
            d.pfmul.dd      f24,f14,f2         // ap*bp(11), ap*bp(9)
            fst.q           f4,16(rcps)++      // cp(i,4:5)
            d.pfadd.dd      f22,f2,f4          // cp(i,9)+ap*bp(9),cp(i,6)
            fst.d           f28,8(rcr)++       // cr(i,k)

d.pfmul.dd      f24,f8,f2          // ap*bp(12), ap*bp(10)
            fld.q           16(rcp)++,f20      // cp(12:13)
            d.pfadd.dd      f16,f2,f6          // cp(i,10)+ap*bp(10),cp(i,7)
            fld.q           112(rbp),f12       // bp(14:15)
            d.pfmul.dd      f24,f10,f2         // ap*bp(13), ap*bp(11)
            fst.q           f4,16(rcps)++      // cp(i,6:7)
            d.pfadd.dd      f18,f2,f4          // cp(i,11)+ap*bp(11),cp(i,8)
            nop
// j=16
            d.pfmul.dd      f24,f12,f2         // ap*bp(14), ap*bp(12)
            fld.q           16(rcp)++,f16      // cp(14:15)
            d.pfadd.dd      f20,f2,f6          // cp(i,12)+ap*bp(12),cp(i,9)
            fld.q           128(rbp),f8        // bp(16:17)
            d.pfmul.dd      f24,f14,f2         // ap*bp(15), ap*bp(13)
            fst.q           f4,16(rcps)++      // cp(i,8:9)
            d.pfadd.dd      f22,f2,f4          // cp(i,13)+ap*bp(13),cp(i,10)
            nop d.pfmul.dd      f24,f8,f2          // ap*bp(16), ap*bp(14)
            fld.q           16(rcp)++,f20      // cp(16:17)
            d.pfadd.dd      f16,f2,f6          // cp(i,14)+ap*bp(14),cp(i,11)
            fld.q           144(rbp),f12       // bp(18:19)
            d.pfmul.dd      f24,f10,f2         // ap*bp(17), ap*bp(15)
            fst.q           f4,16(rcps)++      // cp(i,10:11)
            d.pfadd.dd      f18,f2,f4          // cp(i,15)+ap*bp(15),cp(i,12)
            nop // Pipeline Drain:

// j=0
            d.pfmul.dd      f24,f12,f2         // ap*bp(18), ap*bp(16)
            fld.q           16(rcp)++,f16      // cp(18:19)
            d.pfadd.dd      f20,f2,f6          // cp(19,16)+ap*bp(16),cp(19,13)
            nop
            d.pfmul.dd      f24,f14,f2         // ap*bp(19), ap*bp(17)
            fst.q           f4,16(rcps)++      // cp(19,12:13)
            d.pfadd.dd      f22,f2,f4          // cp(19,17)+ap*bp(17),cp(19,14)
            nop d.pfmul.dd      f0,f0,f2           // --, ap*bp(18)
            nop
            d.pfadd.dd      f16,f2,f6          // cp(19,18)+ap*bp(18),cp(19,15)
            nop
            d.pfmul.dd      f0,f0,f2           // --, ap*bp(19)
            fst.q           f4,16(rcps)++      // cp(19,14:15)
            d.pfadd.dd      f18,f2,f4          // cp(19,19)+ap*bp(19),cp(19,16)
            pfld.d          0(rb1),f28         // bl(k,J*nl+i)
// j=4
            d.pfadd.dd      f0,f0,f6           // --, cp(19,17)
            nop
            d.fnop
            fst.q           f4,16(rcps)++      // cp(19,16:17)
            d.pfadd.dd      f0,f0,f4           // --, cp(19,18)
            nop
```

```
        d.pfadd.dd      f0,f0,f6                // --, cp(19,19)
          nop
          d.fnop
          fst.q         f4,16(rcps)++           // cp(19,18:19)
// j=8

// j=12

// j=16

//      exit dual instruction mode
        fnop
          nop
        fnop
          nop
        br              label37                 // else
          nop                                   // delayed branch
label28:
// DEBUGGING CODE - LEAVING DUAL INSTRUCTION MODE fnop
          nop
        fnop
          nop
          nop                                   // set breakpoint here
        nop
// END DEBUG CODE - RETURNING TO DUAL INSTR MODE // * compute *

// *         + Compute +         * adds            -1,rnn3,rkcount         // kcount = nn3-1 (nn3 iter)

.align          8                       // align for dual instr. mode
// Pipeline Fill:

// j=0
        d.fnop
          fld.q         0(rbp),f8               // bp(0:1)
        d.fnop
          pfld.d        raincl(ral)++,f24       // ar = al(I*nl+i,k)

d.pfmul.dd      f24,f8,f0               // ap*bp(0), --
          fld.q         0(rcp),f20              // cp(0:1)
        d.fnop
          fld.q         16(rbp),f12             // bp(2:3)
        d.pfmul.dd      f24,f10,f0              // ap*bp(1), --
          nop
        d.fnop
          pfld.d        rbinc2(rb1)++,f28       // b1(k,J*nl+i)
// j=4
        d.pfmul.dd      f24,f12,f2              // ap*bp(2), ap*bp(0)
          fld.q         16(rcp)++,f16           // cp(2:3)
        d.pfadd.dd      f20,f2,f0               // cp(i,0)+ap*bp(0),--
          fld.q         32(rbp),f8              // bp(4:5)
        d.pfmul.dd      f24,f14,f2              // ap*bp(3), ap*bp(1)
          nop
        d.pfadd.dd      f22,f2,f0               // cp(i,1)+ap*bp(1),--
          fst.d         f28,0(rbr)              // br(i)

d.pfmul.dd      f24,f8,f2               // ap*bp(4), ap*bp(2)
          fld.q         16(rcp)++,f20           // cp(4:5)
        d.pfadd.dd      f16,f2,f0               // cp(i,2)+ap*bp(2),--
          fld.q         48(rbp),f12             // bp(6:7)
        d.pfmul.dd      f24,f10,f2              // ap*bp(5), ap*bp(3)
          nop
        d.pfadd.dd      f18,f2,f4               // cp(i,3)+ap*bp(3),cp(i,0)
```

```
// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,0(rcps)              // cp(i,0:1)
        d.pfadd.dd      f22,f2,f4               // cp(i,5)+ap*bp(5),cp(i,2)
        nop d.pfmul.dd      f24,f8,f2               // ap*bp(8), ap*bp(6)
        fld.q           16(rcp)++,f20           // cp(8:9)
        d.pfadd.dd      f16,f2,f6               // cp(i,6)+ap*bp(6),cp(i,3)
        fld.q           80(rbp),f12             // bp(10:11)
        d.pfmul.dd      f24,f10,f2              // ap*bp(9), ap*bp(7)
        fst.q           f4,16(rcps)++           // cp(i,2:3)
        d.pfadd.dd      f18,f2,f4               // cp(i,7)+ap*bp(7),cp(i,4)
        pfld.d          8(ral),f0               // dummy load pipeline push
// j=12
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        nop d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
// j=16
        d.pfmul.dd      f24,f12,f2              // ap*bp(14), ap*bp(12)
        fld.q           16(rcp)++,f16           // cp(14:15)
        d.pfadd.dd      f20,f2,f6               // cp(i,12)+ap*bp(12),cp(i,9)
        fld.q           128(rbp),f8             // bp(16:17)
        d.pfmul.dd      f24,f14,f2              // ap*bp(15), ap*bp(13)
        fst.q           f4,16(rcps)++           // cp(i,8:9)
        d.pfadd.dd      f22,f2,f4               // cp(i,13)+ap*bp(13),cp(i,10)
        nop d.pfmul.dd      f24,f8,f2               // ap*bp(16), ap*bp(14)
        fld.q           16(rcp)++,f20           // cp(16:17)
        d.pfadd.dd      f16,f2,f6               // cp(i,14)+ap*bp(14),cp(i,11)
        fld.q           144(rbp),f12            // bp(18:19)
        d.pfmul.dd      f24,f10,f2              // ap*bp(17), ap*bp(15)
        fst.q           f4,16(rcps)++           // cp(i,10:11)

d.fnop
        br              label39                 // start i loop
        d.fnop
        nop                                     // delayed branch
label38:                                        // top of k loop

// DEBUGGING CODE - LEAVING DUAL INSTRUCTION MODE fnop
         nop
        fnop
         nop
        nop                                     // set breakpoint here
        nop
// END DEBUG CODE - RETURNING TO DUAL INSTR MODE // 19th I iteration
```

```
// j=0
        d.pfadd.dd      f20,f2,f6               // cp(i,16)+ap*bp(16),cp(i,13)
        fld.q           0(rbp),f8               // bp(0:1)
        d.pfmul.dd      f24,f14,f2              // ap*bp(19), ap*bp(17)
        fst.q           f4,16(rcps)++           // cp(i,12:13)
        d.pfadd.dd      f22,f2,f4               // cp(i,17)+ap*bp(17),cp(i,14)
        pfld.d          rainc21(ral)++,f24      // ar = al(I*nl+i,k)

d.pfmul.dd      f24,f8,f2               // ap*bp(0), ap*bp(18)
        fld.q           16(rcp)++,f20           // cp(0:1)
        d.pfadd.dd      f16,f2,f6               // cp(i,18)+ap*bp(18),cp(i,15)
        fld.q           16(rbp),f12             // bp(2:3)
        d.pfmul.dd      f24,f10,f2              // ap*bp(1), ap*bp(19)
        fst.q           f4,16(rcps)++           // cp(i,14:15)
        d.pfadd.dd      f18,f2,f4               // cp(i,19)+ap*bp(19),cp(i,16)
        pfld.d          rbinc12(rb1)++,f28      // bl(k,J*nl+i)
// j=4
        d.pfmul.dd      f24,f12,f2              // ap*bp(2), ap*bp(0)
        fld.q           16(rcp)++,f16           // cp(2:3)
        d.pfadd.dd      f20,f2,f6               // cp(i,0)+ap*bp(0),cp(i,17)
        fld.q           32(rbp),f8              // bp(4:5)
        d.pfmul.dd      f24,f14,f2              // ap*bp(3), ap*bp(1)
        fst.q           f4,16(rcps)++           // cp(i,16:17)
        d.pfadd.dd      f22,f2,f4               // cp(i,1)+ap*bp(1),cp(i,18)
        fst.d           f28,8(rbr)++            // br(i)

d.pfmul.dd      f24,f8,f2               // ap*bp(4), ap*bp(2)
        fld.q           16(rcp)++,f20           // cp(4:5)
        d.pfadd.dd      f16,f2,f6               // cp(i,2)+ap*bp(2),cp(i,19)
        fld.q           48(rbp),f12             // bp(6:7)
        d.pfmul.dd      f24,f10,f2              // ap*bp(5), ap*bp(3)
        fst.q           f4,16(rcps)++           // cp(i,18:19)
        d.pfadd.dd      f18,f2,f4               // cp(i,3)+ap*bp(3),cp(i,0)
        nop
// j=8
        d.pfmul.dd      f24,f12,f2              // ap*bp(6), ap*bp(4)
        fld.q           16(rcp)++,f16           // cp(6:7)
        d.pfadd.dd      f20,f2,f6               // cp(i,4)+ap*bp(4),cp(i,1)
        fld.q           64(rbp),f8              // bp(8:9)
        d.pfmul.dd      f24,f14,f2              // ap*bp(7), ap*bp(5)
        fst.q           f4,16(rcps)++           // cp(i,0:1)
        d.pfadd.dd      f22,f2,f4               // cp(i,5)+ap*bp(5),cp(i,2)
        nop d.pfmul.dd      f24,f8,f2               // ap*bp(8), ap*bp(6)
        fld.q           16(rcp)++,f20           // cp(8:9)
        d.pfadd.dd      f16,f2,f6               // cp(i,6)+ap*bp(6),cp(i,3)
        fld.q           80(rbp),f12             // bp(10:11)
        d.pfmul.dd      f24,f10,f2              // ap*bp(9), ap*bp(7)
        fst.q           f4,16(rcps)++           // cp(i,2:3)
        d.pfadd.dd      f18,f2,f4               // cp(i,7)+ap*bp(7),cp(i,4)
        pfld.d          8(ral),f0               // dummy load pipeline push
// j=12
        d.pfmul.dd      f24,f12,f2              // ap*bp(10), ap*bp(8)
        fld.q           16(rcp)++,f16           // cp(10:11)
        d.pfadd.dd      f20,f2,f6               // cp(i,8)+ap*bp(8),cp(i,5)
        fld.q           96(rbp),f8              // bp(12:13)
        d.pfmul.dd      f24,f14,f2              // ap*bp(11), ap*bp(9)
        fst.q           f4,16(rcps)++           // cp(i,4:5)
        d.pfadd.dd      f22,f2,f4               // cp(i,9)+ap*bp(9),cp(i,6)
        nop d.pfmul.dd      f24,f8,f2               // ap*bp(12), ap*bp(10)
        fld.q           16(rcp)++,f20           // cp(12:13)
        d.pfadd.dd      f16,f2,f6               // cp(i,10)+ap*bp(10),cp(i,7)
        fld.q           112(rbp),f12            // bp(14:15)
        d.pfmul.dd      f24,f10,f2              // ap*bp(13), ap*bp(11)
        fst.q           f4,16(rcps)++           // cp(i,6:7)
        d.pfadd.dd      f18,f2,f4               // cp(i,11)+ap*bp(11),cp(i,8)
        nop
// j=16
        d.pfmul.dd      f24,f12,f2              // ap*bp(14), ap*bp(12)
        fld.q           16(rcp)++,f16           // cp(14:15)
```

```
        d.pfadd.dd      f20,f2,f6           // cp(i,12)+ap*bp(12),cp(i,9)
        fld.q           128(rbp),f8         // bp(16:17)
        d.pfmul.dd      f24,f14,f2          // ap*bp(15), ap*bp(13)
        fst.q           f4,16(rcps)++       // cp(i,8:9)
        d.pfadd.dd      f22,f2,f4           // cp(i,13)+ap*bp(13),cp(i,10)
        nop d.pfmul.dd      f24,f8,f2           // ap*bp(16), ap*bp(14)
        fld.q           16(rcp)++,f20       // cp(16:17)
        d.pfadd.dd      f16,f2,f6           // cp(i,14)+ap*bp(14),cp(i,11)
        fld.q           144(rbp),f12        // bp(18:19)
        d.pfmul.dd      f24,f10,f2          // ap*bp(17), ap*bp(15)
        fst.q           f4,16(rcps)++       // cp(i,10:11)
        d.pfadd.dd      f18,f2,f4           // cp(i,15)+ap*bp(15),cp(i,12)
        nop

// DEBUGGING CODE - LEAVING DUAL INSTRUCTION MODE fnop
          nop
        fnop
          nop
        fst.q           f4,-3184(rcps)++    // cp(i,0:1)
        d.pfadd.dd      f22,f2,f4           // cp(i,5)+ap*bp(5),cp(i,2)
        nop d.pfmul.dd      f24,f8,f2           // ap*bp(8), ap*bp(6)
        fld.q           16(rcp)++,f20       // cp(8:9)
        d.pfadd.dd      f16,f2,f6           // cp(i,6)+ap*bp(6),cp(i,3)
        fld.q           80(rbp),f12         // bp(10:11)
        d.pfmul.dd      f24,f10,f2          // ap*bp(9), ap*bp(7)
        fst.q           f4,16(rcps)++       // cp(i,2:3)
        d.pfadd.dd      f18,f2,f4           // cp(i,7)+ap*bp(7),cp(i,4)
        pfld.d          8(ra1),f0           // dummy load pipeline push
// j=12
        d.pfmul.dd      f24,f12,f2          // ap*bp(10), ap*bp(8)
        fld.q           16(rcp)++,f16       // cp(10:11)
        d.pfadd.dd      f20,f2,f6           // cp(i,8)+ap*bp(8),cp(i,5)
        fld.q           96(rbp),f8          // bp(12:13)
        d.pfmul.dd      f24,f14,f2          // ap*bp(11), ap*bp(9)
        fst.q           f4,16(rcps)++       // cp(i,4:5)
        d.pfadd.dd      f22,f2,f4           // cp(i,9)+ap*bp(9),cp(i,6)
        nop d.pfmul.dd      f24,f8,f2           // ap*bp(12), ap*bp(10)
        fld.q           16(rcp)++,f20       // cp(12:13)
        d.pfadd.dd      f16,f2,f6           // cp(i,10)+ap*bp(10),cp(i,7)
        fld.q           112(rbp),f12        // bp(14:15)
        d.pfmul.dd      f24,f10,f2          // ap*bp(13), ap*bp(11)
        fst.q           f4,16(rcps)++       // cp(i,6:7)
        d.pfadd.dd      f18,f2,f4           // cp(i,11)+ap*bp(11),cp(i,8)
        nop
// j=16
        d.pfmul.dd      f24,f12,f2          // ap*bp(14), ap*bp(12)
        fld.q           16(rcp)++,f16       // cp(14:15)
        d.pfadd.dd      f20,f2,f6           // cp(i,12)+ap*bp(12),cp(i,9)
        fld.q           128(rbp),f8         // bp(16:17)
        d.pfmul.dd      f24,f14,f2          // ap*bp(15), ap*bp(13)
        fst.q           f4,16(rcps)++       // cp(i,8:9)
        d.pfadd.dd      f22,f2,f4           // cp(i,13)+ap*bp(13),cp(i,10)
        nop d.pfmul.dd      f24,f8,f2           // ap*bp(16), ap*bp(14)
        fld.q           16(rcp)++,f20       // cp(16:17)
        d.pfadd.dd      f16,f2,f6           // cp(i,14)+ap*bp(14),cp(i,11)
        fld.q           144(rbp),f12        // bp(18:19)
        d.pfmul.dd      f24,f10,f2          // ap*bp(17), ap*bp(15)
        fst.q           f4,16(rcps)++       // cp(i,10:11)

label39:                                    // init i loop

// DEBUGGING CODE - LEAVING DUAL INSTRUCTION MODE fnop
          nop
```

```
            fnop
              nop
            nop                                         // set breakpoint here
            nop
// END DEBUG CODE - RETURNING TO DUAL INSTR MODE // I loop Body:

d.fnop
              adds        17,r0,ricount               // icount = 17
            d.pfadd.dd    f18,f2,f4                   // cp(i,15)+ap*bp(15),cp(i,12)
              bla         rminus1,ricount,label44     // delayed branch, 18 iter
// j=0
            d.pfmul.dd    f24,f12,f2                  // ap*bp(18), ap*bp(16)
              fld.q       16(rcp)++,f16               // cp(18:19)

label44:
            d.pfadd.dd    f20,f2,f6                   // cp(i,16)+ap*bp(16),cp(i,13)
              fld.q       0(rbp),f8                   // bp(0:1)
            d.pfmul.dd    f24,f14,f2                  // ap*bp(19), ap*bp(17)
              fst.q       f4,16(rcps)++               // cp(i,12:13)
            d.pfadd.dd    f22,f2,f4                   // cp(i,17)+ap*bp(17),cp(i,14)
              pfld.d      raincl(ral)++,f24           // ar = al(I*n1+i,k)

d.pfmul.dd    f24,f8,f2                   // ap*bp(0), ap*bp(18)
              fld.q       16(rcp)++,f20               // cp(0:1)
            d.pfadd.dd    f16,f2,f6                   // cp(i,18)+ap*bp(18),cp(i,15)
              fld.q       16(rbp),f12                 // bp(2:3)
            d.pfmul.dd    f24,f10,f2                  // ap*bp(1), ap*bp(19)
              fst.q       f4,16(rcps)++               // cp(i,14:15)
            d.pfadd.dd    f18,f2,f4                   // cp(i,19)+ap*bp(19),cp(i,16)
              pfld.d      rbinc2(rb1)++,f28           // bl(k,J*n1+i)
// j=4
            d.pfmul.dd    f24,f12,f2                  // ap*bp(2), ap*bp(0)
              fld.q       16(rcp)++,f16               // cp(2:3)
            d.pfadd.dd    f20,f2,f6                   // cp(i,0)+ap*bp(0),cp(i,17)
              fld.q       32(rbp),f8                  // bp(4:5)
            d.pfmul.dd    f24,f14,f2                  // ap*bp(3), ap*bp(1)
              fst.q       f4,16(rcps)++               // cp(i,16:17)
            d.pfadd.dd    f22,f2,f4                   // cp(i,1)+ap*bp(1),cp(i,18)
              fst.d       f28,8(rbr)++                // br(i)

d.pfmul.dd    f24,f8,f2                   // ap*bp(4), ap*bp(2)
              fld.q       16(rcp)++,f20               // cp(4:5)
            d.pfadd.dd    f16,f2,f6                   // cp(i,2)+ap*bp(2),cp(i,19)
              fld.q       48(rbp),f12                 // bp(6:7)
            d.pfmul.dd    f24,f10,f2                  // ap*bp(5), ap*bp(3)
              fst.q       f4,16(rcps)++               // cp(i,18:19)
            d.pfadd.dd    f18,f2,f4                   // cp(i,3)+ap*bp(3),cp(i,0)
              nop
// j=8
            d.pfmul.dd    f24,f12,f2                  // ap*bp(6), ap*bp(4)
              fld.q       16(rcp)++,f16               // cp(6:7)
            d.pfadd.dd    f20,f2,f6                   // cp(i,4)+ap*bp(4),cp(i,1)
              fld.q       64(rbp),f8                  // bp(8:9)
            d.pfmul.dd    f24,f14,f2                  // ap*bp(7), ap*bp(5)
              fst.q       f4,16(rcps)++               // cp(i,0:1)
            d.pfadd.dd    f22,f2,f4                   // cp(i,5)+ap*bp(5),cp(i,2)
              nop d.pfmul.dd    f24,f8,f2                   // ap*bp(8), ap*bp(6)
              fld.q       16(rcp)++,f20               // cp(8:9)
            d.pfadd.dd    f16,f2,f6                   // cp(i,6)+ap*bp(6),cp(i,3)
              fld.q       80(rbp),f12                 // bp(10:11)
            d.pfmul.dd    f24,f10,f2                  // ap*bp(9), ap*bp(7)
              fst.q       f4,16(rcps)++               // cp(i,2:3)
            d.pfadd.dd    f18,f2,f4                   // cp(i,7)+ap*bp(7),cp(i,4)
              pfld.d      8(ral),f0                   // dummy load pipeline push
// j=12
            d.pfmul.dd    f24,f12,f2                  // ap*bp(10), ap*bp(8)
              fld.q       16(rcp)++,f16               // cp(10:11)
            d.pfadd.dd    f20,f2,f6                   // cp(i,8)+ap*bp(8),cp(i,5)
              fld.q       96(rbp),f8                  // bp(12:13)
```

```
            d.pfmul.dd      f24,f14,f2              // ap*bp(11), ap*bp(9)
            fst.q           f4,16(rcps)++           // cp(i,4:5)
            d.pfadd.dd      f22,f2,f4               // cp(i,9)+ap*bp(9),cp(i,6)
            nop d.pfmul.dd      f24,f8,f2               // ap*bp(12), ap*bp(10)
            fld.q           16(rcp)++,f20           // cp(12:13)
            d.pfadd.dd      f16,f2,f6               // cp(i,10)+ap*bp(10),cp(i,7)
            fld.q           112(rbp),f12            // bp(14:15)
            d.pfmul.dd      f24,f10,f2              // ap*bp(13), ap*bp(11)
            fst.q           f4,16(rcps)++           // cp(i,6:7)
            d.pfadd.dd      f18,f2,f4               // cp(i,11)+ap*bp(11),cp(i,8)
            nop // j=16
            d.pfmul.dd      f24,f12,f2              // ap*bp(14), ap*bp(12)
            fld.q           16(rcp)++,f16           // cp(14:15)
            d.pfadd.dd      f20,f2,f6               // cp(i,12)+ap*bp(12),cp(i,9)
            fld.q           128(rbp),f8             // bp(16:17)
            d.pfmul.dd      f24,f14,f2              // ap*bp(15), ap*bp(13)
            fst.q           f4,16(rcps)++           // cp(i,8:9)
            d.pfadd.dd      f22,f2,f4               // cp(i,13)+ap*bp(13),cp(i,10)
            nop d.pfmul.dd      f24,f8,f2               // ap*bp(16), ap*bp(14)
            fld.q           16(rcp)++,f20           // cp(16:17)
            d.pfadd.dd      f16,f2,f6               // cp(i,14)+ap*bp(14),cp(i,11)
            fld.q           144(rbp),f12            // bp(18:19)
            d.pfmul.dd      f24,f10,f2              // ap*bp(17), ap*bp(15)
            fst.q           f4,16(rcps)++           // cp(i,10:11)
            d.pfadd.dd      f18,f2,f4               // cp(i,15)+ap*bp(15),cp(i,12)
            bla             rminus1,ricount,label44 // delayed branch, 18 iter
            d.pfmul.dd      f24,f12,f2              // ap*bp(18), ap*bp(16)
            fld.q           16(rcp)++,f16           // cp(18:19)

d.fnop
            adds            -1,rkcount,rkcount      // kcount--
            d.fnop
            bnc             label38                 // if(kcount>1) go to label38

// 19th I iteration

// j=0
            d.pfadd.dd      f20,f2,f6               // cp(i,16)+ap*bp(16),cp(i,13)
            fld.q           0(rbp),f8               // bp(0:1)
            d.pfmul.dd      f24,f14,f2              // ap*bp(19), ap*bp(17)
            fst.q           f4,16(rcps)++           // cp(i,12:13)
            d.pfadd.dd      f22,f2,f4               // cp(i,17)+ap*bp(17),cp(i,14)
            pfld.d          rainc21(ra1)++,f24      // ar = al(I*nl+i,k)

d.pfmul.dd      f24,f8,f2               // ap*bp(0), ap*bp(18)
            fld.q           16(rcp)++,f20           // cp(0:1)
            d.pfadd.dd      f16,f2,f6               // cp(i,18)+ap*bp(18),cp(i,15)
            fld.q           16(rbp),f12             // bp(2:3)
            d.pfmul.dd      f24,f10,f2              // ap*bp(1), ap*bp(19)
            fst.q           f4,16(rcps)++           // cp(i,14:15)
            d.pfadd.dd      f18,f2,f4               // cp(i,19)+ap*bp(19),cp(i,16)
            pfld.d          rbinc12(rb1)++,f28      // bl(k,J*nl+i)

// j=4
            d.pfmul.dd      f24,f12,f2              // ap*bp(2), ap*bp(0)
            fld.q           16(rcp)++,f16           // cp(2:3)
            d.pfadd.dd      f20,f2,f6               // cp(i,0)+ap*bp(0),cp(i,17)
            fld.q           32(rbp),f8              // bp(4:5)
            d.pfmul.dd      f24,f14,f2              // ap*bp(3), ap*bp(1)
            fst.q           f4,16(rcps)++           // cp(i,16:17)
            d.pfadd.dd      f22,f2,f4               // cp(i,1)+ap*bp(1),cp(i,18)
            fst.d           f28,8(rbr)++            // br(i)

d.pfmul.dd      f24,f8,f2               // ap*bp(4), ap*bp(2)
            fld.q           16(rcp)++,f20           // cp(4:5)
            d.pfadd.dd      f16,f2,f6               // cp(i,2)+ap*bp(2),cp(i,19)
            fld.q           48(rbp),f12             // bp(6:7)
```

```
        d.pfmul.dd      f24,f10,f2          // ap*bp(5), ap*bp(3)
        fst.q           f4,16(rcps)++       // cp(i,18:19)
        d.pfadd.dd      f18,f2,f4           // cp(i,3)+ap*bp(3),cp(i,0)
        nop
// j=8
        d.pfmul.dd      f24,f12,f2          // ap*bp(6), ap*bp(4)
        fld.q           16(rcp)++,f16       // cp(6:7)
        d.pfadd.dd      f20,f2,f6           // cp(i,4)+ap*bp(4),cp(i,1)
        fld.q           64(rbp),f8          // bp(8:9)
        d.pfmul.dd      f24,f14,f2          // ap*bp(7), ap*bp(5)
        fst.q           f4,16(rcps)++       // cp(i,0:1)
        d.pfadd.dd      f22,f2,f4           // cp(i,5)+ap*bp(5),cp(i,2)
        nop d.pfmul.dd      f24,f8,f2           // ap*bp(8), ap*bp(6)
        fld.q           16(rcp)++,f20       // cp(8:9)
        d.pfadd.dd      f16,f2,f6           // cp(i,6)+ap*bp(6),cp(i,3)
        fld.q           80(rbp),f12         // bp(10:11)
        d.pfmul.dd      f24,f10,f2          // ap*bp(9), ap*bp(7)
        fst.q           f4,16(rcps)++       // cp(i,2:3)
        d.pfadd.dd      f18,f2,f4           // cp(i,7)+ap*bp(7),cp(i,4)
        pfld.d          8(ra1),f0           // dummy load pipeline push
// j=12
        d.pfmul.dd      f24,f12,f2          // ap*bp(10), ap*bp(8)
        fld.q           16(rcp)++,f16       // cp(10:11)
        d.pfadd.dd      f20,f2,f6           // cp(i,8)+ap*bp(8),cp(i,5)
        fld.q           96(rbp),f8          // bp(12:13)
        d.pfmul.dd      f24,f14,f2          // ap*bp(11), ap*bp(9)
        fst.q           f4,16(rcps)++       // cp(i,4:5)
        d.pfadd.dd      f22,f2,f4           // cp(i,9)+ap*bp(9),cp(i,6)
        nop d.pfmul.dd      f24,f8,f2           // ap*bp(12), ap*bp(10)
        fld.q           16(rcp)++,f20       // cp(12:13)
        d.pfadd.dd      f16,f2,f6           // cp(i,10)+ap*bp(10),cp(i,7)
        fld.q           112(rbp),f12        // bp(14:15)
        d.pfmul.dd      f24,f10,f2          // ap*bp(13), ap*bp(11)
        fst.q           f4,16(rcps)++       // cp(i,6:7)
        d.pfadd.dd      f18,f2,f4           // cp(i,11)+ap*bp(11),cp(i,8)
        nop
// j=16
        d.pfmul.dd      f24,f12,f2          // ap*bp(14), ap*bp(12)
        fld.q           16(rcp)++,f16       // cp(14:15)
        d.pfadd.dd      f20,f2,f6           // cp(i,12)+ap*bp(12),cp(i,9)
        fld.q           128(rbp),f8         // bp(16:17)
        d.pfmul.dd      f24,f14,f2          // ap*bp(15), ap*bp(13)
        fst.q           f4,16(rcps)++       // cp(i,8:9)
        d.pfadd.dd      f22,f2,f4           // cp(i,13)+ap*bp(13),cp(i,10)
        nop d.pfmul.dd      f24,f8,f2           // ap*bp(16), ap*bp(14)
        fld.q           16(rcp)++,f20       // cp(16:17)
        d.pfadd.dd      f16,f2,f6           // cp(i,14)+ap*bp(14),cp(i,11)
        fld.q           144(rbp),f12        // bp(18:19)
        d.pfmul.dd      f24,f10,f2          // ap*bp(17), ap*bp(15)
        fst.q           f4,16(rcps)++       // cp(i,10:11)
        d.pfadd.dd      f18,f2,f4           // cp(i,15)+ap*bp(15),cp(i,12)
        nop // Pipeline Drain:

// j=0
        d.pfmul.dd      f24,f12,f2          // ap*bp(18), ap*bp(16)
        fld.q           16(rcp)++,f16       // cp(18:19)
        d.pfadd.dd      f20,f2,f6           // cp(19,16)+ap*bp(16),cp(19,13)
        nop
        d.pfmul.dd      f24,f14,f2          // ap*bp(19), ap*bp(17)
        fst.q           f4,16(rcps)++       // cp(19,12:13)
        d.pfadd.dd      f22,f2,f4           // cp(19,17)+ap*bp(17),cp(19,14)
        nop d.pfmul.dd      f0,f0,f2            // --, ap*bp(18)
        nop
```

```
        d.pfadd.dd      f16,f2,f6               // cp(19,18)+ap*bp(18),cp(19,15)
        nop
        d.pfmul.dd      f0,f0,f2                // --, ap*bp(19)
        fst.q           f4,16(rcps)++           // cp(19,14:15)
        d.pfadd.dd      f18,f2,f4               // cp(19,19)+ap*bp(19),cp(19,16)
        pfld.d          0(rb1),f28              // bl(k,J*n1+i)
// j=4
        d.pfadd.dd      f0,f0,f6                // --, cp(19,17)
        nop
        d.fnop
        fst.q           f4,16(rcps)++           // cp(19,16:17)
        d.pfadd.dd      f0,f0,f4                // --, cp(19,18)
        nop d.pfadd.dd      f0,f0,f6                // --, cp(19,19)
        nop
        d.fnop
        fst.q           f4,16(rcps)++           // cp(19,18:19)
// j=8

// j=12

// j=16

//      exit dual instruction mode
        fnop
          nop
        fnop
          nop label37:                                        // end if

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE br              label45                 // else
        nop                                     // delayed branch
label27:

// DEBUGGING CODE - LEAVING DUAL INSTRUCTION MODE fnop
          nop
        fnop
          nop
        nop                                     // set breakpoint here
        nop
// END DEBUG CODE - RETURNING TO DUAL INSTR MODE //      Read C0 into cr adds            18,r0,rkcount           // kcount=18
        pfld.d          0(rc0),f0               // c0(0,0)
        pfld.d          rcinc2(rc0)++,f0        // c0(0,1)
        pfld.d          rcinc2(rc0)++,f0        // c0(0,2)
        pfld.d          rcinc2(rc0)++,f26       // c0(0,3)
        pfld.d          rcinc2(rc0)++,f28       // c0(0,4)
        fst.d           f26,0(rcr)              //              cr(0,0)
        pfld.d          rcinc2(rc0)++,f26       // c0(0,5)
        fst.d           f28,8(rcr)++            //              cr(0,1)
        pfld.d          rcinc2(rc0)++,f28       // c0(0,6)
        fst.d           f26,8(rcr)++            //              cr(0,2)
        pfld.d          rcinc2(rc0)++,f26       // c0(0,7)
```

```
        fst.d       f28,8(rcr)++            //           cr(0,3)
        pfld.d      rcinc2(rc0)++,f28       // c0(0,8)
        fst.d       f26,8(rcr)++            //           cr(0,4)
        pfld.d      rcinc2(rc0)++,f26       // c0(0,9)
        fst.d       f28,8(rcr)++            //           cr(0,5)
        pfld.d      rcinc2(rc0)++,f28       // c0(0,10)
        fst.d       f26,8(rcr)++            //           cr(0,6)
        pfld.d      rcinc2(rc0)++,f26       // c0(0,11)
        fst.d       f28,8(rcr)++            //           cr(0,7)
        pfld.d      rcinc2(rc0)++,f28       // c0(0,12)
        fst.d       f26,8(rcr)++            //           cr(0,8)
        pfld.d      rcinc2(rc0)++,f26       // c0(0,13)
        fst.d       f28,8(rcr)++            //           cr(0,9)
        pfld.d      rcinc2(rc0)++,f28       // c0(0,14)
        fst.d       f26,8(rcr)++            //           cr(0,10)
        pfld.d      rcinc2(rc0)++,f26       // c0(0,15)
        fst.d       f28,8(rcr)++            //           cr(0,11)
        pfld.d      rcinc2(rc0)++,f28       // c0(0,16)
        fst.d       f26,8(rcr)++            //           cr(0,12)
        pfld.d      rcinc2(rc0)++,f26       // c0(0,17)
        fst.d       f28,8(rcr)++            //           cr(0,13)
        pfld.d      rcinc2(rc0)++,f28       // c0(0,18)
        fst.d       f26,8(rcr)++            //           cr(0,14)
        pfld.d      rcinc2(rc0)++,f26       // c0(0,19)

bla         rminus1,rkcount,label46 // set up 19 iterations
        fst.d       f28,8(rcr)++            //           cr(0,15)

label46:
        pfld.d      rcinc12(rc0)++,f28      // c0(k,0)
        fst.d       f26,8(rcr)++            //           cr(k,16)
        pfld.d      rcinc2(rc0)++,f26       // c0(k,1)
        fst.d       f28,8(rcr)++            //           cr(k,17)
        pfld.d      rcinc2(rc0)++,f28       // c0(k,2)
        fst.d       f26,8(rcr)++            //           cr(k,18)
        pfld.d      rcinc2(rc0)++,f26       // c0(k,3)
        fst.d       f28,8(rcr)++            //           cr(k,19)
        pfld.d      rcinc2(rc0)++,f28       // c0(k,4)
        fst.d       f26,8(rcr)++            //           cr(k,0)
        pfld.d      rcinc2(rc0)++,f26       // c0(k,5)
        fst.d       f28,8(rcr)++            //           cr(k,1)
        pfld.d      rcinc2(rc0)++,f28       // c0(k,6)
        fst.d       f26,8(rcr)++            //           cr(k,2)
        pfld.d      rcinc2(rc0)++,f26       // c0(k,7)
        fst.d       f28,8(rcr)++            //           cr(k,3)
        pfld.d      rcinc2(rc0)++,f28       // c0(k,8)
        fst.d       f26,8(rcr)++            //           cr(k,4)
        pfld.d      rcinc2(rc0)++,f26       // c0(k,9)
        fst.d       f28,8(rcr)++            //           cr(k,5)
        pfld.d      rcinc2(rc0)++,f28       // c0(k,10)
        fst.d       f26,8(rcr)++            //           cr(k,6)
        pfld.d      rcinc2(rc0)++,f26       // c0(k,11)
        fst.d       f28,8(rcr)++            //           cr(k,7)
        pfld.d      rcinc2(rc0)++,f28       // c0(k,12)
        fst.d       f26,8(rcr)++            //           cr(k,8)
        pfld.d      rcinc2(rc0)++,f26       // c0(k,13)
        fst.d       f28,8(rcr)++            //           cr(k,9)
        pfld.d      rcinc2(rc0)++,f28       // c0(k,14)
        fst.d       f26,8(rcr)++            //           cr(k,10)
        pfld.d      rcinc2(rc0)++,f26       // c0(k,15)
        fst.d       f28,8(rcr)++            //           cr(k,11)
        pfld.d      rcinc2(rc0)++,f28       // c0(k,16)
        fst.d       f26,8(rcr)++            //           cr(k,12)
        pfld.d      rcinc2(rc0)++,f26       // c0(k,17)
        fst.d       f28,8(rcr)++            //           cr(k,13)
        pfld.d      rcinc2(rc0)++,f28       // c0(k,18)
        fst.d       f26,8(rcr)++            //           cr(k,14)
        pfld.d      rcinc2(rc0)++,f26       // c0(k,19)
        bla         rminus1,rkcount,label46 // loop 19 iterations
        fst.d       f28,8(rcr)++            //           cr(k,15)

pfld.d      0(rc0),f28              // --
        fst.d       f26,8(rcr)++            //           cr(19,16)
        pfld.d      0(rc0),f26              // --
```

```
            fst.d       f28,8(rcr)++            //         cr(19,17)
            pfld.d      0(rc0),f28              // --
            fst.d       f26,8(rcr)++            //         cr(19,18)
            fst.d       f28,8(rcr)++            //         cr(19,19)

label45:                                        // end if

// DEBUGGING CODE - LEAVING DUAL INSTRUCTION MODE fnop
          nop
       fnop
          nop
          nop                                   // set breakpoint here
          nop
// END DEBUG CODE - RETURNING TO DUAL INSTR MODE label26:                                        // end if

// DEBUGGING CODE - LEAVING DUAL INSTRUCTION MODE fnop
          nop
       fnop
          nop
          nop                                   // set breakpoint here
          nop
// END DEBUG CODE - RETURNING TO DUAL INSTR MODE
// restore registers
            fld.d       -8(fp),f2
            fld.d       -16(fp),f4
            fld.d       -24(fp),f6
            ld.l        -28(fp),r8
            ld.l        -32(fp),r9
            ld.l        -36(fp),r10
            ld.l        -40(fp),r11
            ld.l        -44(fp),r12
            ld.l        -48(fp),r13
            ld.l        -52(fp),r14
            ld.l        -56(fp),r15
            ld.l        4(fp),r1                // restore return address
            ld.l        0(fp),fp                // restore frame pointer
            bri         r1                      // return
               adds     72,sp,sp                // restore stack pointer
```

I claim:

1. A method of reducing the effects of memory latency in the multiplication of two matrices by a hierarchical memory computer system, said method comprising the steps of:

generating by a processor, in a first series of generating operations, scalar-vector products of scalars from a vector of one of said matrices, and a vector of the other of said matrices, for successive ones of said scalars, accumulating said products as they are generated, generating, in a next series of said generating operations, further scalar-vector products of scalars from a next vector of said one of said matrices, and a next vector of said other of said matrices, for successive ones of said scalars from said next vector of said one of said matrices, accumulating said further products as they are generated, fetching from slower memory into faster memory of a memory hierarchy of said computer system, during a time period overlapping the currently executing one of said generating operations, the next said scalar to be operated upon, so that said fetched next scalar is available for the next of said generating operations sooner than if it were to be retrieved directly from said slower memory at the onset of said next operation, and fetching from said slower memory into said faster memory, during a time period overlapping the currently executing one of said first series of generating operations, a scalar in said next vector of said other of said matrices, so that said fetched next vector is available for said next series of generating operations sooner than if it were to be retrieved directly from said slower at the onset of said next series of generating operations.

2. The method of claim 1, further including the steps of:

generating, in a plurality of further series of said generating operations, yet further scalar-vector products of scalars from further vectors of said one of said matrices, and further vectors of said other of said matrices, for successive ones of said further scalars in each of said further vectors of said one of said matrices, until said further vectors of said matrices are exhausted, accumulating said yet further products as they are generated, and in a time period overlapping with said further series of generating operations, continuing to fetch scalars from said matrices, until said scalars from said vectors are exhausted.

3. The method of claim 1 or 2 further including the steps of:

maintaining a pair of scalar storage locations in said faster memory for scalars from said one of said matrices, maintaining a scalar fetching pointer and a scalar operating pointer, during the current said step of fetching a scalar from said one of said matrices, storing said fetched scalar in the location pointed to by said scalar fetching pointer, during the current said generating operation, operating on the scalar pointed to by said scalar operating pointer, and swapping said scalar pointers to prepare said stored fetched scalar for the next generating operation to be performed, and to allow the next fetched scalar to over write the scalar that has just been operated upon.

4. The method of claim 1 or 2, further including the steps of:

maintaining a pair of vector storage locations in said faster memory for vectors from said outer of said matrices, maintaining a vector fetching pointer and a vector operating pointer, during the current said step of fetching scalars from a vector of said other of said matrices, storing said fetched scalars of said other of said matrices in the location pointed to by said vector fetching pointer, during the current said series of generating operations, operating on the vector pointed to by said vector operating pointer, and swapping said vector pointers to prepare said stored fetched vector for the next series of generating operations to be performed, and to allow the next fetched vector to over-write the vector that has just been operated upon.

5. The method of claim 1 or 2, wherein said method is a blocked method, said matrices being divided into blocks, said vectors being operated upon being vectors of said blocks, and said generating, accumulating, and fetching operations being performed for said vectors of said blocks.

6. The method of claim 5, wherein said steps of accumulating said further products generate a result block, and further including the step of storing from said faster memory into said slower memory, during a time period overlapping the currently executing one of said generating operations, a scalar from a previous result block.

7. The method of claim 6, wherein said method is applied to a matrix update operation, further including the step of fetching from said slower memory into said faster memory, during a time period overlapping the currently executing one of said generating operations, a scalar from a next result block to use as a starting value for accumulating steps in said next result block, so that said fetched next block is available for operations on the next block sooner than if it were to be retrieved directly from said slower memory at the onset of said operations on said next block.

8. The method of claim 6, further including the steps of:

maintaining a pair of block storage locations in said faster memory for said result blocks, maintaining a block storing pointer and a block operating pointer, during the current said step of storing scalars from said faster memory into said slower memory, storing said scalars from the location pointed to by said block storing pointer, during the current said series of accumulating operations, accumulating into the block pointed to by said operating pointer, and swapping said block pointers to prepare for the next lock storing steps to be performed, and to allow the next accumulating steps to over-write the block that has just been stored.

9. The method of claim 5, wherein said method is applied to a matrix update operation, further including the step of fetching from said slower memory into said faster memory, during a time period overlapping the currently executing one of said generating operations, a scalar from a next result block to use as a starting value for accumulating steps in said next result block, so that said fetched next block is available for operations on the next block sooner than if it were to be retrieved directly from said slower memory at the onset of said operations on said next block.

10. The method of claim 9, further including the steps of:

maintaining a pair of block storage locations in said faster memory for said result blocks, maintaining a block storing pointer and a block operating pointer, during the current said step of storing scalars from said faster memory into said slower memory, storing said scalars from the location pointed to by said block storing pointer, during the current said series of accumulating operations, accumulating into the block pointed to by said operating pointer, and swapping said block pointers to prepare for the next block storing steps to be performed, and to allow the next accumulating steps to over-write the block that has just been stored.

11. The method of claim 5, further including the steps of:

maintaining a pair of block storage locations in said faster memory for said result blocks, maintaining a block storing pointer and a block operating pointer, during the current said step of storing scalars from said faster memory into said slower memory, storing said scalars from the location pointed to by said block storing pointer, during the current said series of accumulating operations, accumulating into the block pointed to by said operating pointer, and swapping said block pointers to prepare for the next block storing steps to be performed, and to allow the next accumulating steps to over-write the block that has just been stored.

12. The method of claim 1 or 2, wherein said one of said matrices is a first term matrix, and said other of said matrices is a second term matrix, and said vectors of said first matrix are column vectors, and said vectors of said second matrix are row vectors.

13. The method of claim 1 or 2, wherein said steps of generating and fetching are distributed among a plurality of processors each of which operates on the elements of different blocks of the matrices.

14. The method of claim 13, wherein the distribution of blocks among said processors is based on a size dependent sequencing method to reduce differences in completion times between processors.

15. The method of claims 1 or 2, further including the step of first applying an asymptotic complexity reduction method to said matrices to reduce the order of the number of overall operations to be performed on said matrices.

16. The method of claim 1 or 2, further including the step of operating with one of said matrices transposed.

17. The method of claim 1, wherein said method is applied to a matrix update operation, and wherein said method is a blocked method, said matrices being divided into blocks, said vectors being operated upon being block vectors of said blocks, and said generating, accumulating, and fetching operations being performed for said block vectors, and wherein said one of said matrices in a first term matrix, and said other of said matrices is a second term matrix, and said block vectors of said first matrix are column vectors, and said block vectors of said second matrix are row vectors, and further including the steps of:

generating, in a plurality of further series of said generating operations, yet further scalar-vector products of scalars from further block vectors of said first of said matrices, and further block vectors of said second of said matrices, for successive ones of said further scalars in each of said further block vectors of said first of said matrices, until said further scalars are exhausted, accumulating said yet further products as they are generated, to update a result block in said faster memory, in a time period overlapping with said further series of generating operations, continuing to fetch scalars from said matrices, until said block vectors from said matrices are exhausted, and fetching from said slower memory into said faster memory, during a time period overlapping the currently executing one of said generating operations, a scalar from a next block to use as a starting value for said updating, so that said fetched next block is available for operations on the next block sooner than if it were to be retrieved directly from said slower memory at the onset of said operations on said next block, maintaining a pair of scalar storage locations in said faster memory for scalars from said first of said matrices, a pair of vector storage locations in said faster memory for vectors from said second of said matrices, and a pair of block storage locations in said faster memory for result blocks, maintaining a scalar fetching pointer, a scalar operating pointer, a vector fetching pointer, a vector operating pointer, a block storing pointer, and a block operating pointer, during the current said step of fetching a scalar from said first of said matrices, storing said fetched scalar in the location pointed to by said scalar fetching pointer, during the current said generating operation, operating on the scalar pointed to by said scalar operating pointer, swapping said scalar pointers to prepare said stored fetched scalar for the next generating operation to be performed, and to allow the next fetched scalar to over-write the scalar that has just been operated upon, during the current said step of fetching scalars from a vector of said second of said matrices, storing said fetched scalars of said second of said matrices in the location pointed to by said vector fetching pointer, during the current said series of generating operations, operating on the vector pointed to by said vector operating pointer, swapping said vector pointers to prepare said stored fetched vector for the next series of generating operations to be performed, and to allow the next fetched vector to over-write the vector that has just been operated upon, storing from said faster memory into said slower memory, during a time period overlapping the currently executing one of said generating operations, a scalar from a previous result block, during the current said step of storing scalars from said faster memory into said slower memory, storing said scalars from the location pointed to by said block storing pointer, during the current said series of accumulating operations, updating the block pointed to by said operating pointer, and swapping said block pointers to prepare for the next block storing steps to be performed, and to allow the next accumulating steps to over-write the block that has just been stored.

18. The method of claim 17, wherein said steps of generating and fetching are distributed among a plurality of processors each of which operates on the elements of different blocks of the matrices.

19. The method of claim 19, wherein the distribution of blocks among said processors is based on a size dependent sequencing method to reduce differences in completion times between processors.

20. The method of claim 17, further including the step of first applying an asymptotic complexity reduction method to said matrices to reduce the order of the number of overall operations to be performed on said matrices.

21. The method of claim 17, further including the step of operating with one of said matrices transposed.

* * * * *